US012220362B2

(12) United States Patent
Norris et al.

(10) Patent No.: US 12,220,362 B2
(45) Date of Patent: Feb. 11, 2025

(54) MOBILITY DEVICE SEAT

(71) Applicant: DEKA Products Limited Partnership, Manchester, NH (US)

(72) Inventors: Matthew A. Norris, Londonderry, NH (US); Trevor A. Conway, Manchester, NH (US); Paul R. Curtin, Londonderry, NH (US); Dale B. McGrath, Manchester, NH (US); Zachary E. Cranfield, Manchester, NH (US); Alexander D. Streeter, Concord, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

(21) Appl. No.: 18/530,445

(22) Filed: Dec. 6, 2023

(65) Prior Publication Data

US 2024/0099916 A1 Mar. 28, 2024

Related U.S. Application Data

(60) Division of application No. 17/854,131, filed on Jun. 30, 2022, now Pat. No. 11,857,473, which is a continuation of application No. 17/108,575, filed on Dec. 1, 2020, now Pat. No. 11,376,175, which is a continuation of application No. 16/035,041, filed on Jul. 13, 2018, now Pat. No. 10,881,562.

(60) Provisional application No. 62/581,670, filed on Nov. 4, 2017, provisional application No. 62/559,263, filed on Sep. 15, 2017.

(51) Int. Cl.
*A61G 5/10* (2006.01)
*A61G 5/04* (2013.01)
*A61G 5/12* (2006.01)

(52) U.S. Cl.
CPC .......... *A61G 5/1091* (2016.11); *A61G 5/1043* (2013.01); *A61G 5/1056* (2013.01); *A61G 5/04* (2013.01); *A61G 5/122* (2016.11); *A61G 5/125* (2016.11); *A61G 5/128* (2016.11)

(58) Field of Classification Search
CPC .. A61G 5/1091; A61G 5/1043; A61G 5/1056; A61G 5/125; A61G 5/122; A61G 5/128; A61G 5/04
USPC ........................................................ 280/304.1
See application file for complete search history.

(56) References Cited

U.S. PATENT DOCUMENTS

| | | | | | |
|---|---|---|---|---|---|
| 5,127,709 | A * | 7/1992 | Rubinstein | A61G 5/10 | 248/229.12 |
| 5,364,165 | A * | 11/1994 | Okamoto | A61G 5/128 | 297/378.12 |
| 5,575,348 | A * | 11/1996 | Goertzen | A61G 5/1078 | 180/65.6 |
| 6,264,218 | B1 * | 7/2001 | Slagerman | A61G 5/1097 | 280/43 |

(Continued)

*Primary Examiner* — Mark R Wendell
(74) *Attorney, Agent, or Firm* — William A. Bonk, III

(57) ABSTRACT

A seat for a mobility device accommodating flexibility, personalized comfort, and transportability. The seat can include a button push means to enable movement of a height-adjustable armrest. The seat back can fold upon the seat for transportability. The seat cushion and armrest cushion can be removably mounted and separately replaceable. The seat can be mounted upon various types of devices, including, but not limited to, wheelchairs.

15 Claims, 81 Drawing Sheets

(56) References Cited

U.S. PATENT DOCUMENTS

| | | | | |
|---|---|---|---|---|
| 6,270,105 | B1 * | 8/2001 | Friedrich | A61G 5/026<br>280/281.1 |
| 6,375,209 | B1 * | 4/2002 | Schlangen | A61G 5/045<br>180/907 |
| 6,957,867 | B1 * | 10/2005 | Su | A47C 1/03<br>297/411.27 |
| 9,079,089 | B2 * | 7/2015 | Lokken | A61G 5/128 |
| 10,945,900 | B1 * | 3/2021 | Ousborne | A61G 5/1005 |
| 2002/0074189 | A1 * | 6/2002 | Hester | B66B 9/08<br>187/245 |
| 2004/0085295 | A1 * | 5/2004 | Cowen | A61G 5/04<br>345/161 |
| 2007/0074917 | A1 * | 4/2007 | Jaenke | F16B 2/065<br>180/65.1 |
| 2007/0085300 | A1 * | 4/2007 | Loewenthal | F16B 2/185<br>280/304.1 |
| 2007/0216205 | A1 * | 9/2007 | Davis | A47C 1/08<br>297/241 |
| 2008/0066974 | A1 * | 3/2008 | Pearlman | A61G 5/128<br>180/22 |
| 2011/0175329 | A1 * | 7/2011 | Gingras | A61G 5/08<br>280/647 |
| 2014/0034400 | A1 * | 2/2014 | Underwood | A61G 5/04<br>180/9.34 |
| 2015/0342517 | A1 * | 12/2015 | Rabischong | A61B 5/4538<br>600/595 |
| 2016/0075535 | A1 * | 3/2016 | Ooms | A61G 5/10<br>297/344.14 |
| 2019/0038487 | A1 * | 2/2019 | Cherny | A61G 5/127 |

* cited by examiner

MOBILITY DEVICE SEAT

CROSS REFERENCE TO RELATED APPLICATIONS

This application is a division of U.S. patent application Ser. No. 17/854,131 filed Jun. 30, 2022, which is a continuation of U.S. patent application Ser. No. 17/108,575, filed Dec. 1, 2020, now U.S. Pat. No. 11,376,175, issued Jul. 5, 2022, which is a continuation of U.S. patent application Ser. No. 16/035,041, filed Jul. 13, 2018, now U.S. Pat. No. 10,881,562, issued Jan. 5, 2021, which claims the benefit of U.S. Provisional Application Ser. No. 62/559,263, filed Sep. 15, 2017, and U.S. Provisional Application Ser. No. 62/581,670 filed Nov. 4, 2017, which are incorporated herein by reference in their entirety.

BACKGROUND

The present teachings relate generally to a removable seat. Mobility devices such as, for example, wheelchairs, typically include a seat that is integrated with a chassis and wheels. Seats can include a variety of features, and some seats may be structured to help a user accommodate for certain challenges. Likewise, the mobility device chassis and wheels can come in a variety of configurations, for example, some are motorized and some are not. When the seat is integrated with the chassis, the user may have to weigh the features of the integrated seat against the features of the chassis and wheels to decide which features are most important to the user. A seat that can accommodate the features necessary for comfort and stability while also addressing weight and transport issues can be useful.

SUMMARY

The seat of the present teachings can include a combination of features. A first feature relates to the connection of the seat to a wheelchair base. The connection can consequently allow the user to remove and replace the seat from the wheelchair base. A second feature relates to a removable attendant handle that can allow the wheelchair to operate with or without an attendant handle. A third feature relates to adjustability and changeability of the seat backrest. In some configurations, the angle of the seat backrest can be adjusted, and the seat backrest cushion, and the entire seat backrest, can be removed and replaced. The backrest can be selected based on a desired curvature. A fourth feature relates to the adjustability of the armrest positions. The armrests, mounted between coupling brackets, can be raised and lowered independently from one another along a slide between the coupling brackets, by the user, with a simple button depression. A fifth feature relates to the removability of the seat cushion structure and the seat cushion itself. The seat cushion structure can be selected based on a desired shape and comfort level. A sixth feature relates to the height and tilt angle adjustments of the footrest. A seventh feature relates to the transportability of the seat. The backrest can be hinged and can be folded upon the seat cushion, and the footrest can be hinged and can be folded towards the footrest post. When the backrest is folded towards the seat cushion, the armrests can fold flush with the backrest. A single footrest can accommodate both feet.

The method of the present teachings for assembling a seat for a mobility device, where the seat includes a footrest, a bracket, at least one arm, a seat shell, and a backrest, the method can include, but is not limited to including, pivotally connecting the footrest to a rod. The rod can include a rod first end and a rod second end. The footrest can include a first pivot means at the connection between the footrest and the rod first end. The method can include sliding, to adjust the footrest to a desired height, the rod second end into a receiving port of a hollow tube. The hollow tube can include a connection port, and the connection port can include shock absorbing features. The method can include pivotally connecting the connection port to the bracket. The bracket can include seat shell connection features, and at least one mobility device motor connection feature. The method can include operably connecting the seat shell to the seat shell connection features and bracket, and pivotally connecting the backrest to the bracket. The backrest can include a third pivot means, that can be enabled by a spring-loaded latch. The method can include operably connecting at least one armrest mount to the bracket. The at least one armrest mount can include a height adjustment means. The method can include pivotally connecting the at least one arm to the at least one armrest mount. The bracket can optionally include an aluminum alloy. The method can optionally include operably connecting a seat cushion to the seat shell. The height adjustment means can optionally include a push button actuation mounted on the at least one armrest mount. The footrest can optionally include an accommodation for two feet. The first pivot means can optionally include a thumbscrew. The second pivot means can optionally include a multipositional clamping means. The at least one mobility device connection feature can optionally include at least one bracket extension. The backrest can optionally include a backrest angle adjustment means, and the backrest angle adjustment means can optionally include a tension knob. The connection port can optionally include the second pivot means.

The method of the present teachings for transporting a seat of a mobility device, where the seat can include a footrest operably coupled with to a seat bracket, and the seat bracket can be operably coupled with a tube holder bracket. The tube holder bracket can be operably coupled with at least one armrest and a frame bracket, and the frame bracket can be operably coupled with a backrest. The method can include, but is not limited to including, pivoting the footrest towards a rod connected to the footrest until the footrest is approximately flush with the rod. The rod can include a rod first end and a rod second end, and the footrest can include a first pivot means at the connection between the footrest and the rod first end. The method can include sliding the rod second end into a receiving port of a hollow tube. The hollow tube can include a connection port, and the connection port can be operably coupled with the seat bracket. The method can include pivoting the backrest towards the seat bracket at a second pivot means. The second pivot means can be enabled by a spring-loaded latch. The method can include pivoting the at least one armrest towards the backrest. The method can include reducing the height of the at least one arm rest mount by adjusting a height adjustment means, and pivoting the at least one arm towards the at least one arm rest mount until the at least one arm is flush with the at least one arm rest mount.

The seat for a mobility device of the present teachings can include, but is not limited to including, a footrest pivotally connected to a footrest rod. The footrest rod can include a rod first end and a rod second end, and a first pivot means at the connection between the footrest and the rod first end. The rod second end can be operably coupled with a receiving port of a hollow tube, and the hollow tube can include a connection port. The connection port can be pivotally connected a seat bracket. The seat bracket can include seat shell connection features, and at least one mobility device motor connection feature. The seat shell can be operably connected to the seat shell connection features and bracket, and can pivotally connect a backrest to the bracket. The backrest can include a second pivot means that can be enabled by a spring-loaded latch. At least one armrest mount can be pivotally connected the to the bracket. The at least one armrest mount can include a height adjustment means. The at least one arm can be pivotally connected to the at least one armrest mount. The bracket can optionally include aluminum alloy. A seat cushion can optionally be operably connected to the seat shell. The height adjustment means can optionally include a push button actuation mounted on the at least one armrest mount. The footrest can optionally include an accommodation for two feet. The first pivot means can optionally include a thumbscrew. The second pivot means can optionally include a multipositional clamping means. The at least one mobility device connection feature can optionally include at least one bracket extension. The backrest can optionally include a backrest angle adjustment means, and the backrest angle adjustment means can optionally include a tension knob. The connection port can optionally include the second pivot means.

The locking mechanism of the present teachings for adjusting a length of a handle projecting from a portable device, where the handle includes a user-operable portion and a rail portion exposed to the locking mechanism, and the rail portion travels along rail slots occupying a portion of the portable device, where the locking mechanism can include, but is not limited to including, a user-operable segment. The user-operable segment can be disposed externally to the portable device and can advance a user operation to a plurality of inter-operable components of the locking mechanism. The user-operable segment can include, but is not limited to including, a latch with a flange portion. The latch can be switched from a locked position to an unlocked position and can cause a motion of the flange. The flange can serve as an intermediate component between the latch and the inter-operable components of the locking mechanism. The inter-operable components can include, but are not limited to including, a first stopper operably engaged with one of the rails of the rail portion. The first stopper can operate on at least one of the rails occupying the corresponding rail slot. The inter-operable components can include a second stopper that can engage with a second of the rails in the rail portion when the second of the rails is occupying a second corresponding rail slot. The inter-operable components can include a central beam in contact with the flange in receiving the user-operation and controlling the first and second stopper. The central beam can include, but is not limited to including, a focal point on one end and a flexible joint on the other end. At least one first side beam can include, but is not limited to including, a first end and a second end. The at least one first side beam can engage with the central beam on the focal point and can engage with the first stopper on the second end. The at least one second side beam can include, but is not limited to including, a first end and a second end. The at least one second side beam can engage with the central beam on the focal point and with the second stopper on the second end. When the latch is in the locked position, the first and second stopper can restrain movement of the rail portion along the rail slots. When the latch is in the unlocked position the first and second stopper can decouple from the rails, and allow the rails to travel in the rail slots.

An adjustable mount of the present teachings for supporting a user control assembly, where the user control assembly can control a mobility device, the mount can include, but is not limited to including, a platform supporting the user control assembly, and a bar including a proximal end, a distal end and a central region there between. The bar can be operably coupled with the platform at the distal end. The mount can include a pivoting assembly operably coupled with the proximal end. The pivoting assembly can include, but is not limited to including, at least one bracket that can engage the user control mount with an armrest of the mobility device. The bracket can include, but is not limited to including, a roller facing away from the bar. The mount can include a housing fastened to the at least one bracket. The housing can include, but is not limited to including, a receptacle. The mount can include a rotary structure that can include, but is not limited to including, a protrusion segment and an elongated segment. The rotary structure can operably couple with the bracket and the housing. The receptacle can movably receive the protrusion segment. The elongated segment can operably couple with the proximal end of the bar. The roller can receive the rotary structure, and a pre-determined radial fit can be achieved there between. The mount can include a locking assembly occupying the central region of the bar. The locking assembly can include, but is not limited to including, a lever portion and a barb portion. The lever portion and the barb portion can jointly engaged the bar of the user control assembly mount. When the bar is displaced, the platform is displaced.

The pivotable mount assembly for a mobility device of the present teachings can include, but is not limited to including, a platform to engage a user-operable component, and a shaft having a distal end and a proximal end. The distal end can operably couple with the platform, and the platform can operably couple with an armrest of the mobility device through the proximal end. The assembly can include a rotary structure that can operably couple with the proximal end. The rotary structure can enable the shaft to pivot with respect to the armrest. The rotary structure can include, but is not limited to including, a brace that can operably couple with the armrest. The brace can include, but is not limited to including, an axle facing away from the shaft. The assembly can include a receiver that can operably couple with the brace. The receiver can include, but is not limited to including, a pocket. The assembly can include a roller that can include, but is not limited to including, a projection and an elongation. The roller can operably couple with the brace by receiving the axle into a roller space. The roller can pivot around the axle, and the pivoting can be constrained by the projection in the pocket. The roller can operably couple with the shaft through the elongation. The assembly can include a lock assembly that can include, but is not limited to including, a clasp that can include, but is not limited to including, a handle portion and a spike portion. The operation of the handle portion can cause the spike portion to trap into or release the shaft from the clasp.

The method of the present teachings for adjustably mounting a user-operable device to a mobility device can include, but is not limited to including, engaging a brace piece with an armrest of the mobility device. The brace piece can include, but is not limited to including, at least one roller projecting away from the brace piece. The method can include providing a bar having a proximal end, a distal end, and a central region. The central region can operably couple the proximal end and the distal end. The proximal end, the distal end, and the central region can cooperate to telescopically adjust a length of the bar. The method can include coupling a support platform with the distal end. The support platform can retain the user-operable device therewith. The method can include coupling a pivoting assembly with the proximal end. The pivoting assembly can operably couple the bar with the armrest by coupling the bar with the brace piece. The method can include providing a locking mechanism that can operably couple with the central region of the bar. The locking mechanism can be operated by a user to engage the bar with and disengage the bar from the armrest. The method can optionally include receiving a housing on the brace piece. The housing can at least partially occupy the brace piece.

The method of the present teachings for assembling a mount for engaging a user-operable device therewith, where the mount can operably couple with a seating device providing an armrest, the method can include, but is not limited to including, providing a shaft with a first end and a second end. The first end and the second end can define a central region there between. The method can include operably coupling a support platform to the first end. The support platform can engage the user-operable device. The method can include providing a pivoting assembly on the second end. The pivoting assembly can include, but is not limited to including, a rotary structure having a projection and an elongation. The projection can oppose the elongation, and the rotary structure can include, but is not limited to including, a roller space. The roller space can receive a complementing component from the armrest. The roller space can pivotally engage the shaft with the armrest.

The seat assembly of the present teachings for a mobility device, where the seat can include, but is not limited to including, a backrest, a seat pan, and an armrest, and the seat assembly can include, but is not limited to including, a back frame bracket enabling coupling with the backrest, a tube holder bracket enabling coupling with the seatpan, an armrest bracket enabling coupling with the armrest, and a cane. The cane can be surrounded by the armrest bracket, and can enable adjustment of the armrest bracket. The cane can enable coupling between the back frame bracket and the tube holder bracket. The armrest bracket can optionally include a cane cavity receiving the cane. The cane can include a plurality of set cavities. The armrest bracket can optionally include at least one fastener cavity, and an armrest geometry that can accommodate bracket geometry in the armrest. The armrest geometry and the bracket geometry can enable movement of the armrest. The cane can optionally include at least one channel surrounding the plurality of set cavities, and the armrest bracket can optionally include cane geometry complementing the at least one channel. The cane geometry can enable alignment between at least one of the plurality of set cavities and the at least one fastener cavity. The seat assembly can optionally include an armrest height adjustment button, a button slide including a straight edge interrupted by a divot, and a button transition rod achieving aligned coupling with the button slide. The button transition rod can operably couple the height adjustment button with the button slide. The seat assembly can optionally include a lock pin having a first end and a second end. The first end can be in contact with the straight edge of the button slide when there is no pressure on the height adjustment button, and the first end being in contact with the divot when there is pressure on the height adjustment button. The second end can be captured in one of the plurality of set cavities when the first end is in contact with the straight edge of the button slide, and the second end being in contact with one of the at least one cane channels when the first end is in contact with the divot.

The seat assembly of the present teachings for a mobility device, where the seat can include, but is not limited to including, a backrest assembly, a seat pan, an armrest, and an attendant handle, and the seat assembly can include, but is not limited to including, a back frame bracket enabling coupling with the backrest. The back frame bracket can include an attendant handle operating mechanism that can enable movement of the attendant handle. The seat assembly can include a tube holder bracket enabling coupling with the seatpan, an armrest bracket enabling coupling with the armrest, and a cane. The cane can be surrounded by the armrest bracket, and can enable adjustment of the armrest bracket. The cane can enable coupling between the back frame bracket and the tube holder bracket. The attendant handle operating mechanism can optionally include at least one attendant handle stopper in contact with the attendant handle, and a first beam that can have a first beam first end and a first beam second end. The first beam second end can be movably coupled with one of the at least one attendant handle stoppers. The attendant handle operating mechanism can optionally include a second beam that can have a second beam first end and a second beam second end. The second beam second end can be movably coupled with one of the at least one attendant handle stoppers. The attendant handle operating mechanism can optionally include a central beam that can have a central beam first end and a central beam second end. The central beam first end can movably couple the first beam first end and the second beam first end. The movement of the attendant handle can be based at least on movement of the central beam. The seat assembly can optionally include a latch that can be operably coupled with the central beam second end. The latch can be disengaged from the central beam second end which can enable movement of the attendant handle. The latch being engaged with the central beam second end which can disable movement of the attendant handle. The backrest further can optionally include a frame housing the attendant handle operating mechanism. The backrest can optionally include a plate between the attendant handle operating mechanism and a backrest cushion.

BRIEF DESCRIPTION OF THE DRAWINGS

The present teachings will be more readily understood by reference to the following description, taken with the accompanying drawings, in which:

FIG. 1B-1 is a schematic perspective exploded diagram of the second configuration of the armrest and user controller of the present teachings;

FIG. 1B-2 is a schematic perspective exploded diagram of the second configuration of the seat assembly and user controller of the present teachings;

DETAILED DESCRIPTION

The seat features of the present teachings are discussed in detail herein in relation to a mobility device and other applications. However, various types of applications may take advantage of the seat features of the present teachings.

Figure 1:
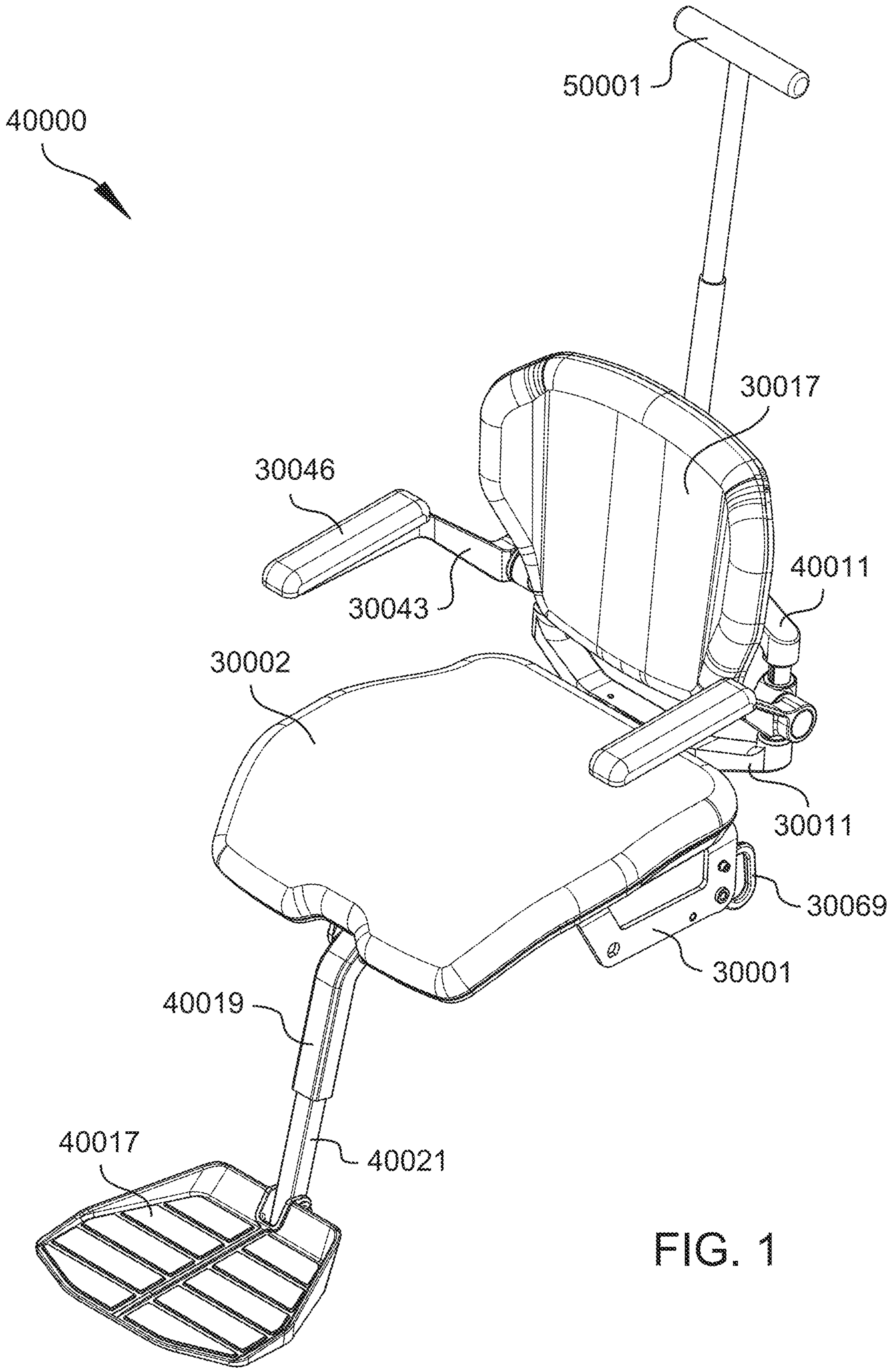
FIG. 1 is a schematic perspective diagram of the first configuration of the seat assembly of the present teachings.

Referring now to FIG. 1, seat assembly 40000 can be removably positioned upon a wheelchair base, for example, by use of the connecting features located on seatpan mounting bracket 30001. To provide comfort and security to the user, seat assembly 40000 can include first configuration footrest 40017, seat cushion 30002, backrest cushion 30017, and armrest cushions 30046. First configuration footrest 40017 can be mounted to height-adjustable first configuration bottom post 40021 and first configuration top post 40019. Seatpan mounting bracket 30001 can include tie down 30069 that can be used to secure the wheelchair and seat to, for example, an automobile seat belt. Seatpan mounting bracket 30001 can be coupled with rear tube holder bracket 30011 that can be coupled with first configuration top back frame bracket 40011. First configuration top back frame bracket 40011 can couple the seat back with attendant handle 50001.

Figure 1A:
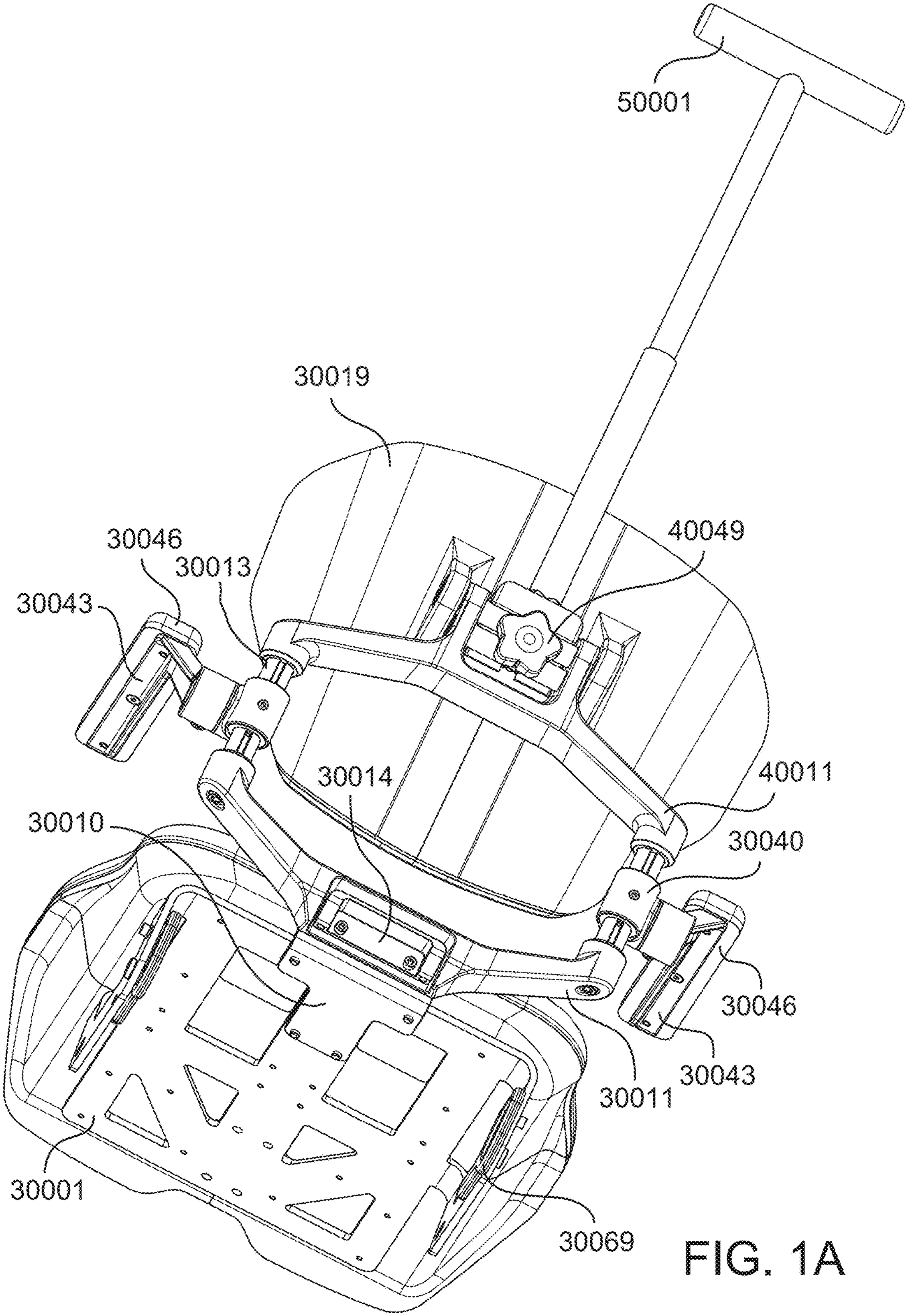
FIG. 1A is a schematic perspective diagram of the attachment bracket, seat back, and attendant handle of the first configuration of the seat assembly of the present teachings.
Figure 1B:
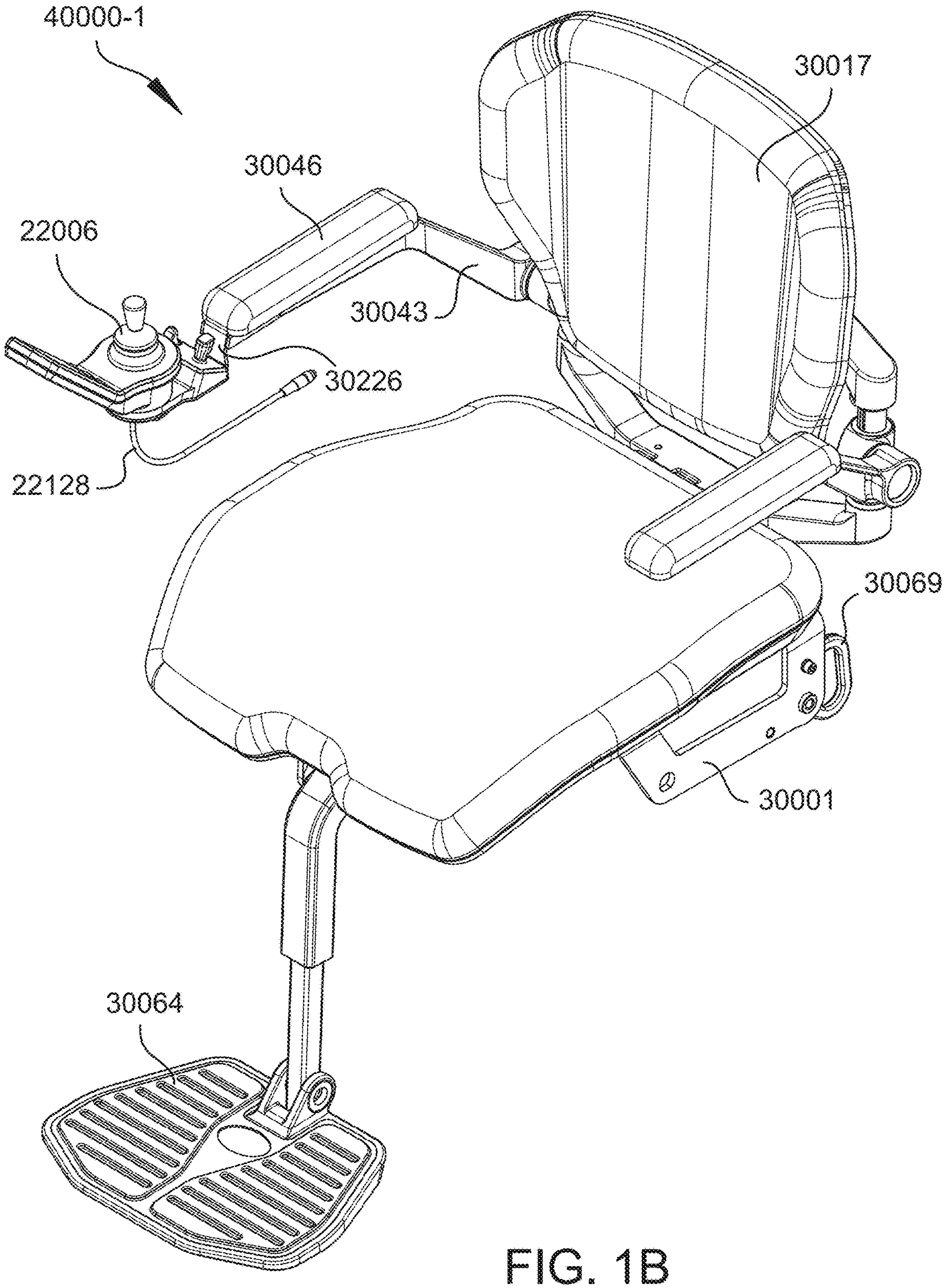
FIG. 1B is a schematic perspective front view diagram of the second configuration of the seat assembly of the present teachings.
Figures 1, 1B:
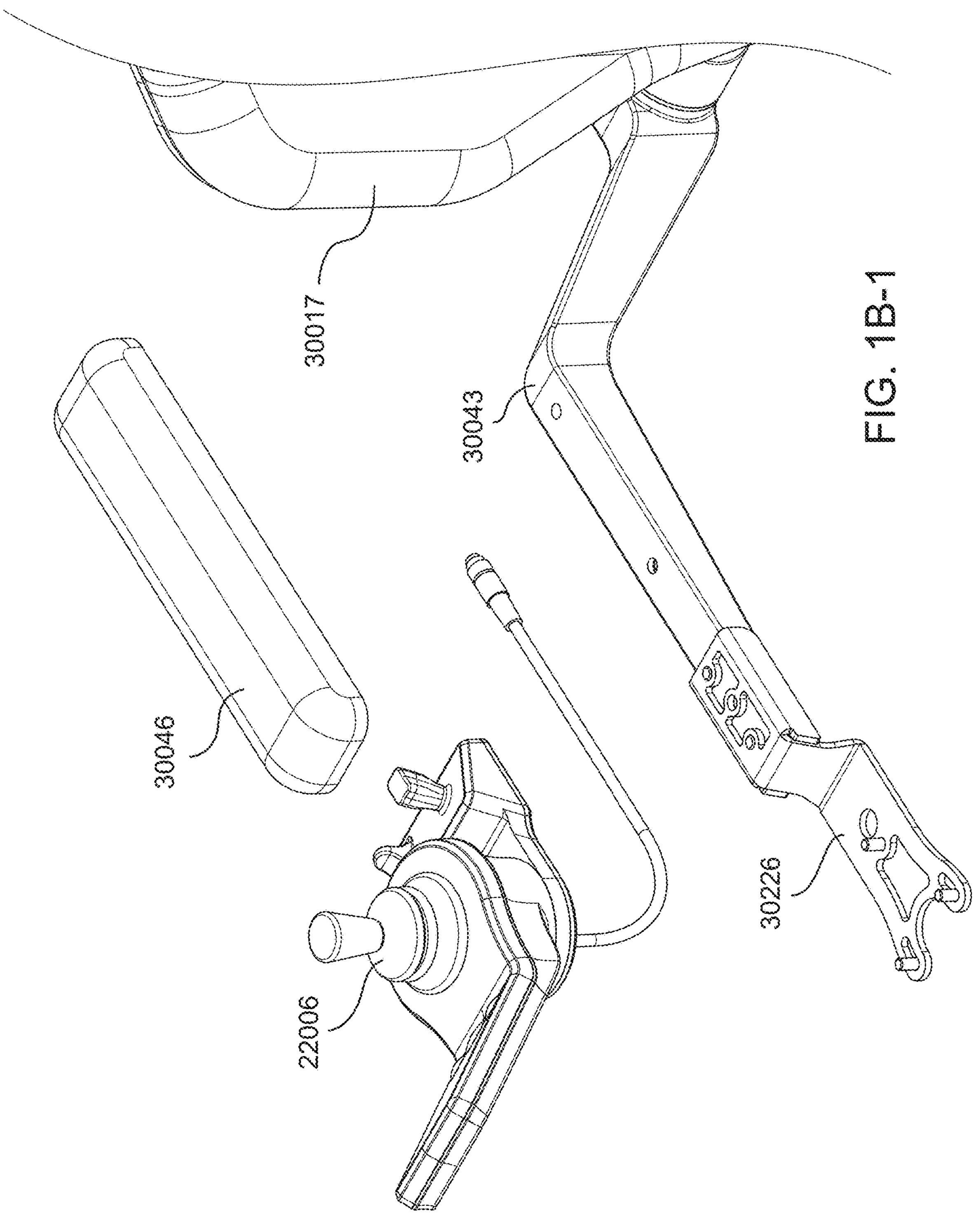
Figures 1, 1B, 2:
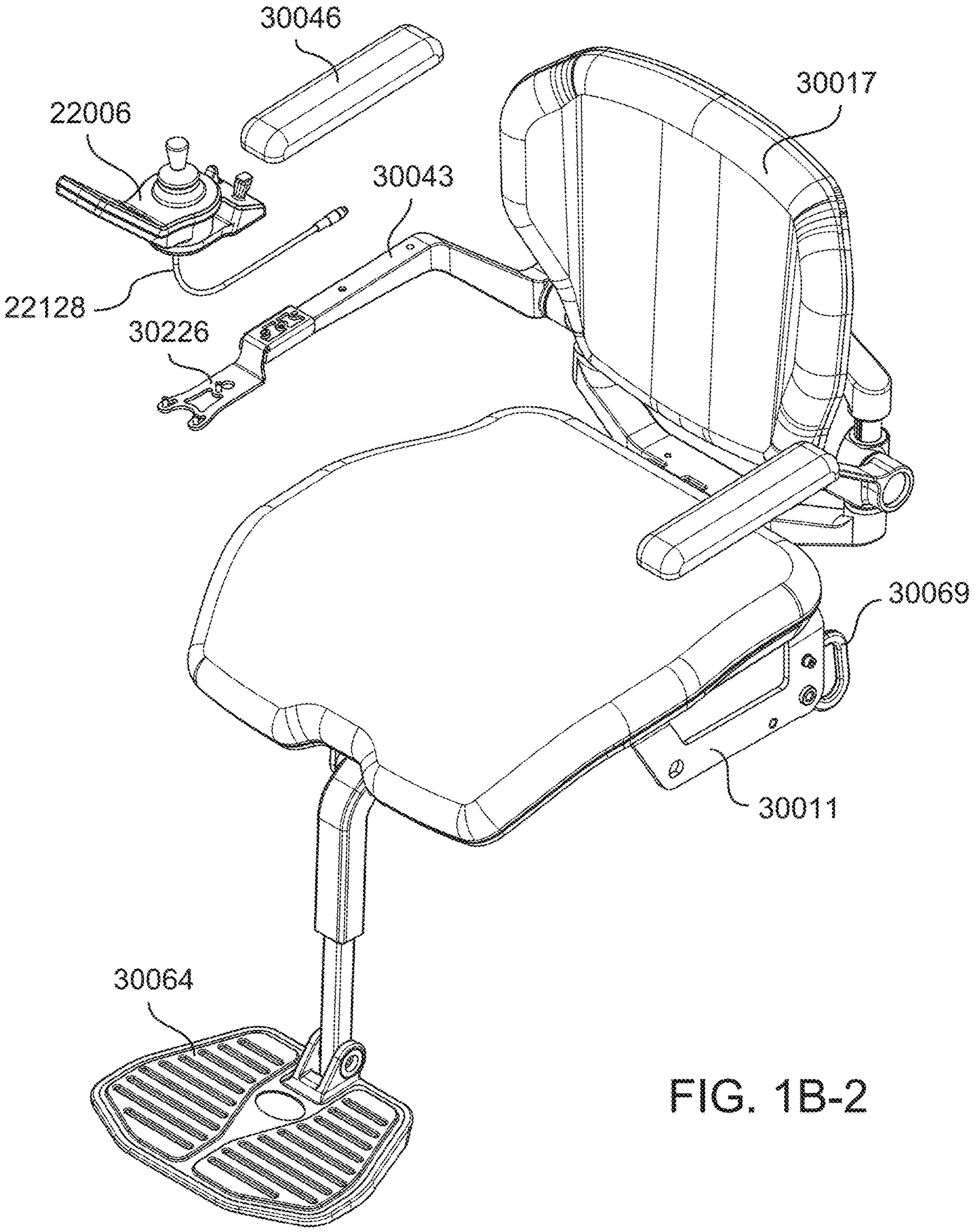
Figure 1C:
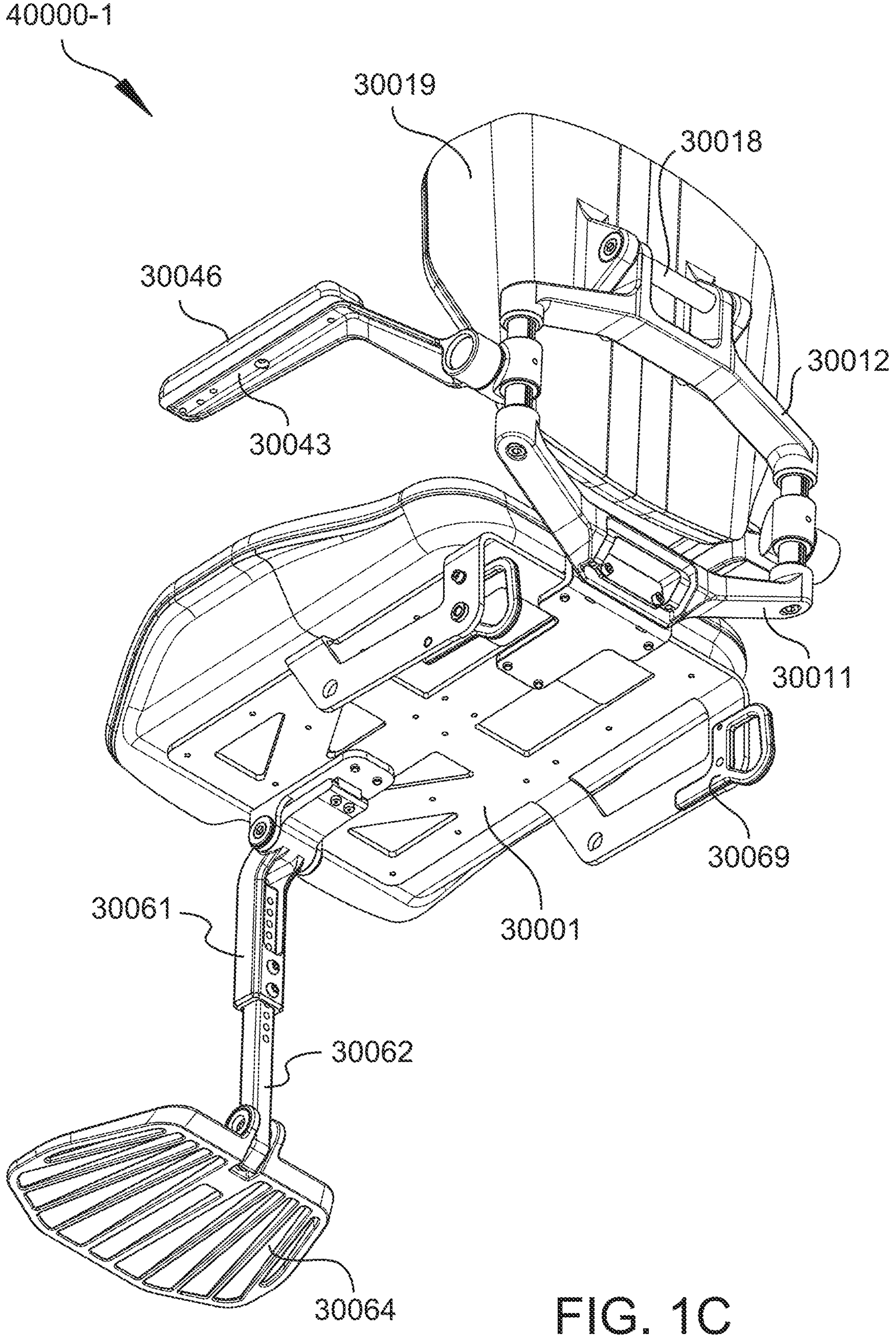
FIG. 1C is a schematic perspective rear view diagram of the second configuration of the seat assembly of the present teachings.
Figure 1D:
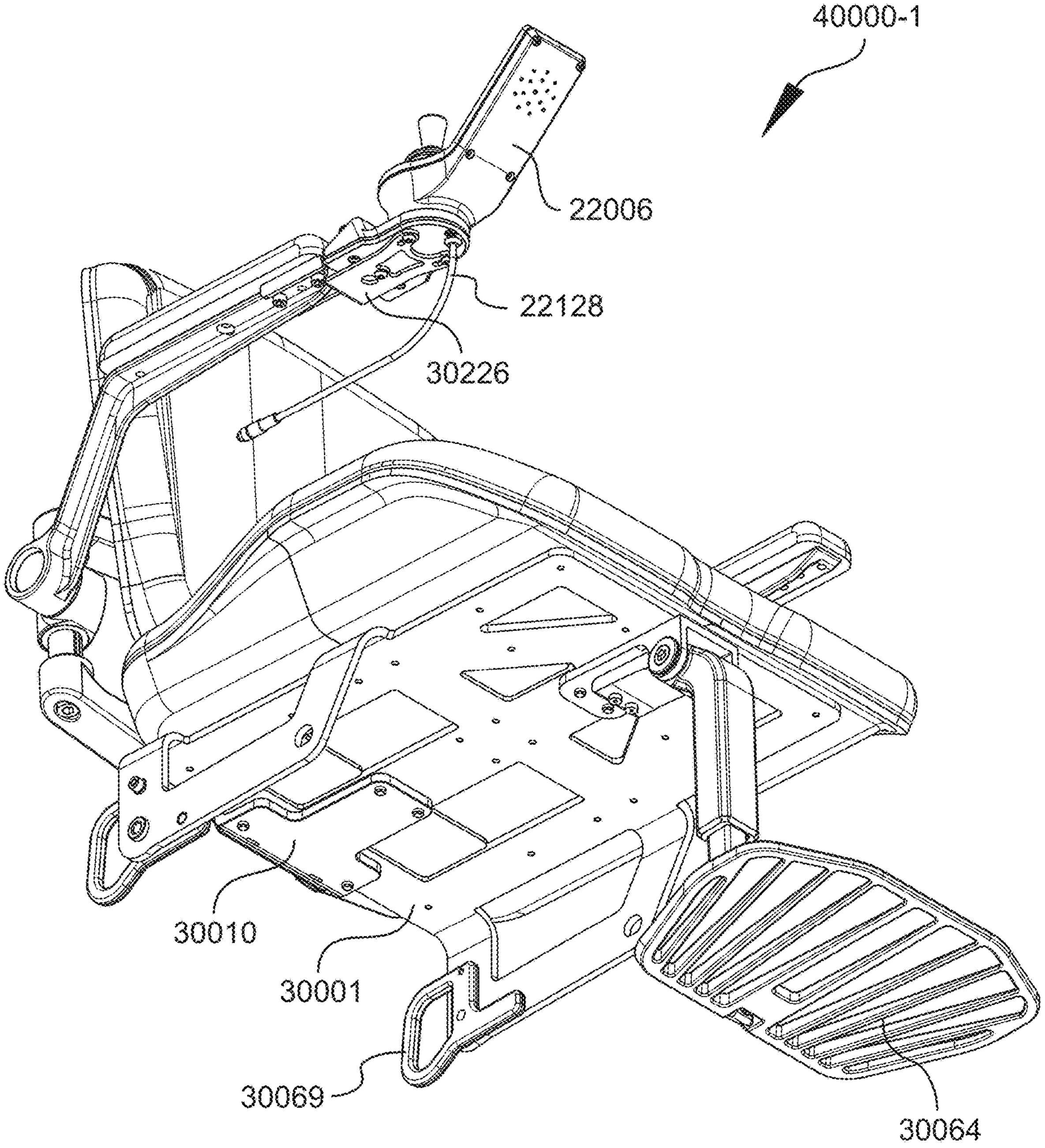
FIG. 1D is a schematic perspective undercarriage view diagram of the second configuration of the seat assembly of the present teachings.
Figure 1E:
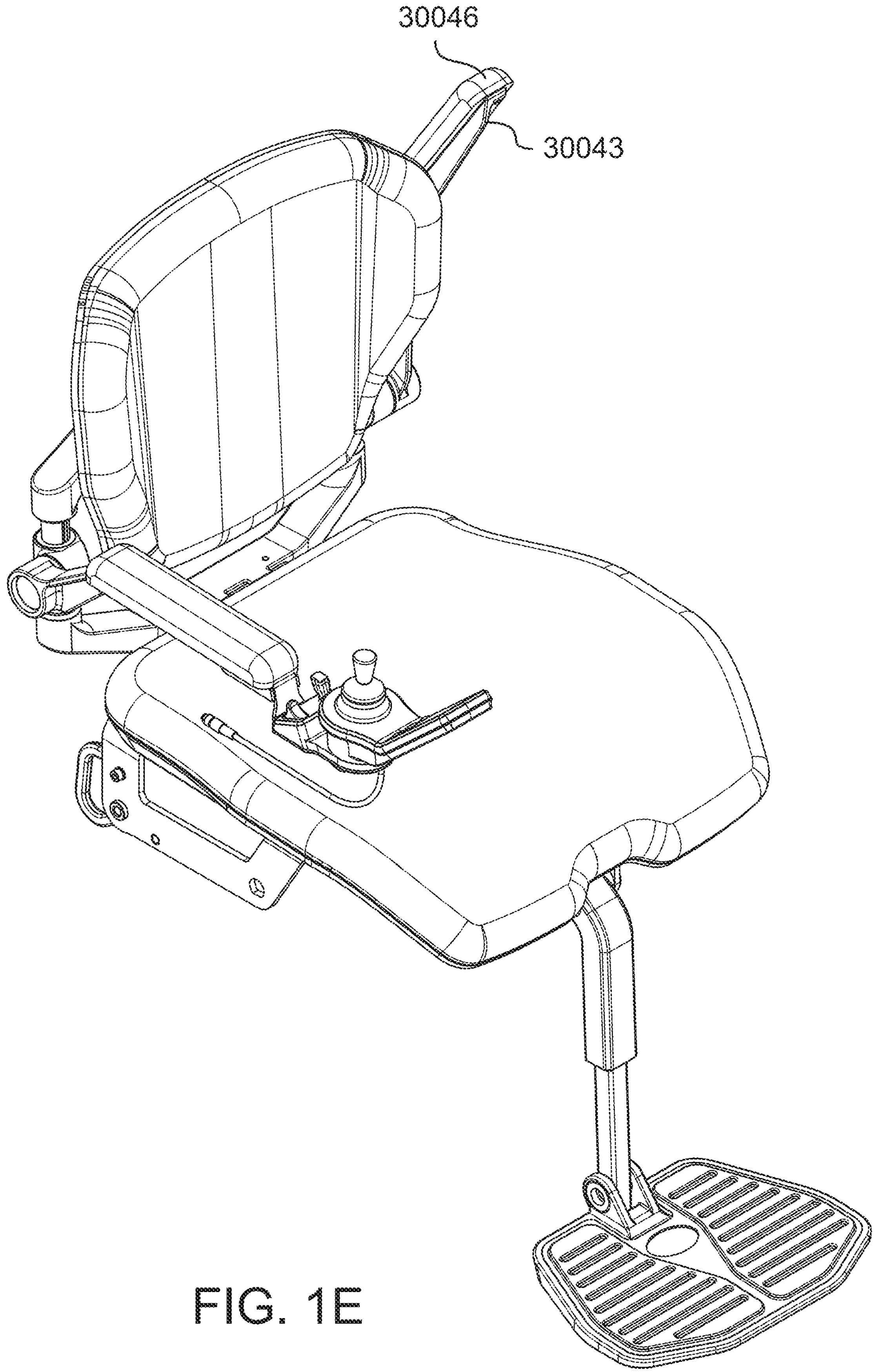
FIGS. 1E-1F are schematic perspective diagrams of the second configuration of the seat assembly of the present teachings with a rotated armrest.
Figure 1F:
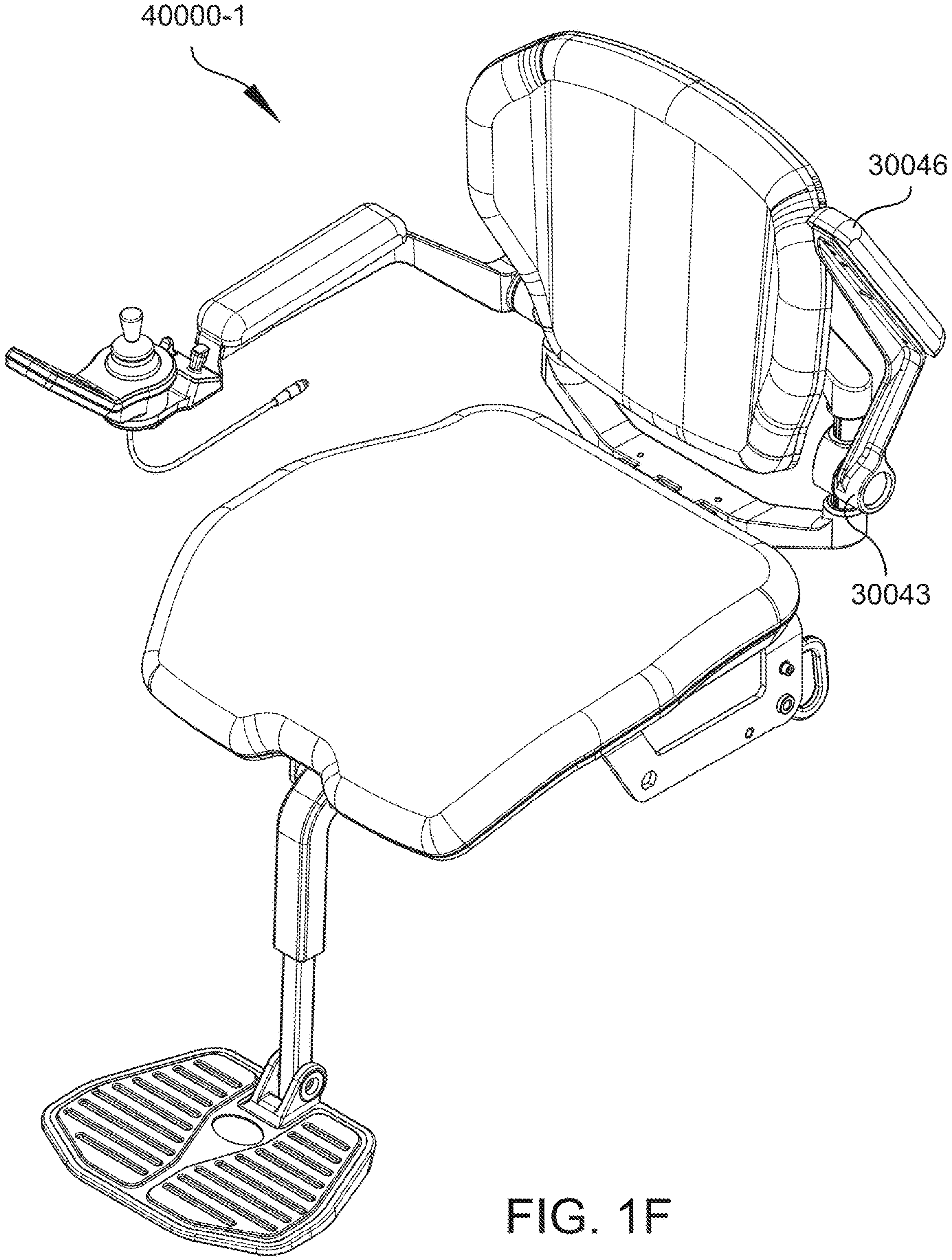

Referring now to FIG. 1A, seatpan mounting bracket 30001 can be coupled with rear tube holder bracket 30011 by fold hinge bracket 30010. The folding of backrest shell 30019 onto seat cushion 30002 can be enabled by applying pressure to fold handle 30014 engaging springs on guide pins. In some configurations, the angle of backrest shell 30019, and therefore backrest cushion 30017 (FIG. 1), can be adjusted by rotating backrest angle adjust knob 40049. In some configurations, the angle of backrest shell 30019 can be fixed and backrest angle adjust knob 40049 can be omitted. Adjustment of the height of armrest structures 30043, and therefore armrest cushions 30046, can be enabled by a combination of vertical back frame canes 30013 (FIG. 2A) (one for each armrest structure 30043) and armrest mount brackets 30040 (one for each armrest structure 30043).

Referring now to FIGS. 1B-1F, second configuration seat assembly 40000-1 can include, but is not limited to including, user controller attachment bracket 30226 that can securely attach user controller 22006 to armrest bracket 30043. User controller 22006 can include any desired shape, size, and functionality, and can be commercially available or custom-built. A joystick and/or toggles can be included. User controller 22006 can be operably coupled with a power base (not shown) by any desired means, including, but not limited to, by cable 22128, that can be routed so as not to interfere with the movement of seat assembly 40000-1. User controller attachment bracket 30226 can be operably coupled with either of armrest brackets 30043 or elsewhere as desired. Second configuration seat assembly 40000-1 can include footrest 30064 that can rotate towards second configuration lower footrest post 30062 when not in use. Second configuration lower footrest post 30062 can be positionally adjusted with respect to seat bracket 30001 to raise or lower second configuration footrest 30064. Second configuration lower footrest post 30062 can be attached, by any suitable means such as, for example, but not limited to, screws, bolts, hook-and-eye, and magnets, to second configuration upper footrest post 30061 according to the desired position of footrest 30064. Armrest structure 30043 (FIGS. 1E and 1F) can be rotated towards the backrest for user convenience and for streamlined transporting of the seat.

Referring now primarily to FIGS. 2A-2E, the seat, backrest, and arms of second configuration seat assembly 40000-1 can by operably coupled by second configuration top back frame bracket 30012, rear tube holder bracket 30011, and second configuration armrest mount bracket 30040. Second configuration armrest mount bracket 30040 can surround vertical back frame cane 30013 that can include a first end and a second end. The first end of vertical back frame cane 30013 can engage rear tube holder bracket 30011, and the second end of vertical back frame cane 30013 can engage second configuration top back frame bracket 30012. Vertical back frame cane 30013 can be secured between top back frame bracket 30012 and rear tube holder bracket 30011 by bolt 40000-10. Bushings 40014-3 can surround second configuration armrest mount bracket 30040 as it slides up and down along vertical back frame cane 30013. Second configuration armrest mount bracket 30040 can enable both adjustment of the height of the armrest and the rotation of the armrest towards the backrest. Height adjustment of armrest structure 30043 can be accomplished by a push button action of armrest height adjustment button 30045 by the user. Armrest narrow flanged bushing 40014-2, armrest wide flanged bushing 40014-1, and armrest nut with hole 30044 can operably couple armrest structure 30043 with armrest mount bracket 30040 and armrest height adjustment button 30045 through, for example, but not limited to, a threaded coupling. Armrest mount bracket 30040 can operably couple armrest structure 30043 with vertical back frame cane 30013 that can operably couple armrest structure 30043 with rear tube holder bracket 30011 and second configuration top back frame bracket 30012. Within armrest mount bracket 30040 are components that can enable height adjustment of armrest structure 30043. The components can include, but are not limited to including, button transition rod 40011-1 that can operably couple armrest height adjustment button 30045 with button slide 30042. Button transition rod 40011-1 can achieve aligned coupling with button slide 30042 through its placement in button slide cavity 40061-3 (FIG. 7I). Button slide 30042 can control the release of the current position of armrest structure 30043 by positionally interacting with male lock pin 30041-1. Male lock pin 30041-1 and female lock pin 30041-2 can cooperatively engage with vertical back frame cane 30013 to establish the height of the armrest. Button slide 30042 can respond to a depression of button 30045 by disengaging male/female lock pins 30041-1/2 from vertical back frame cane 30013 to allow second configuration armrest mount bracket 30040 to slide along vertical back frame cane 30013. When armrest height adjust button 30045 is depressed, button slide 30042 is depressed, moving button slide lock position 40061-1 (FIG. 7I) and releasing the lock on armrest structure 30043 enabled by the contact between button slide lock position 40061-1 (FIG. 7I) and male lock pin 30041-1. As button slide 30042 is depressed, button slide open position 40061-3 (FIG. 7I) can become aligned with male lock pin 30041-1, and can enable male lock pin 30041-1 and female lock pin 30041-1 to retreat from back frame cane cavity 40025-2 (FIG. 7J), releasing the lock on the position of armrest structure 30043 and allowing armrest mount bracket 30040 to slide in channel 40025-1 (FIG. 7J). Armrest mount bracket 30040 can be provide a low-friction sliding surface between vertical back frame cane 30013 and armrest mount bracket 30040. Spring arm mechanism 40017 can enable the return of button 30045 to engaged position with respect to button slide 30042, male lock pin 30041-1, and female lock pin 30041-1. In some configurations, adjustment screw 40025-3 (FIG. 7K) can be used to bolt armrest structure 30043 to vertical back frame cane 30013.

Figure 2A:
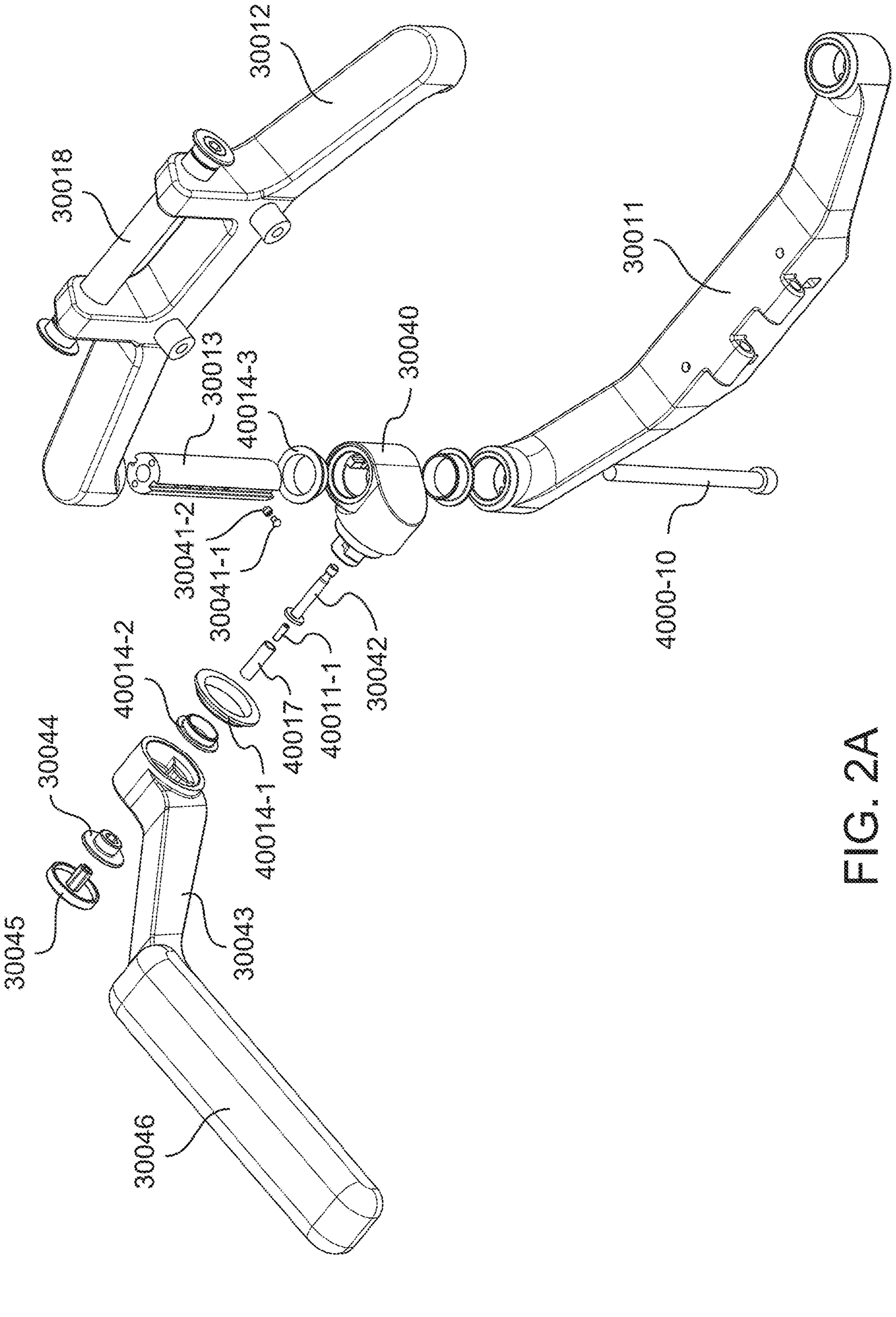
FIG. 2A is a schematic perspective exploded first view diagram of the connection features of the second configuration of the seat assembly of the present teachings.
Figure 2B:
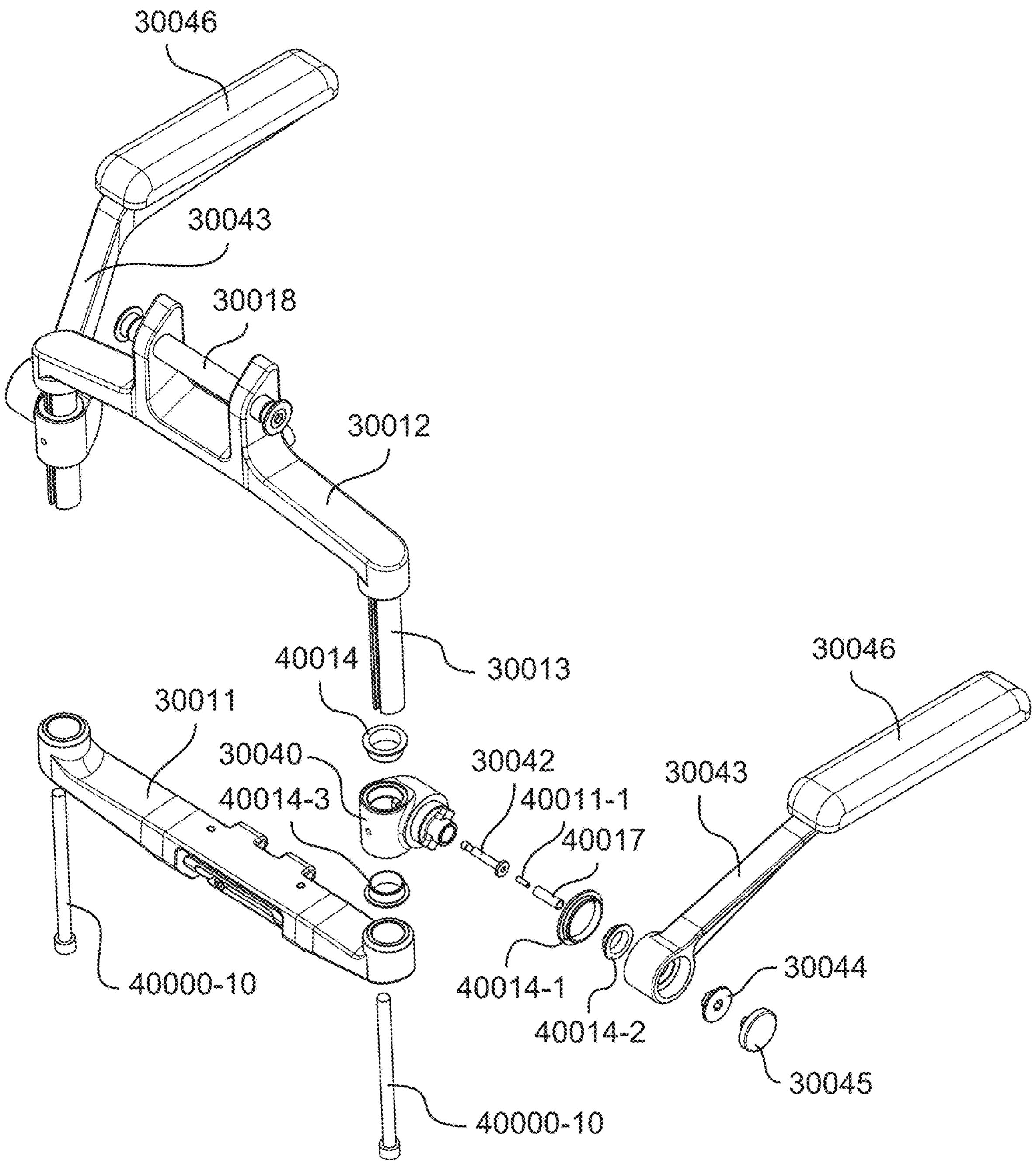
FIG. 2B is a schematic perspective exploded second view diagram of the connection features of the second configuration of the seat assembly of the present teachings.
Figure 2C:
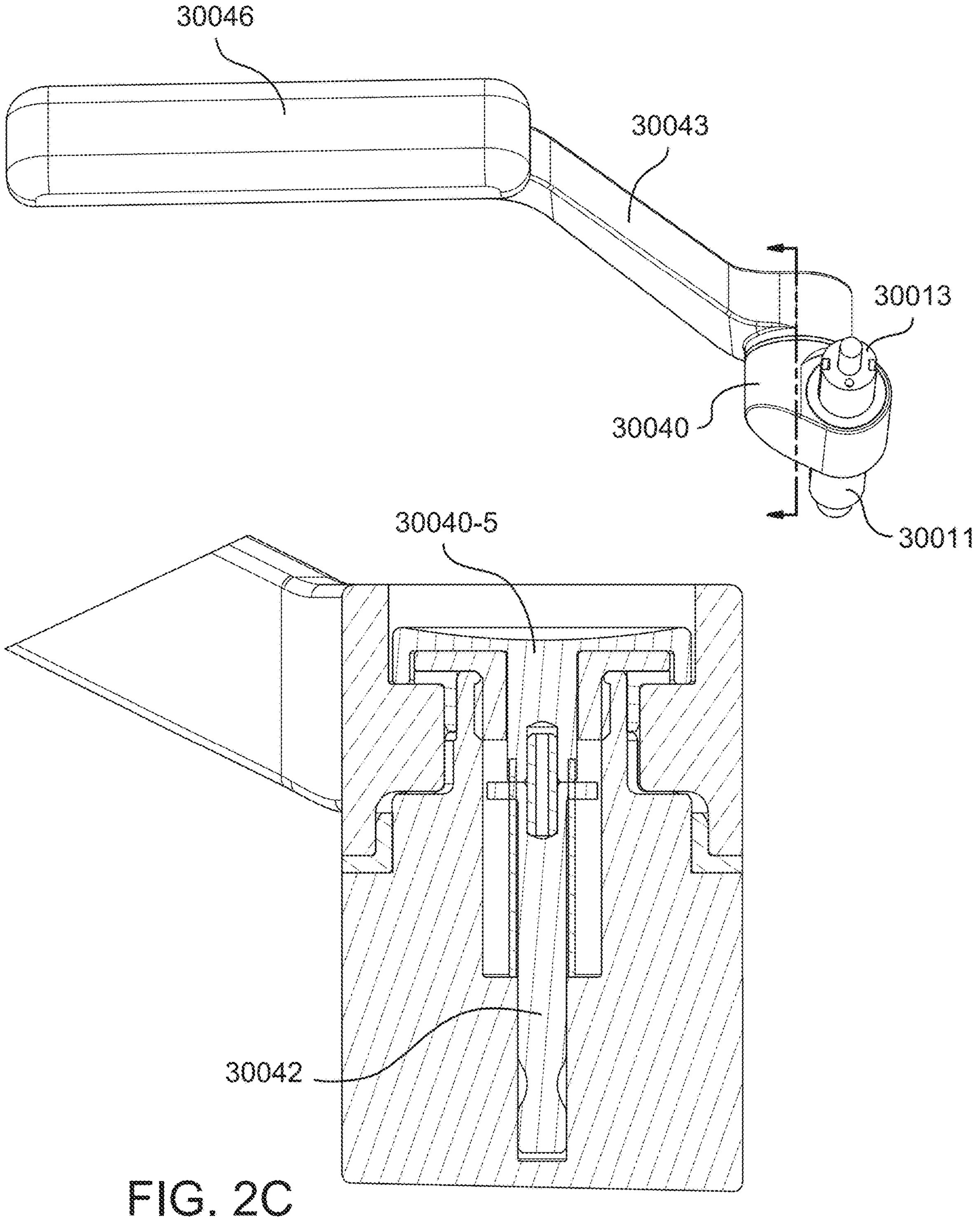
FIGS. 2C-2E are cross section diagrams of the second configuration of the armrest mount bracket operably coupled with the armrest and vertical back frame cane of the present teachings.
Figure 2D:
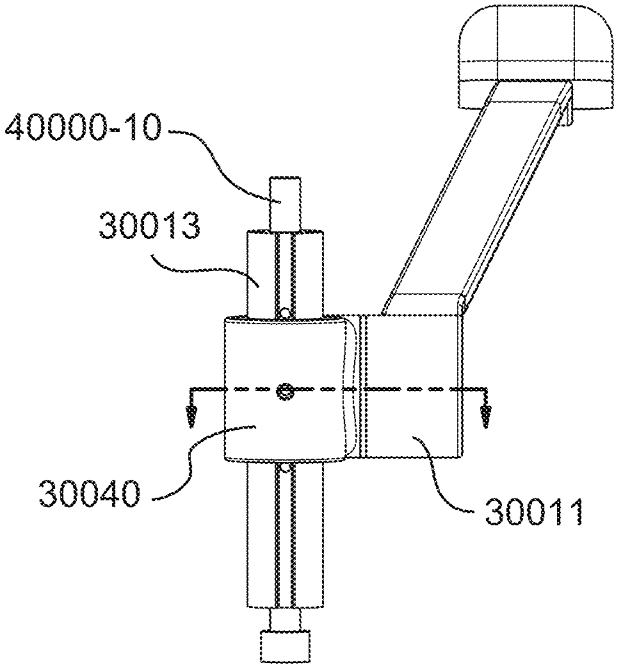
Figure 2D:
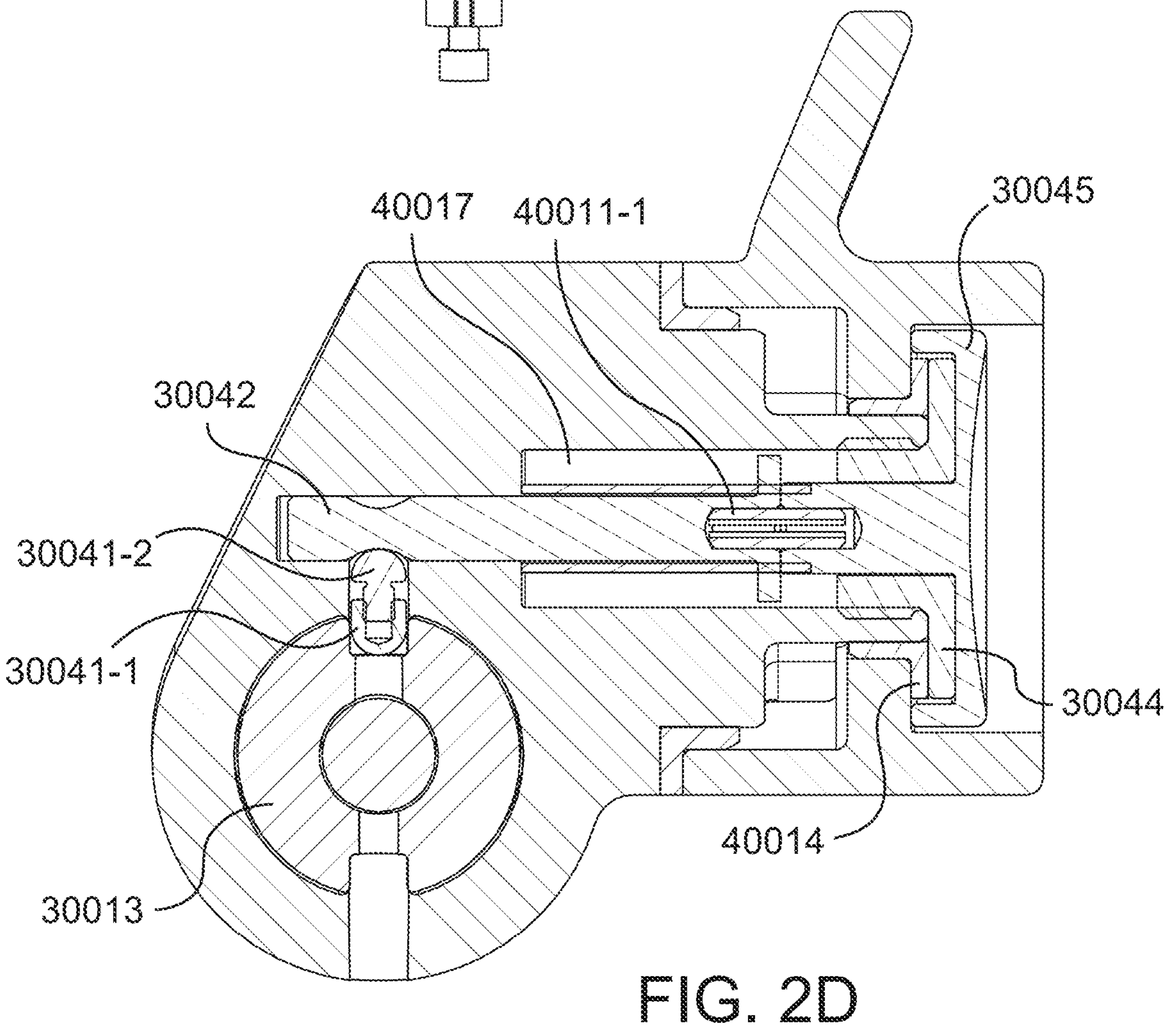
Figure 2E:
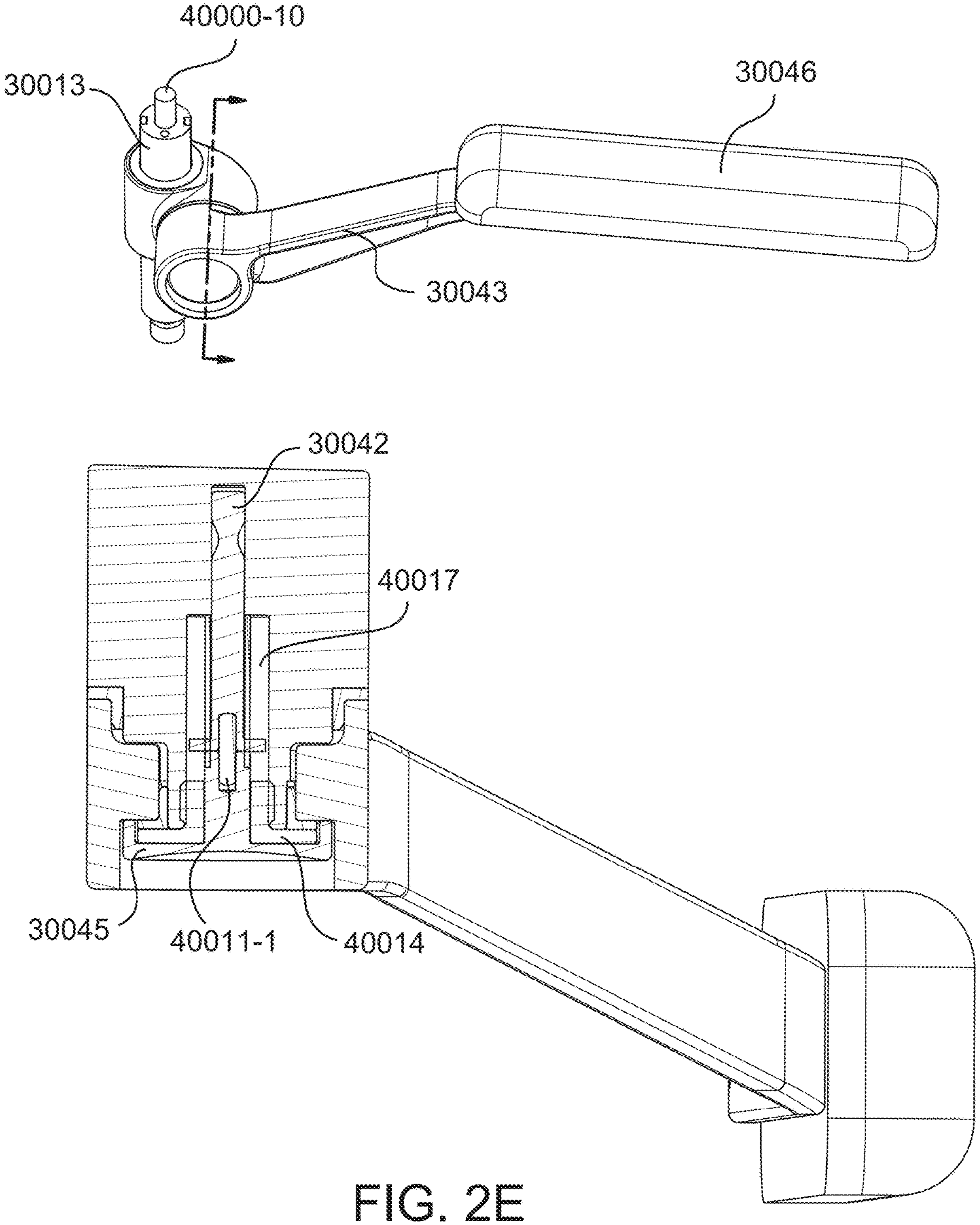
Figure 2F:
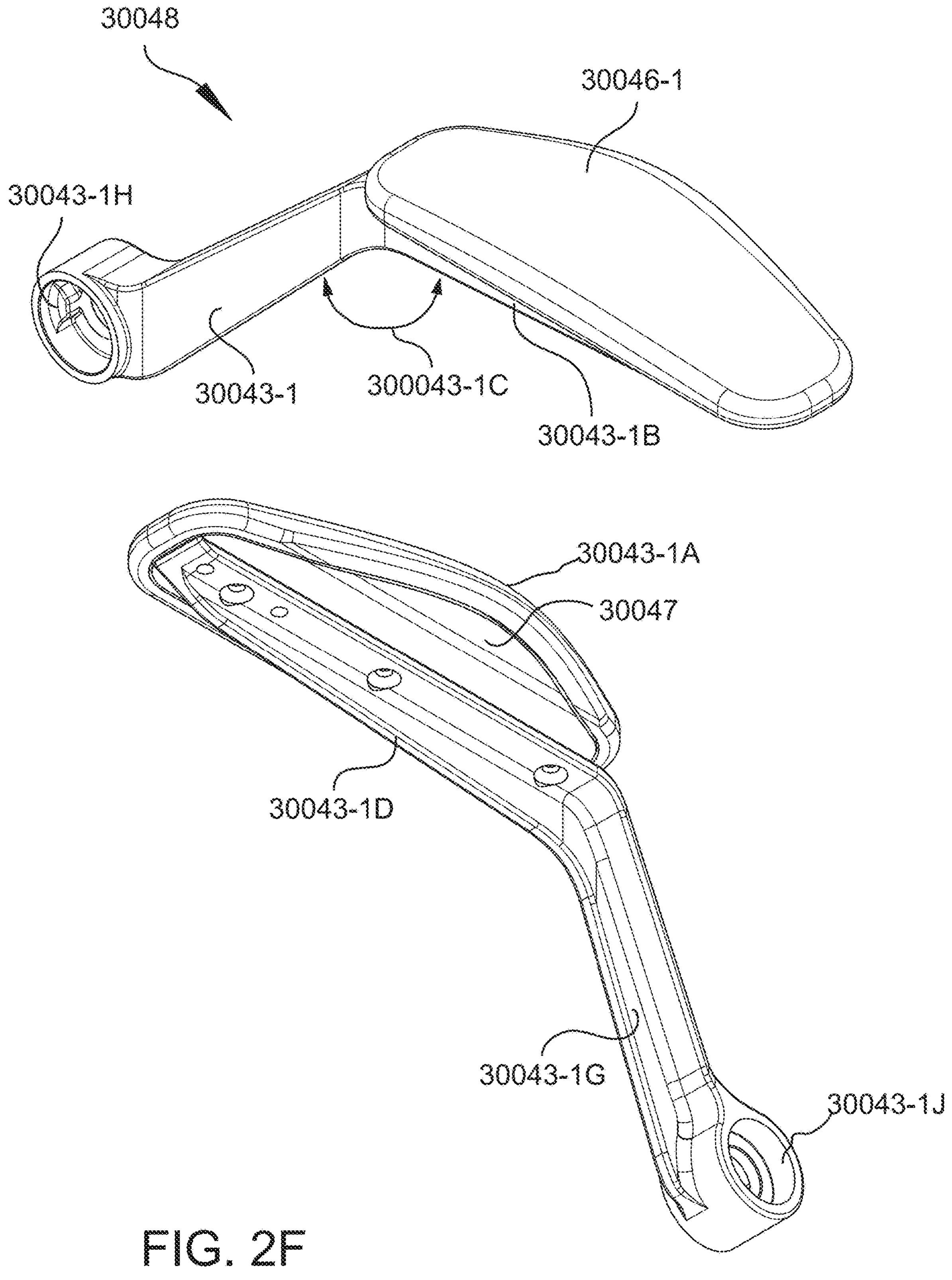
FIG. 2F is a schematic perspective diagram of the second configuration armrest of the present teachings.
Figure 2G:
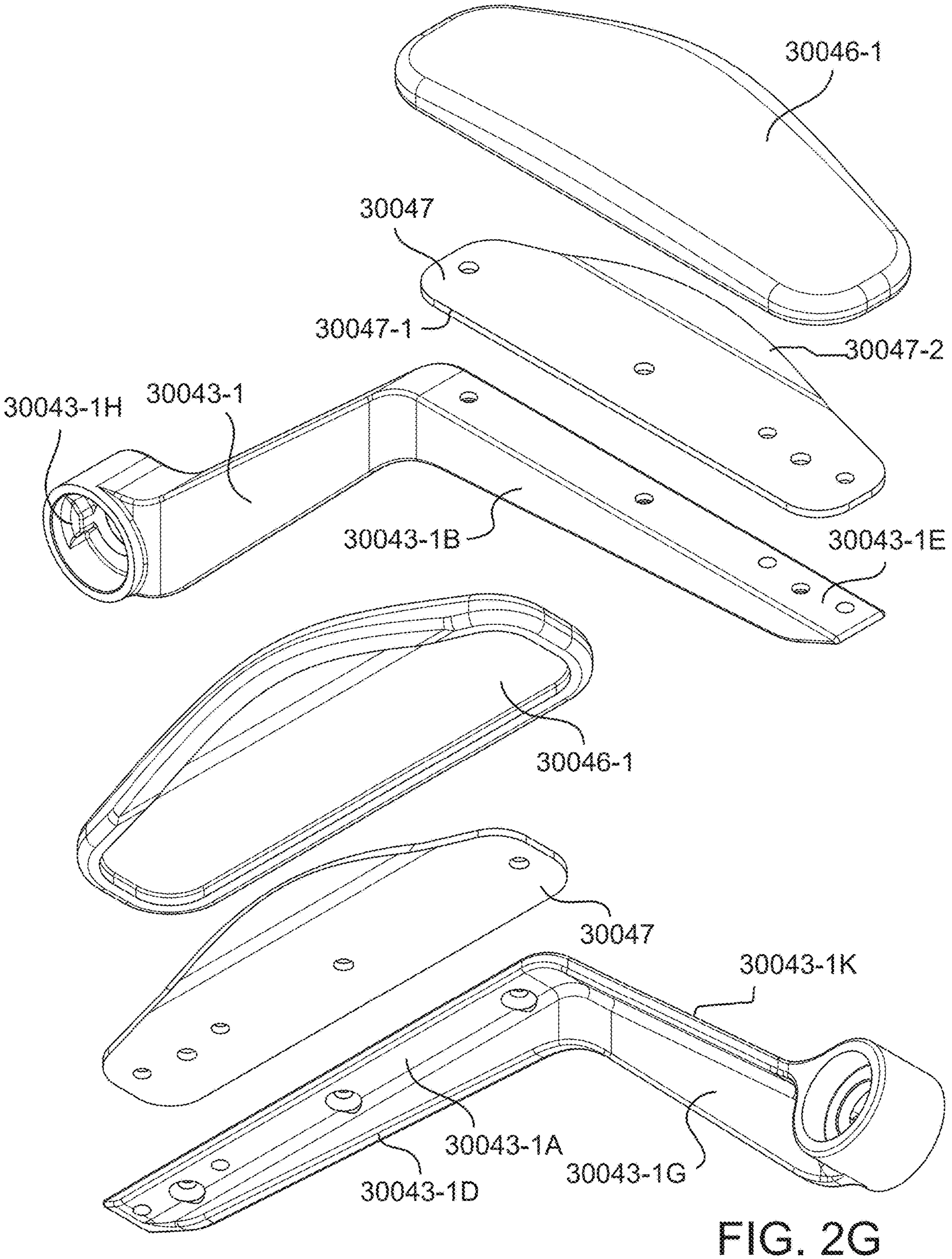
FIG. 2G is a schematic perspective exploded diagram of the second configuration armrest of the present teachings.

Referring now to FIGS. 2F-2G, second configuration armrest 30048 can be operably coupled with armrest mount bracket 30040 (FIG. 2A) in the same way as has been described herein. Second configuration armrest 30048 can include second configuration armrest structure 30043-1, armrest shell 30047, and second configuration armrest cushion 30046-1. Second configuration armrest structure 30043-1 can include curvature 30043-1C that can enable positional accommodation during use of second configuration armrest 30048. Second configuration armrest structure 30043-1 can include a support structure that can taper with respect to curvature 30043-1C, relatively smaller support structure 30043-1D being associated with armrest shell interface 30043-1E, and relatively larger support structure 30043-1G being associated with area 30043-1K between armrest shell interface 30043-1E and armrest mount bracket interface 30043-1J. The support structure can provide stable resistance to pressure placed upon armrest shell interface 30043-1E. The support structure can be continuous or discontinuous, and can be constructed of the same or different material from armrest shell interface 30043-1E. Second configuration armrest structure 30043-1 can include rotation stops 30043-1H that can maintain the rotation of second configuration armrest 30048 within a preselected number of degrees. Armrest shell 30047 can be situated between second configuration armrest structure 30043-1 and second configuration armrest cushion 30046-1. Armrest shell 30047 can include structure interface 30047-1 that can be operably coupled to second configuration armrest structure 30043-1 and second configuration armrest cushion 30046-1, and can include cushion interface 30047-2 that can be operably coupled to second configuration armrest cushion 30046-1. Armrest shell 30047 can decouple the geometry of second configuration armrest structure 30043-1 from the geometry of second configuration armrest cushion 30046-1 by providing a mounting platform for second configuration armrest cushion 30046-1. Thus the geometry of second configuration armrest structure 30043-1 can remain fixed while the geometry of second configuration armrest cushion 30046-1 can vary based on user preference and need. Armrest cushion 30046-1 can include, for example, relatively narrower edge 30043-1B that can cooperatively, with relatively wider edge 30043-1A, accommodate arm comfort while maintaining space for the torso in the seat assembly. Armrest cushion 30046-1 can thus be contoured to accommodate the arm's geometry, and can be attached to armrest shell 30047 by any suitable fastening means such as, for example, but not limited to, glue, magnets, screws, bolts, and hook-and-eye fasteners. Armrest shell 30047 can be attached to second configuration armrest structure 30043-1 by any suitable means as well.

Figure 3A:
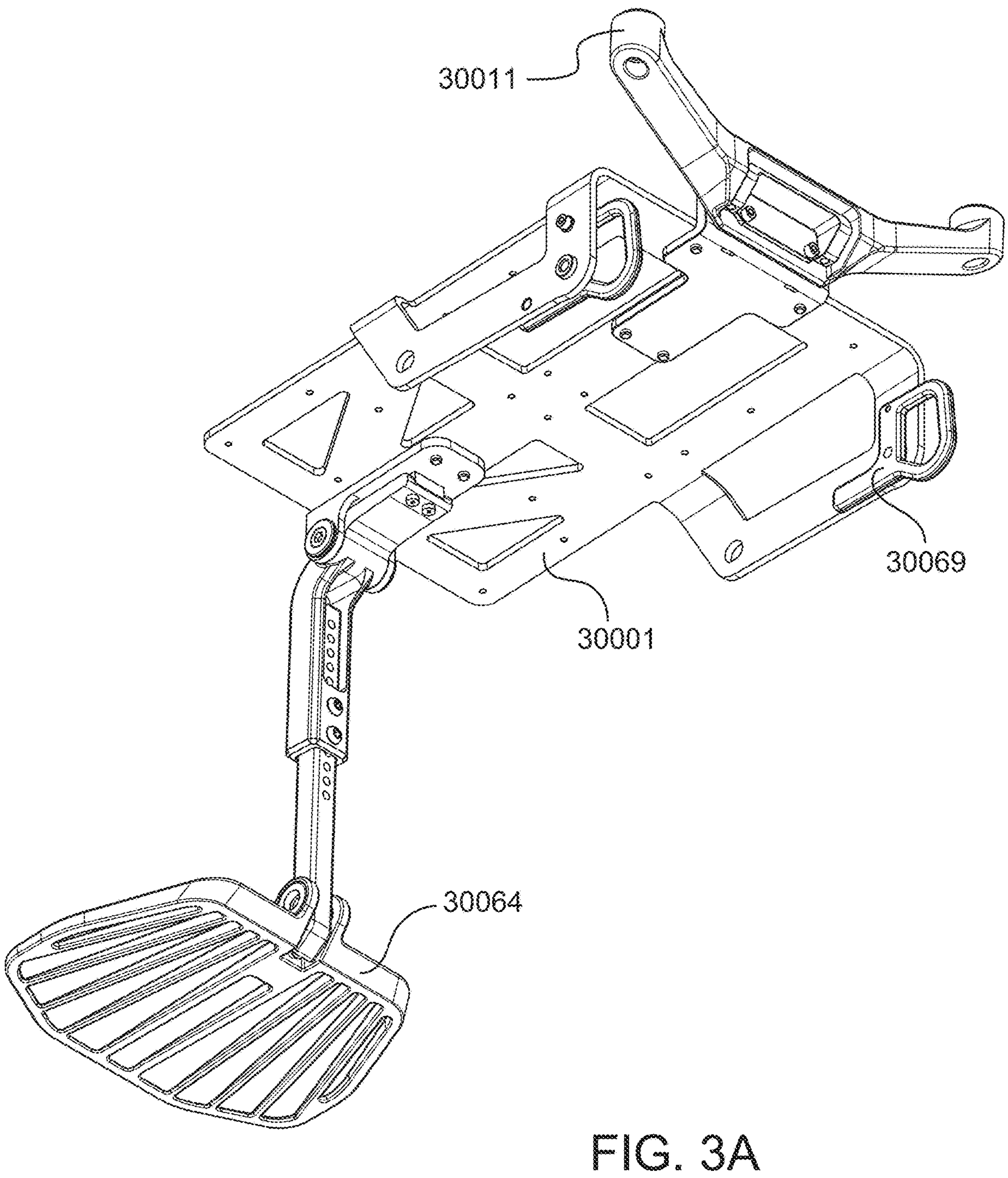
FIG. 3A is a schematic perspective undercarriage diagram of the seat bracket, footrest, and rear bracket of the second configuration of the seat assembly of the present teachings.
Figure 3B:
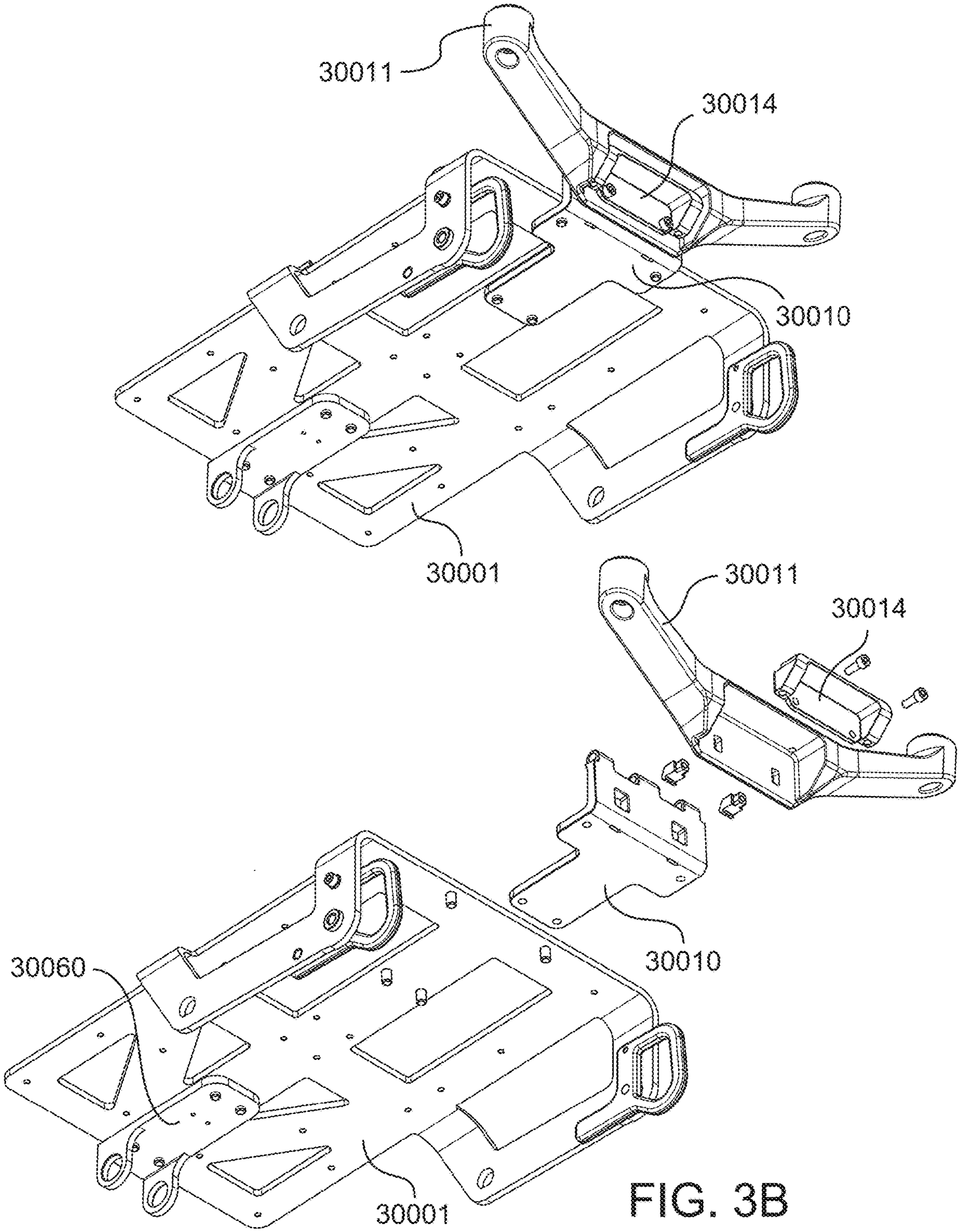
FIG. 3B is a schematic perspective exploded diagram of the seat bracket, bracket fold hinge, and rear bracket of the second configuration of the seat assembly of the present teachings.
Figure 4A:
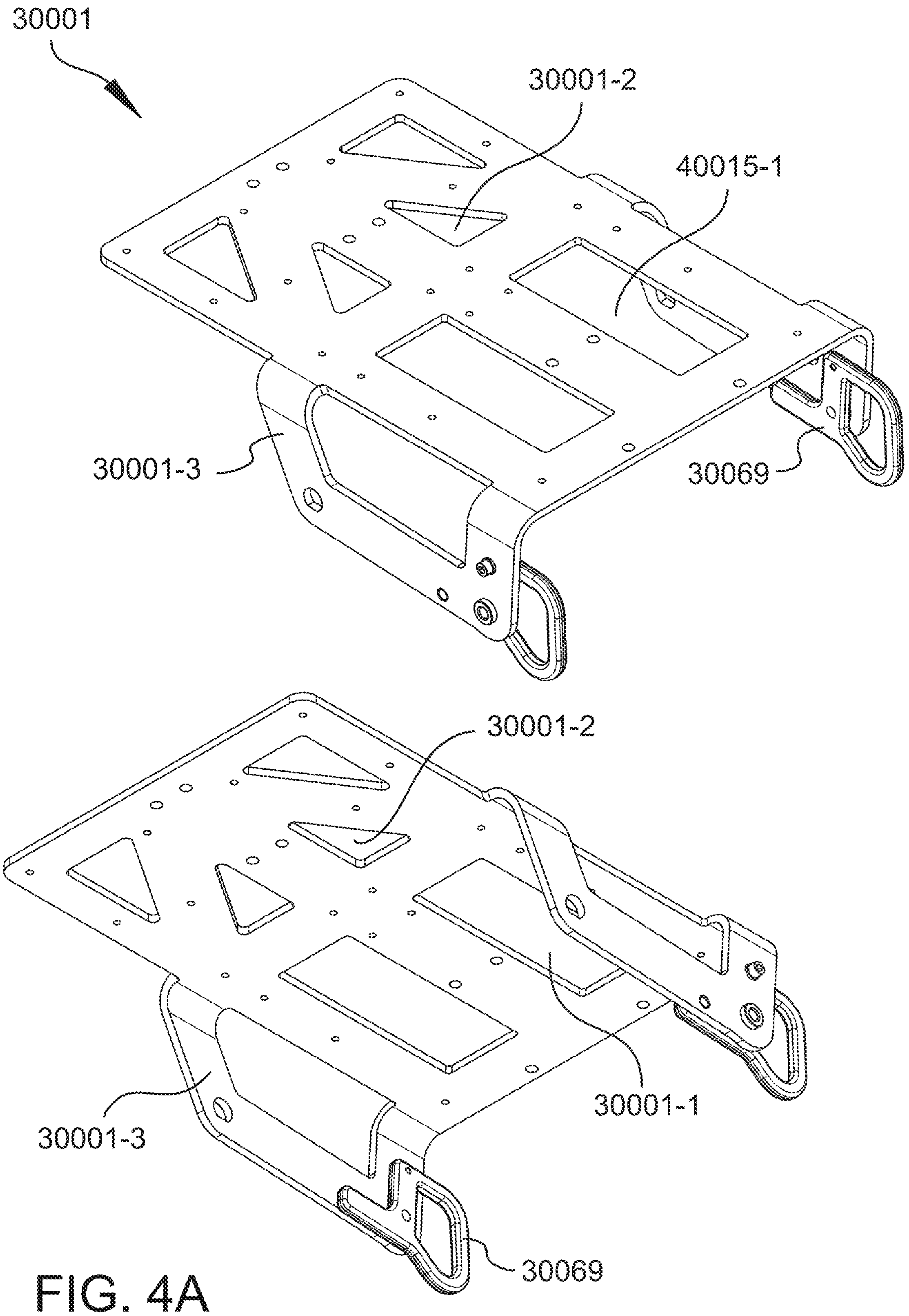
FIG. 4A is a schematic perspective diagram of the seatpan mounting bracket of the present teachings.

Referring now to FIGS. 3A, 3B, and 4A, seatpan bracket 30001 can operably couple footrest 30064 with rear tube holder bracket 30011. Seatpan bracket 30001 can include mounting points for at least one vehicle tie down 30069, fold hinge bracket 30010, and footrest mount bracket 30060 (FIG. 3B). Fold hinge bracket 30010 can enable secure mounting of rear tube holder bracket 30011 that can enable folding of the backrest towards seatpan bracket 30001 when fold handle 30014 is shifted. Seatpan bracket 30001 can include seatpan alignment cavities 30001-2 (FIG. 4A) and 30001-1 (FIG. 4A) that can matingly align seatpan bracket 30001 with seat shell 30000 (FIG. 4I). Seatpan wings 30001-3 (FIG. 4A) can enable operable coupling of seatpan bracket 30001 with a seat mounting device (not shown) such as, for example, but not limited to, a powerbase for a motorized wheelchair.

Figure 4B:
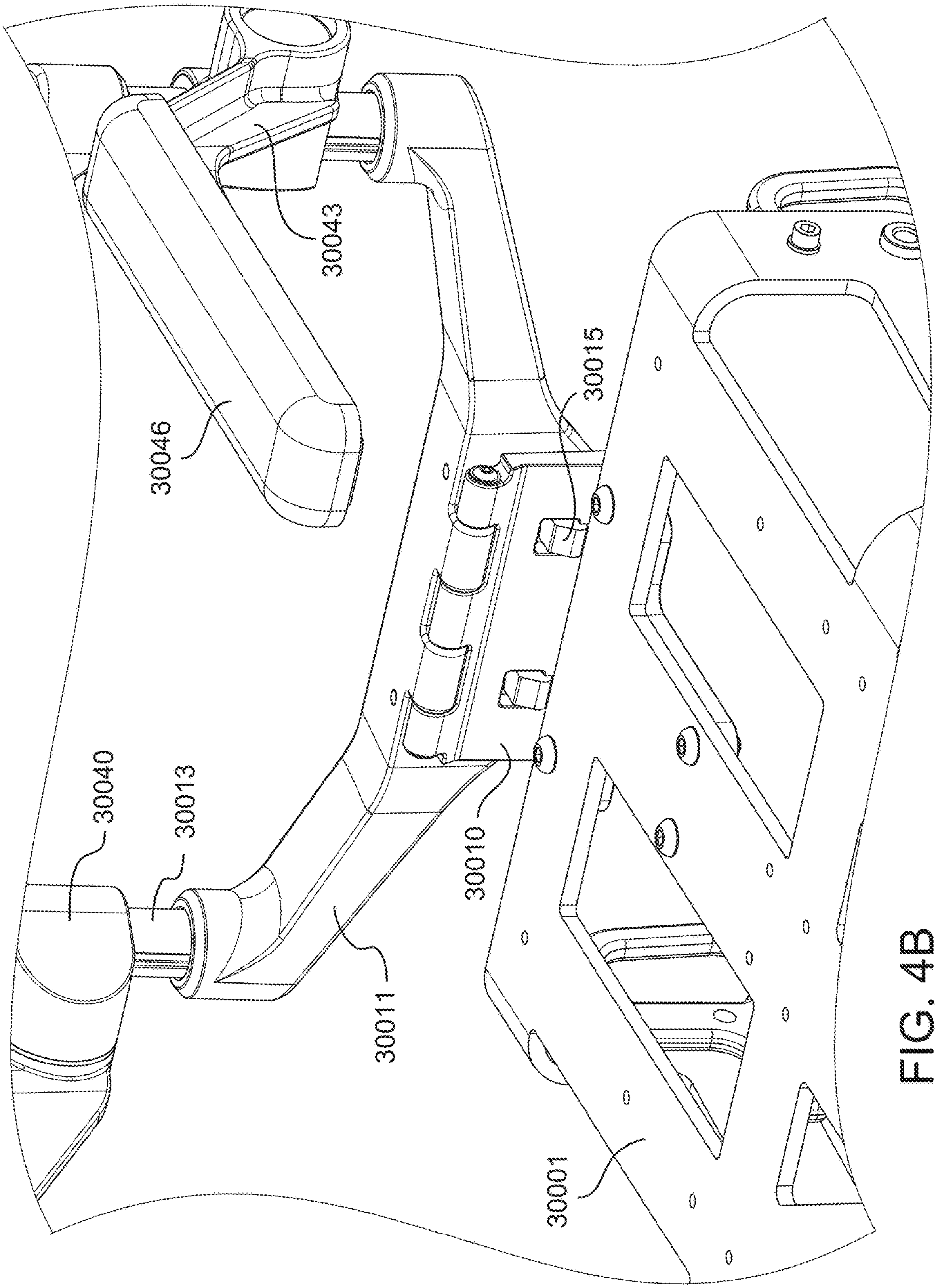
FIG. 4B is a schematic perspective detailed diagram of the seat bracket, bracket fold hinge, and rear bracket of the second configuration of the seat assembly of the present teachings.
Figure 4C:
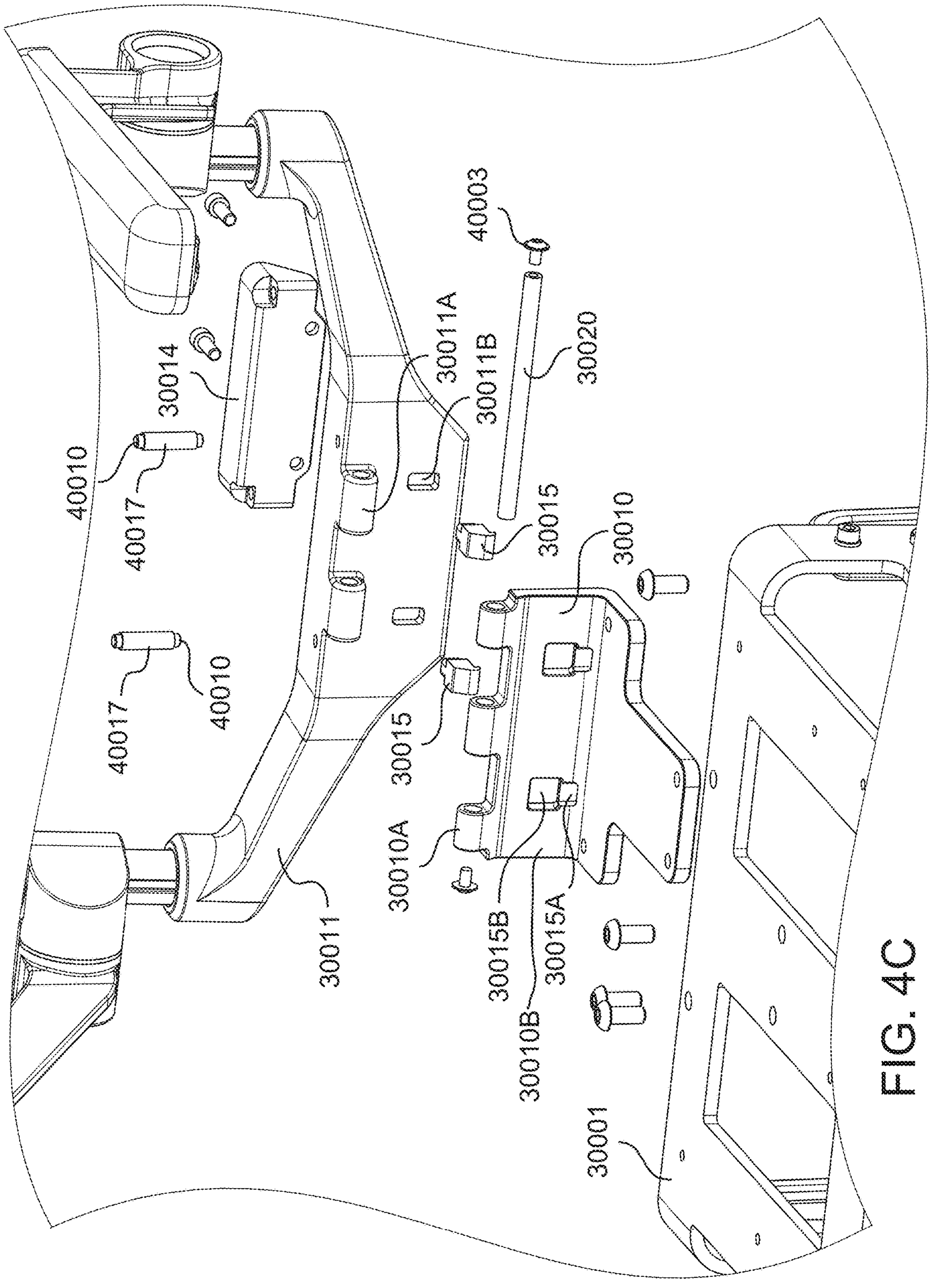
FIG. 4C is a schematic perspective detailed exploded diagram of the seat bracket, bracket fold hinge, and rear bracket of the second configuration of the seat assembly of the present teachings.
Figure 4D:
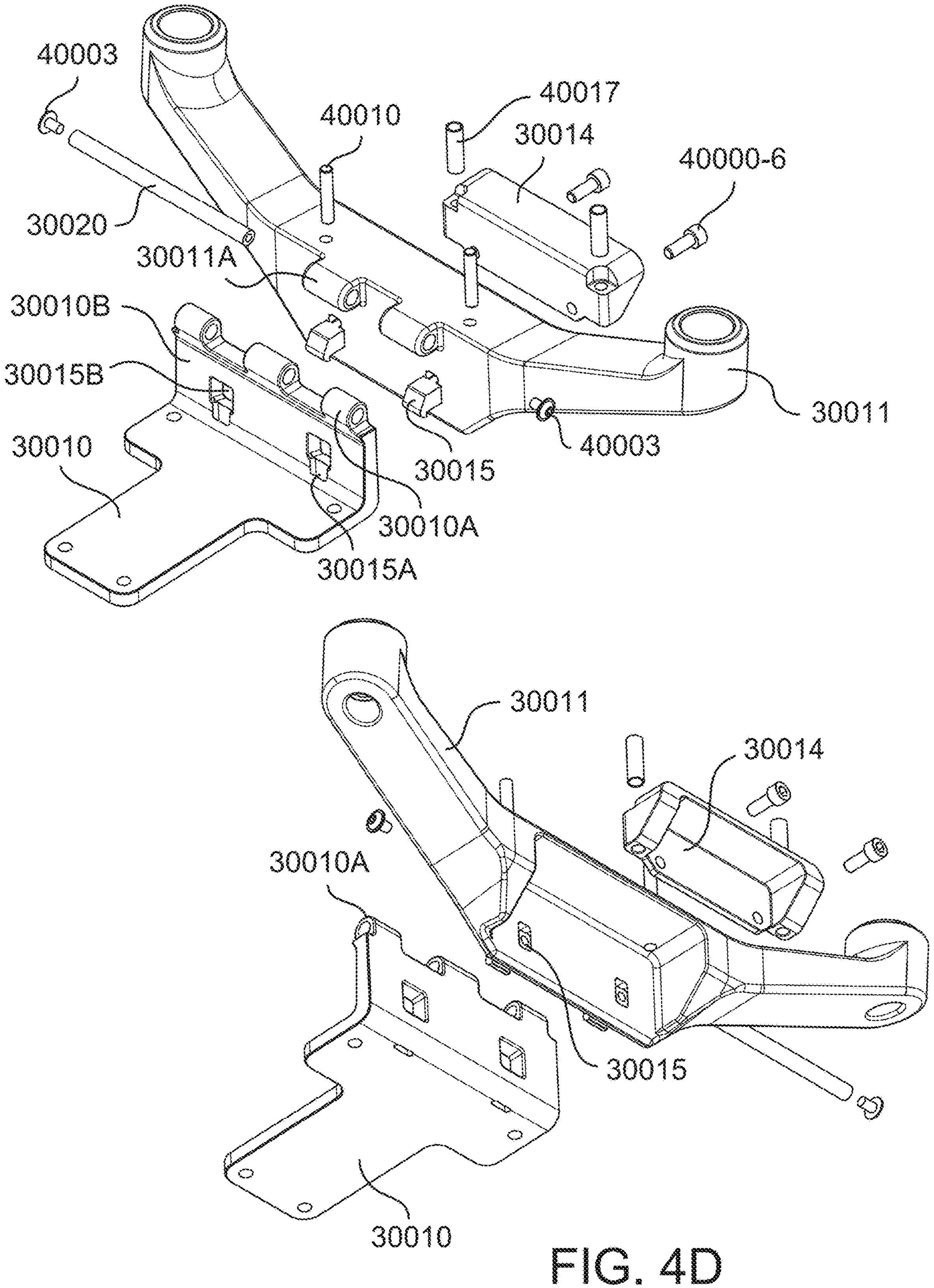
FIG. 4D is a schematic perspective exploded diagram of the connecting bracket, rear bracket, and release handle of the second configuration of the seat assembly of the present teachings.
Figure 4E:
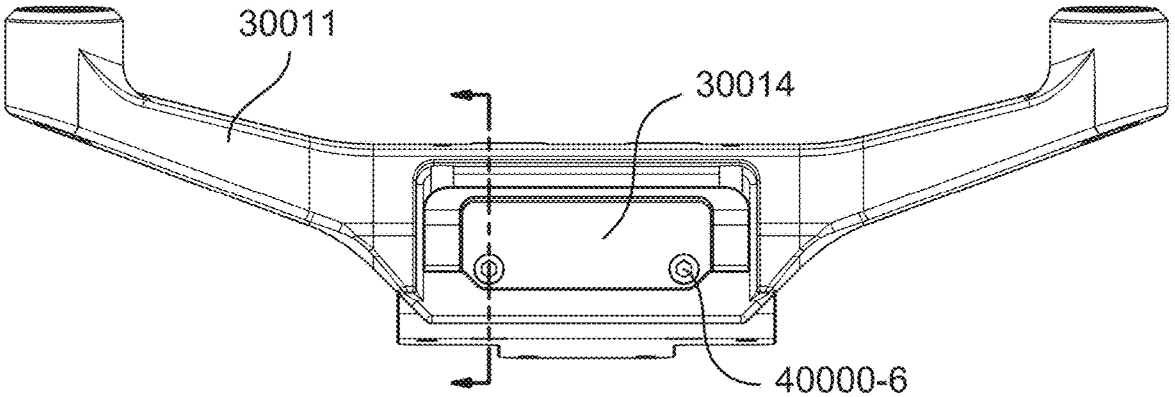
FIG. 4E is a cross section diagram of a first view of the release handle of the present teachings.
Figure 4E:
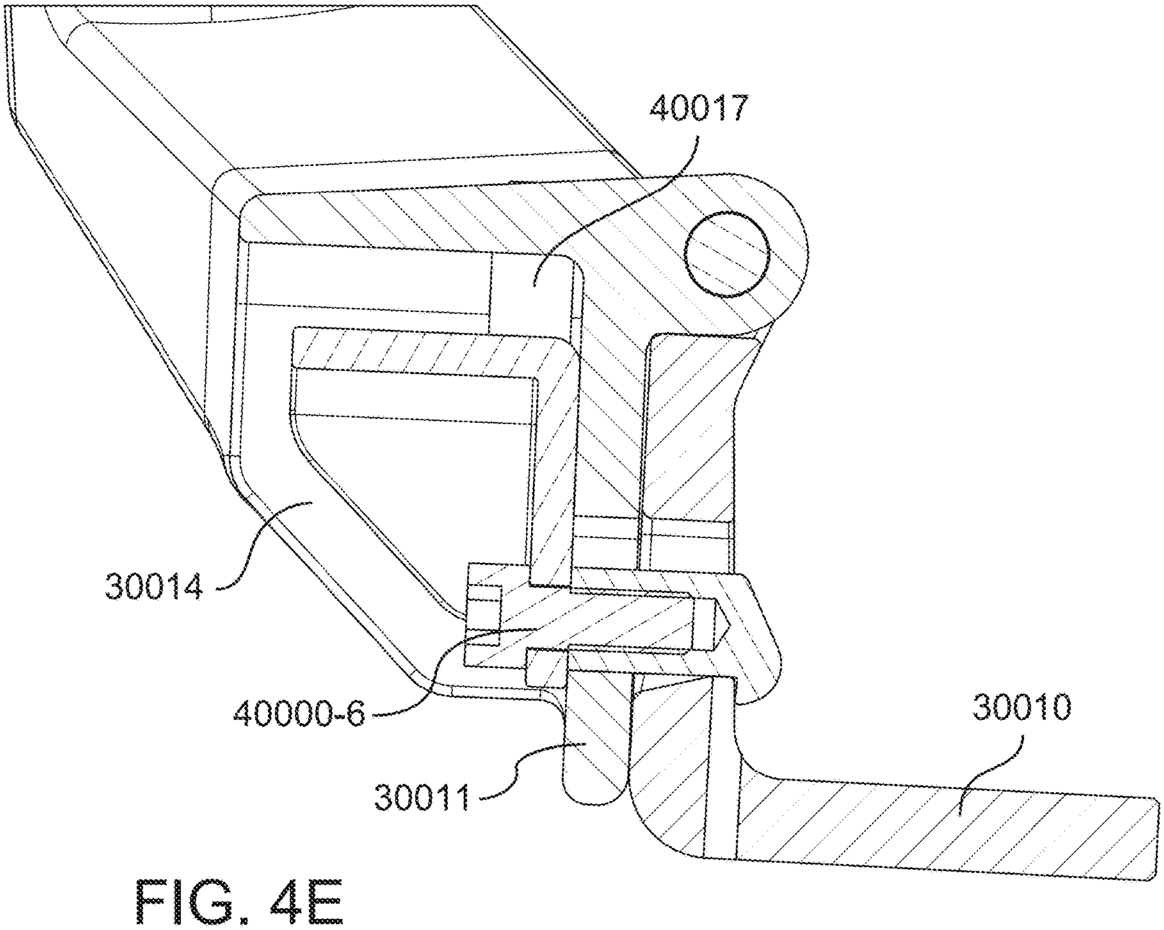
Figure 4F:
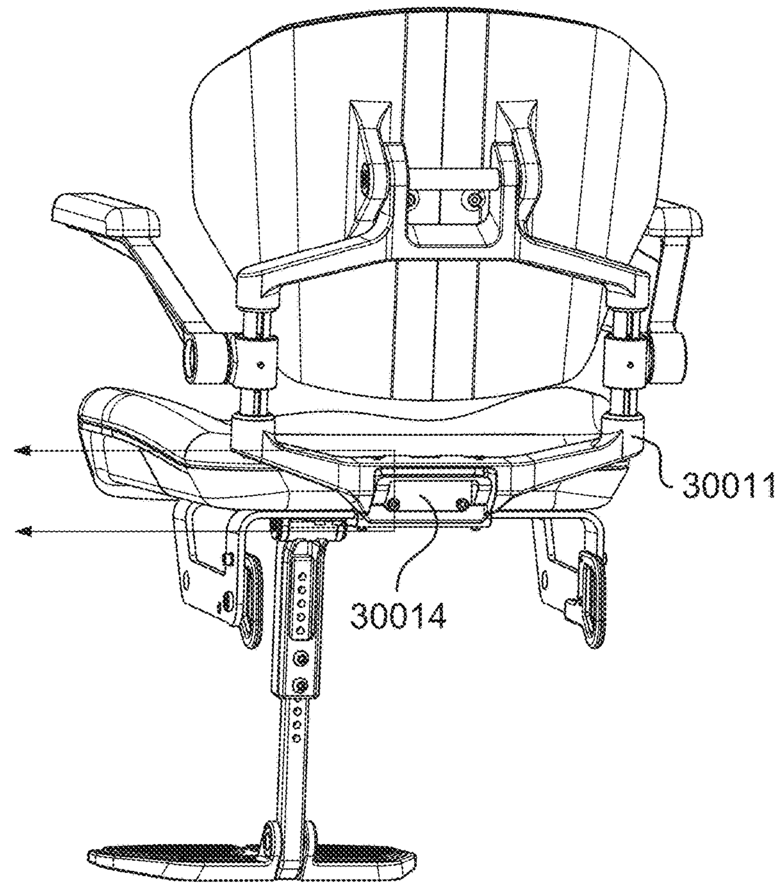
FIG. 4F is a cross section diagram of a second view of the release handle of the present teachings.
Figure 4F:
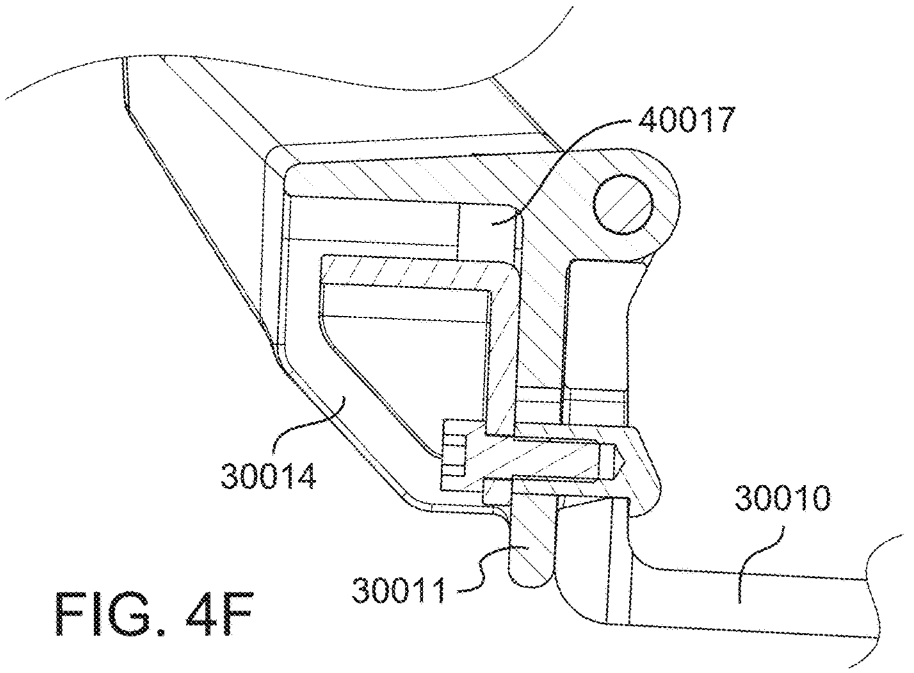

Referring now to FIGS. 4B-4F, the backrest can be locked in place, and also can be released and folded towards the seat cushion. When the backrest is folded forward, the armrests can be rotated towards the backrest to enable compact storage. The junction between armrest structure 30043 (FIG. 4B) and second configuration armrest mount bracket 30040 (FIG. 4B) can enable smooth rotation of armrest structure 30043 (FIG. 4B). Fold hinge bracket 30010 can include bottom hinge knuckles 30010A (FIG. 4C) mounted to hinge leaf 30010B (FIG. 4C). Rear tube holder bracket 30011 can include top hinge knuckles 30011A (FIG. 4C) that can operably couple with bottom hinge knuckles 30010A (FIG. 4C) and surround hinge pin 30020 (FIG. 4C). When fold handle 30014 (FIG. 4C) is lifted, at least one spring pin 40010, engaged within spring pin cylinder 40017 (FIG. 4C), can release at least one retention hook 30015, protruding from retention hook cavity 30015B (FIG. 4C), and can enable at least one retention hook 30015 to disengage from at least one retention hook rest 30015A (FIG. 4C). At least one retention hook 30015 can engage with cavity 30011B (FIG. 4C). It is then possible to rotate rear tube holder bracket 30011, operably coupled with the backrest, towards seat bracket 30001. The backrest can be lifted back into an operational position, rotating rear tube holder bracket 30011 away from seat bracket 30001. At a pre-selected point in the rotation, at least one retention hook 30015 (FIG. 4C) can engage with at least one retention hook rest 30015A (FIG. 4C), locking the backrest in place.

Figure 4G:
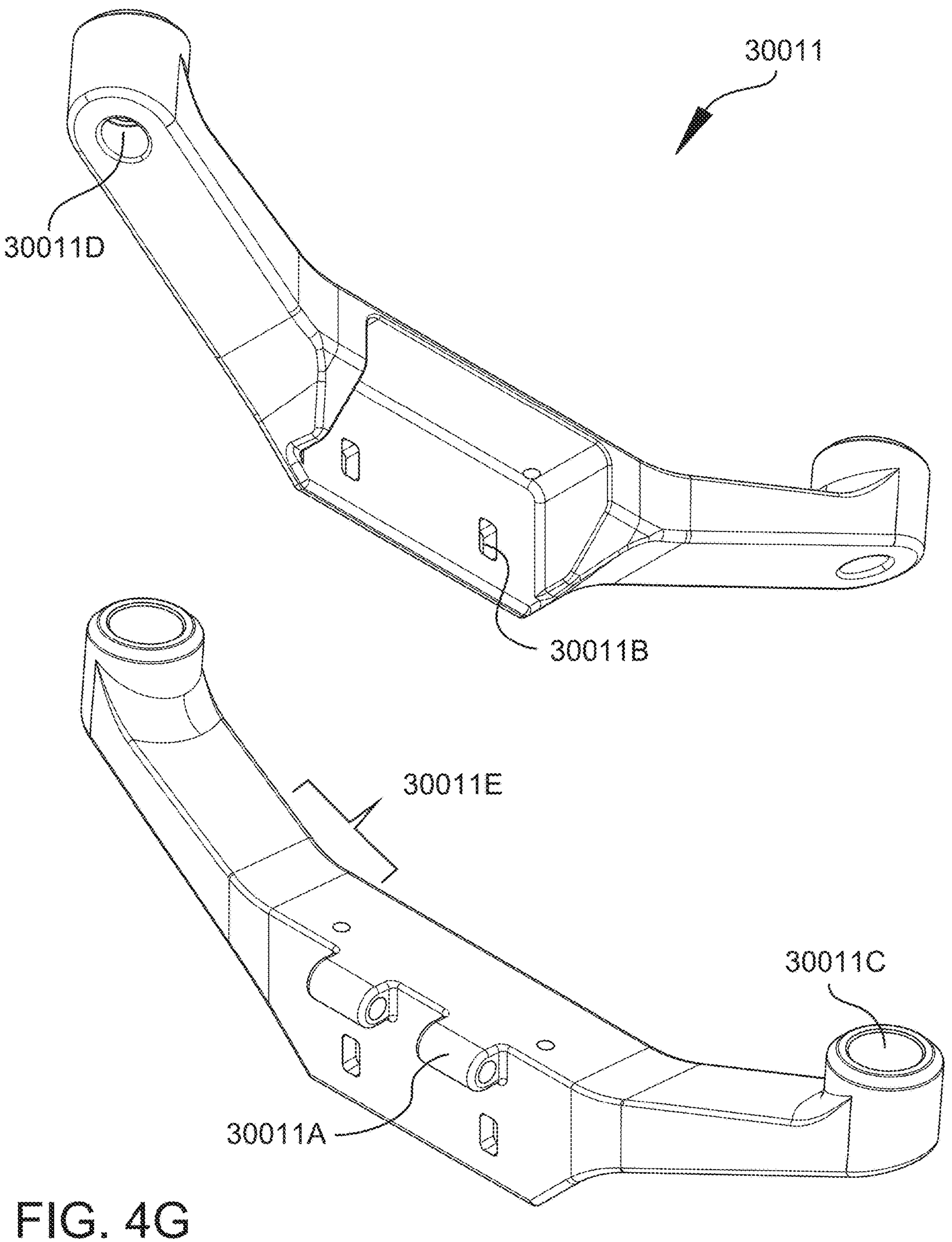
FIG. 4G is a schematic perspective diagram of the rear bracket of the second configuration of the seat assembly of the present teachings.
Figure 4H:
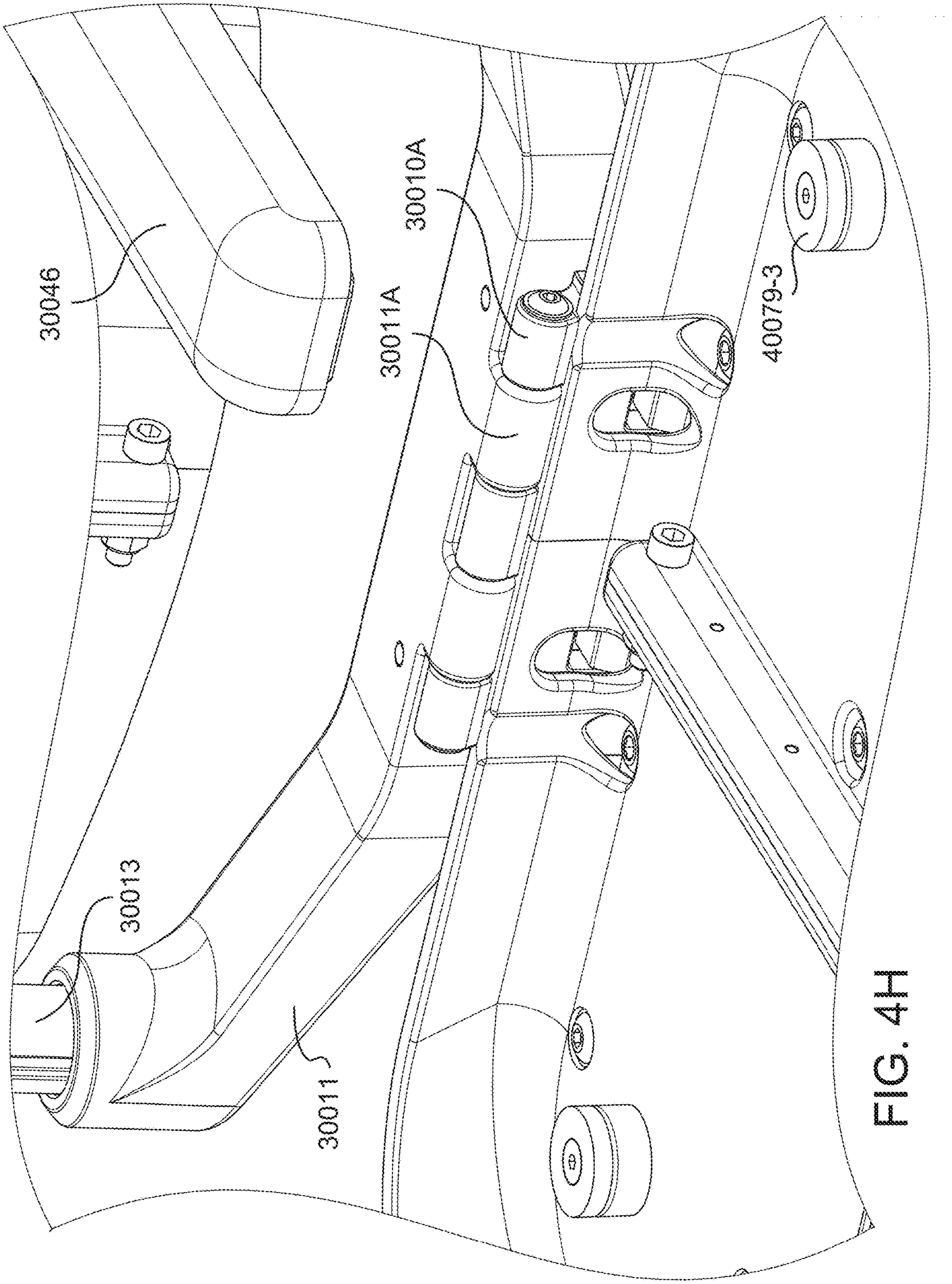
FIG. 4H is a schematic perspective detailed diagram of the seat shell, bracket fold hinge, and rear bracket of the second configuration of the seat assembly of the present teachings.
Figure 4I:
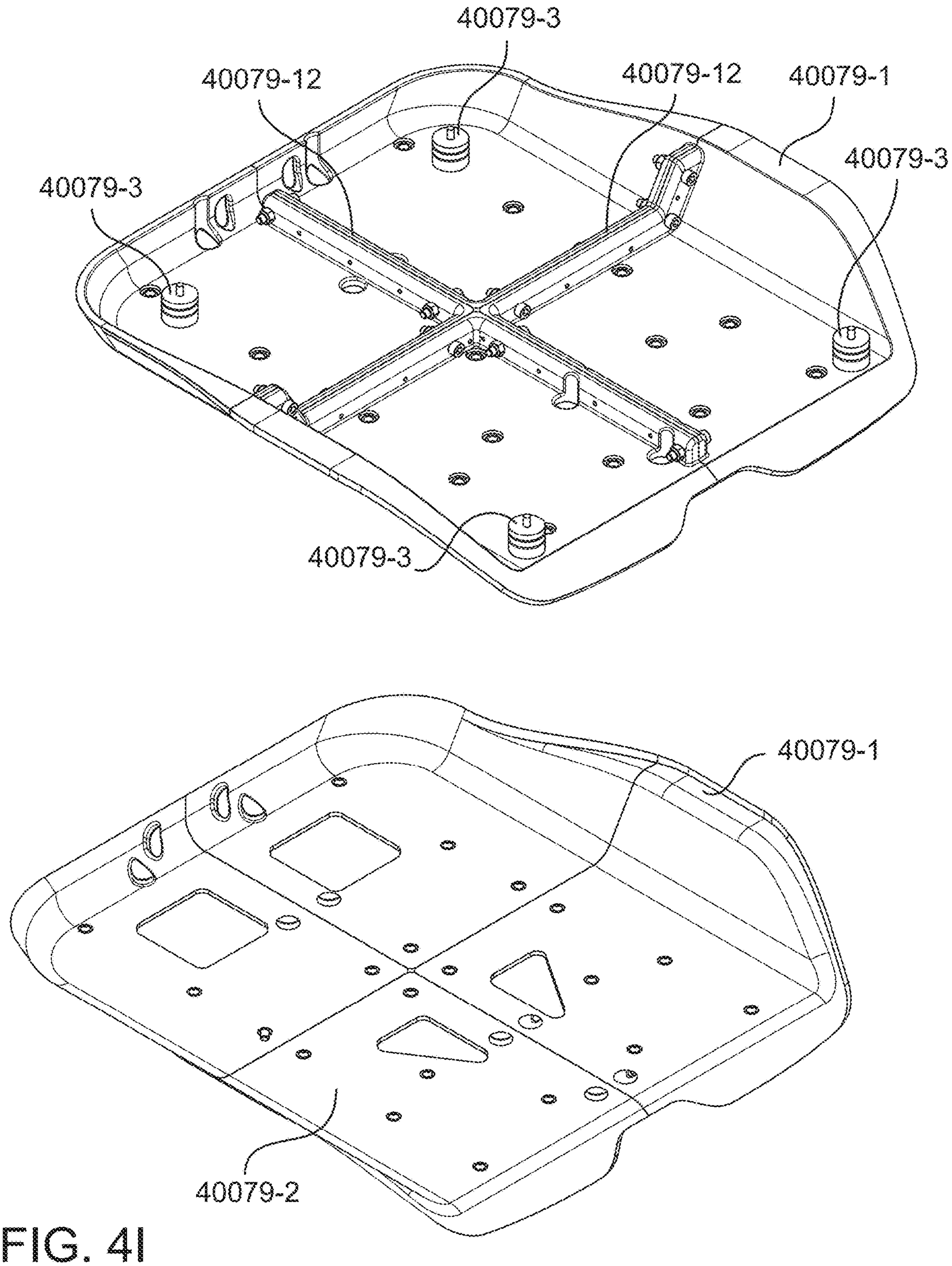
FIG. 4I is a schematic perspective diagram of the seat shell of the present teachings.

Referring now to FIG. 4G, rear tube holder bracket 30011 can be shaped to accommodate a seat cushion, in particular, rear tube holder bracket 30011 can include a curvature angle 30011E that can be varied, during manufacture, depending upon the shape of the seat cushion. Rear tube holder bracket 30011 can include fastening cavity 30011D that can accommodate bolt 40000-10 (FIG. 2A), and cane cavity 30011C that can accommodate vertical back frame cane 30013 (FIG. 2A).

Figure 4J:
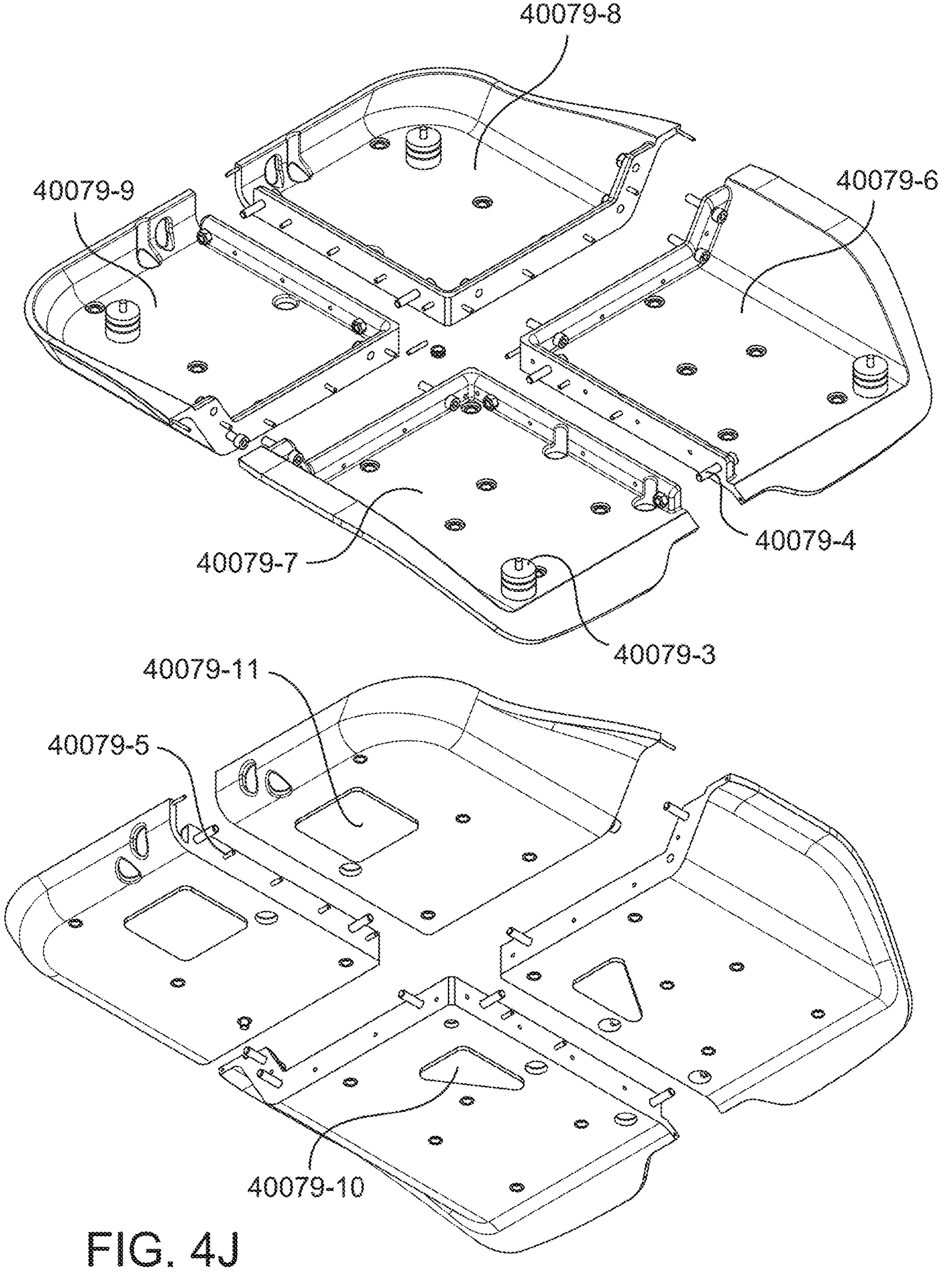
FIG. 4J is a schematic perspective exploded diagram of the seat shell of the present teachings.
Figure 4K:
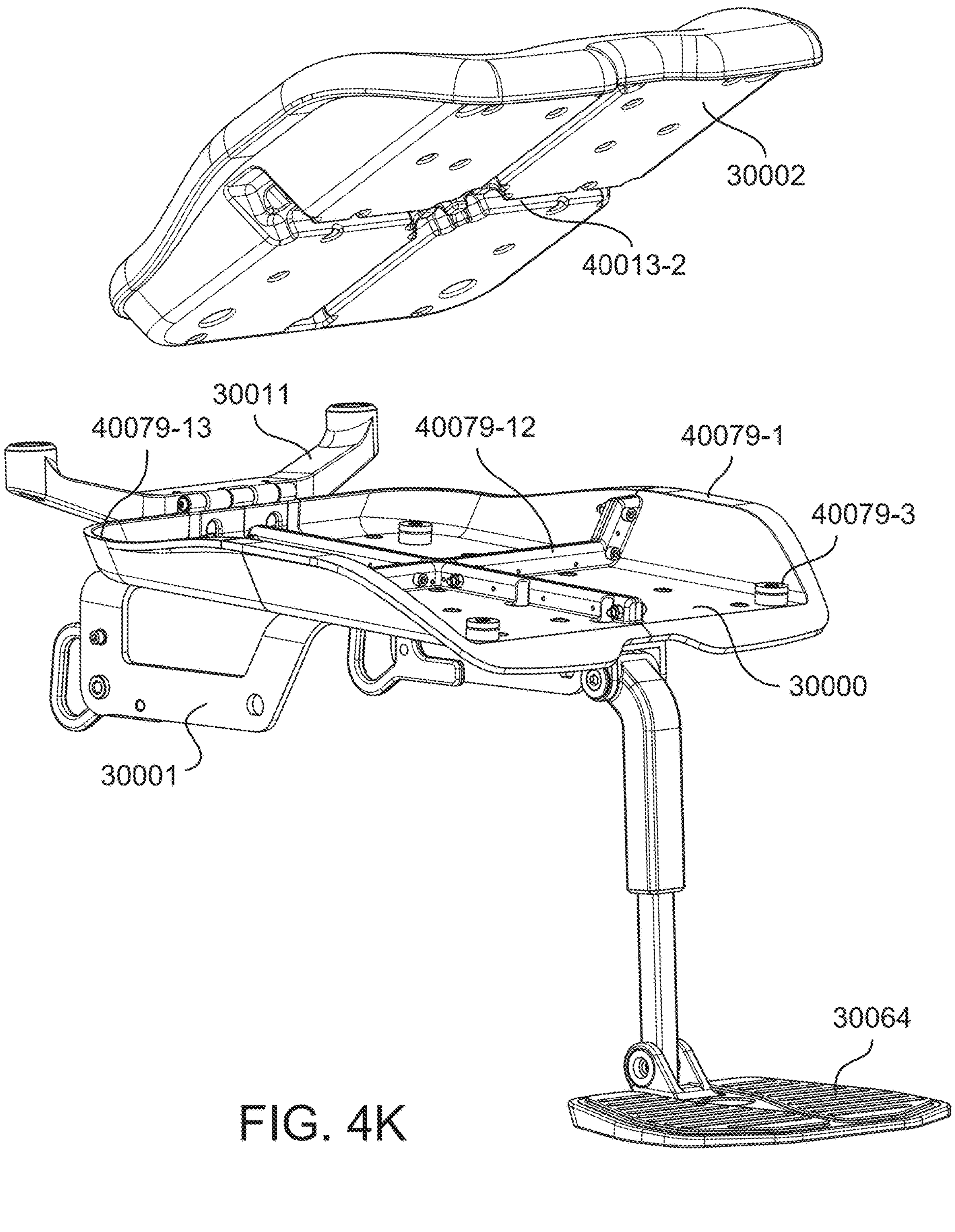
FIG. 4K is a schematic perspective exploded first view diagram of the seat shell, seat cushion, rear bracket, and footrest of the second configuration of the seat assembly of the present teachings.
Figure 4L:
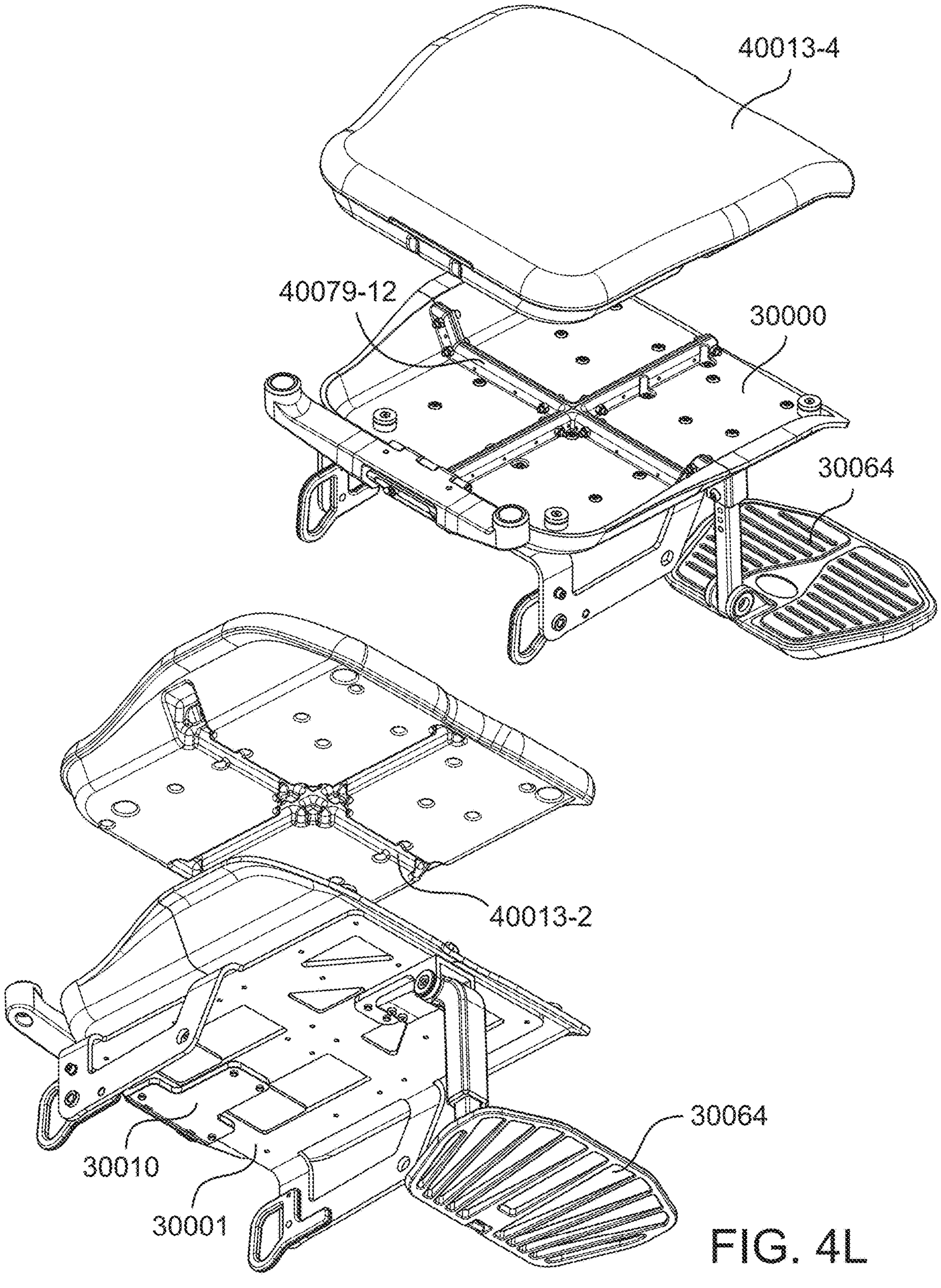
FIG. 4L is a schematic perspective exploded second view diagram of the seat shell, seat cushion, rear bracket, and footrest of the second configuration of the seat assembly of the present teachings.
Figure 4M:
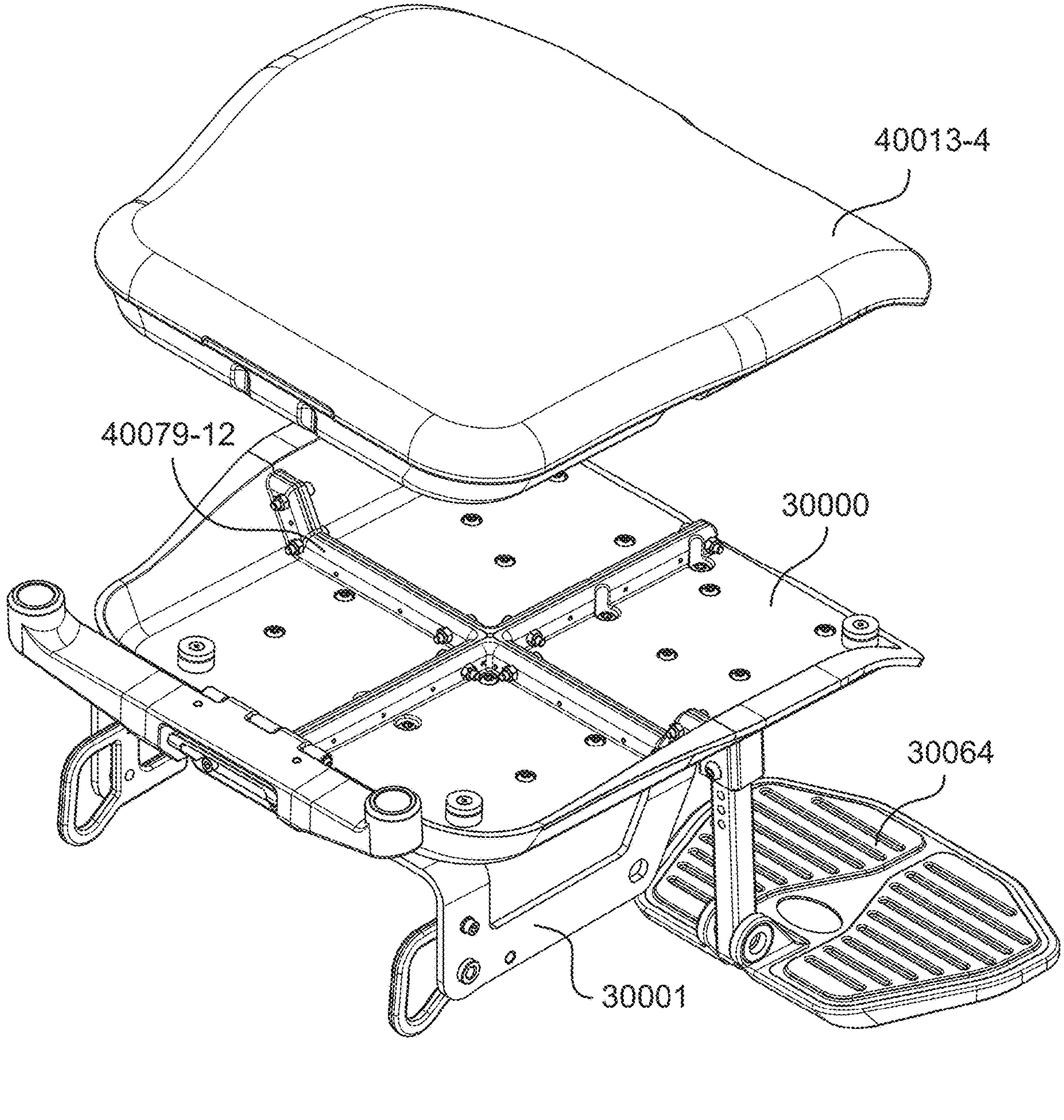
FIG. 4M is a schematic perspective exploded third view diagram of the seat shell, seat cushion, rear bracket, and footrest of the second configuration of the seat assembly of the present teachings.

Referring now to FIG. 4H-4M, seat shell 30000 can be mounted atop seat bracket 30001 (FIG. 4A). Seat shell 30000 can provide an interface between seat cushion 30002 (FIG. 4K) and seatpan mounting bracket 30001 (FIG. 4A). Seat shell 30000 can be contoured to retain seat cushion 30002 (FIG. 4K) while, at the same time, providing edges, such as chamfered or beveled edges, that can enable comfortable seating. For example, seat shell 30000 can include at least one seat shell side rest 40079-1 (FIG. 4I) that can retard lateral motion of seat cushion 30002 (FIG. 4K). Seat shell 30000 can include seat shell bottom 40079-2 (FIG. 4I) that can include seat alignment first feature 40079-10 (FIG. 4J) and seat alignment feature second feature 40079-11 (FIG. 4J) described herein. Seat shell 30000 can include at least one seat magnet 40079-3 (FIG. 4I) that can enable operable coupling between seat shell 30000 and seat cushion 30002 (FIG. 4K). Seat shell 30000 can be constructed of multiple parts or can be a single piece. In some configurations, seat shell 30000 can include seat shell front right 40079-6 (FIG. 4J), seat shell front left 40079-7 (FIG. 4J), seat shell rear right 40079-8 (FIG. 4J), and seat shell rear left 40079-9 (FIG. 4J) that can be joined together by, for example, at least one seat shell bolt 40079-4 (FIG. 4J) and/or at least one seat shell pin 40079-5 (FIG. 4J). When the parts of seat shell 30000 are joined, at least one seat shell rib 40079-12 (FIG. 4I) can be formed.

Figure 4N:
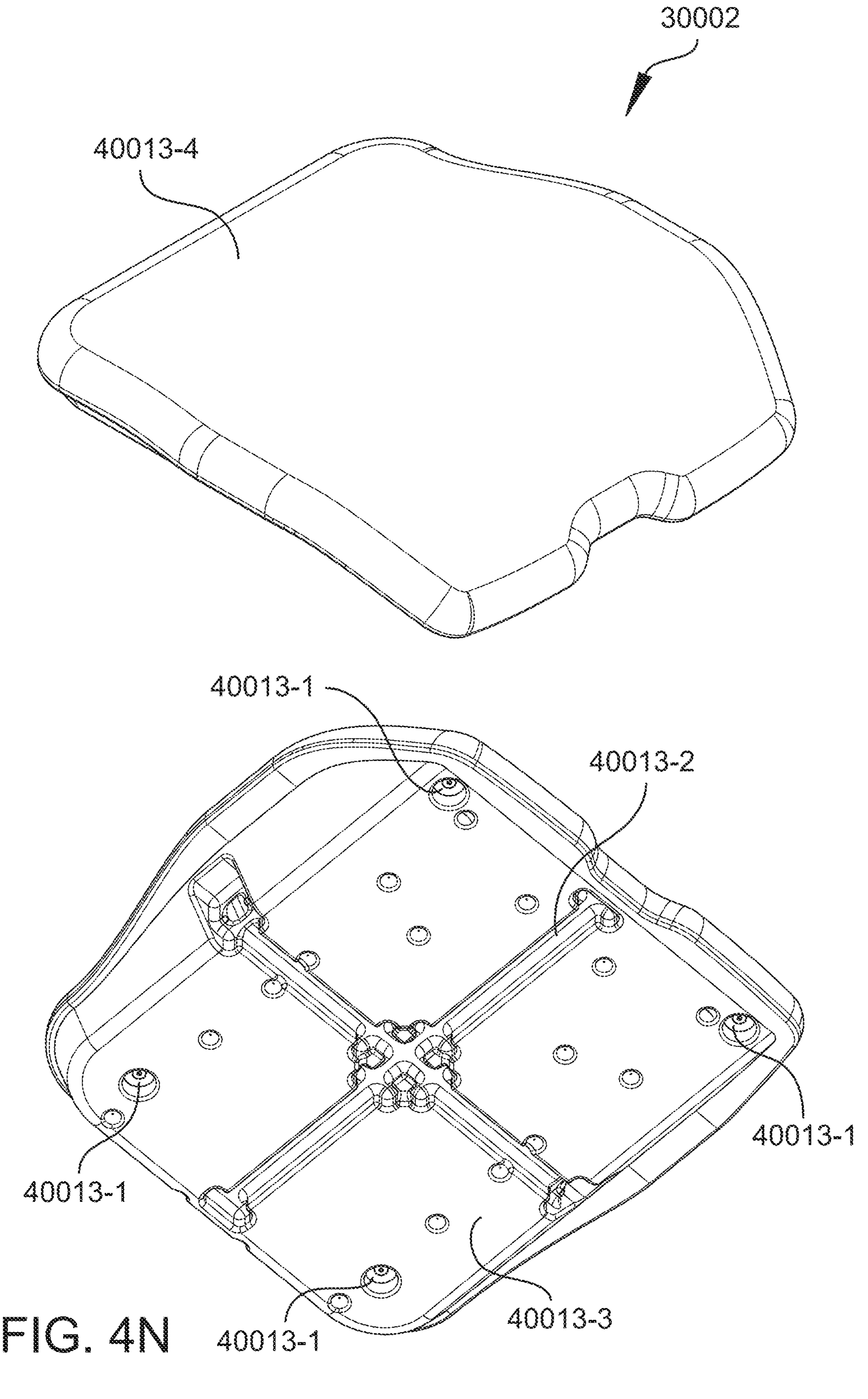
FIG. 4N is a schematic perspective diagram of the seat cushion of the present teachings.

Referring now to FIG. 4N, seat cushion 30002 can rest upon seat shell 30000 (FIG. 4I), and can be operably coupled with seat shell 30000 (FIG. 4I) through the coupling of fastening means such as, for example, but not limited to, at least one seat magnet 40079-3 (FIG. 4I) with at least one seat cushion magnet 40013-1 on seat cushion shell interface 40013-3. Seat shell ribs 40079-12 (FIG. 4J) can be accommodated by seat cushion troughs 40013-2. Seat cushion 30002 can include user seat surface 40013-4 that can, in some configurations, include padding for comfort. Seat cushion 30002 can include any type and amount of padding and any type of upholstery.

Figure 5:
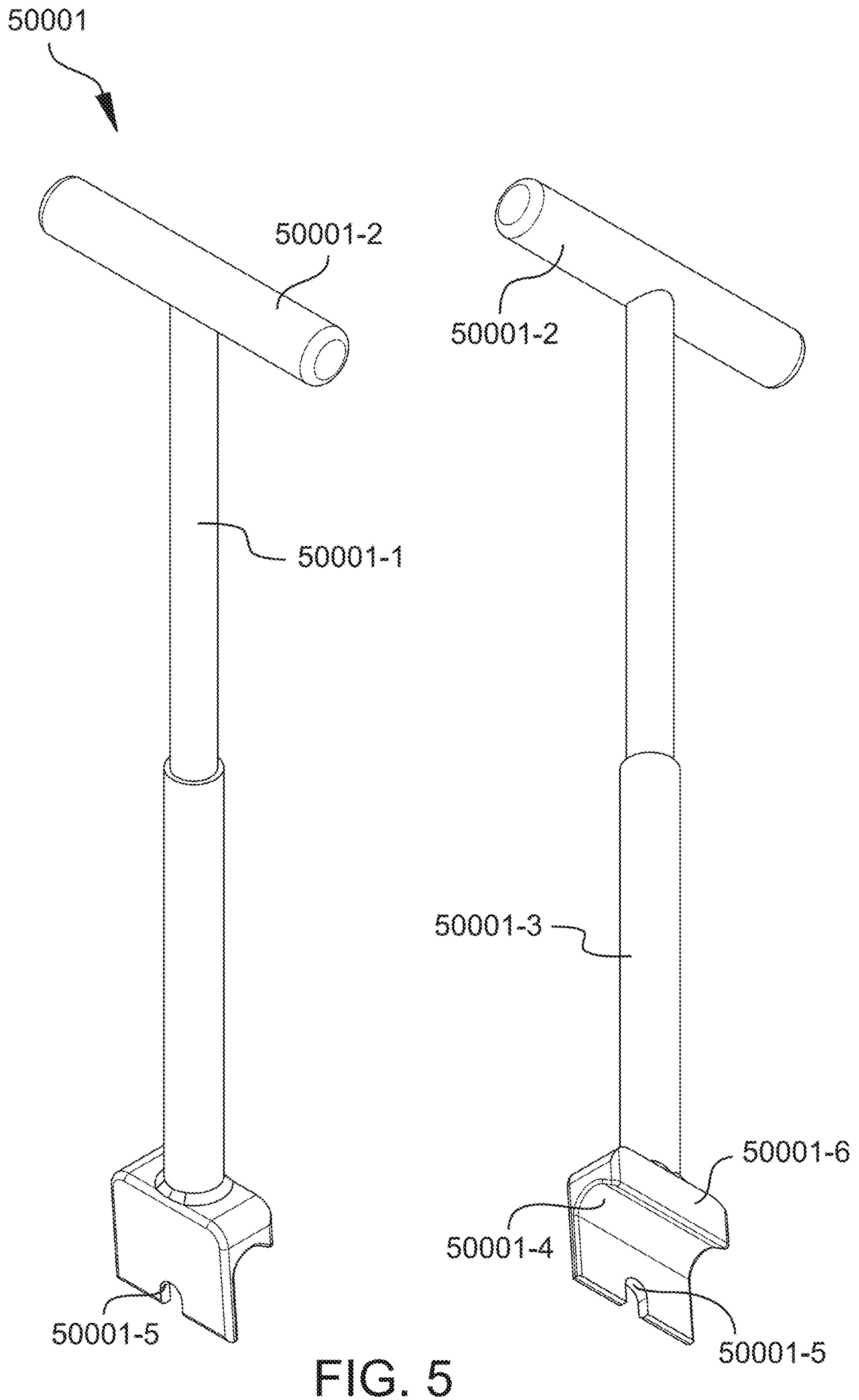
FIG. 5 is a schematic perspective diagram of the attendant handle of the first configuration of the seat assembly of the present teachings.

Referring now to FIG. 5, optional attendant handle 50001 can be retracted to reduce its height, and can be set to a specific height to accommodate the attendant. In particular, handle grasp 50001-2 can be depressed. The depression can reduce the length of handle post top 50001-1 by sliding it into handle post bottom 50001-3. Handle interface 50001-6 can include pivot bolt cavity 50001-4 that can rest upon backrest pivot shaft 40011-5 (FIG. 3B), the combination of which can enable snap placement of attendant handle 50001 with respect to backrest shell 30019. Attendant handle 50001 can include knob shaft accommodation 50001-5 that can provide space for threaded knob shaft 40011-1 (FIG. 3A). Attendant handle 50001 can enable an attendant to assist a user in, for example, but not limited to, climbing stairs.

Figure 6A:
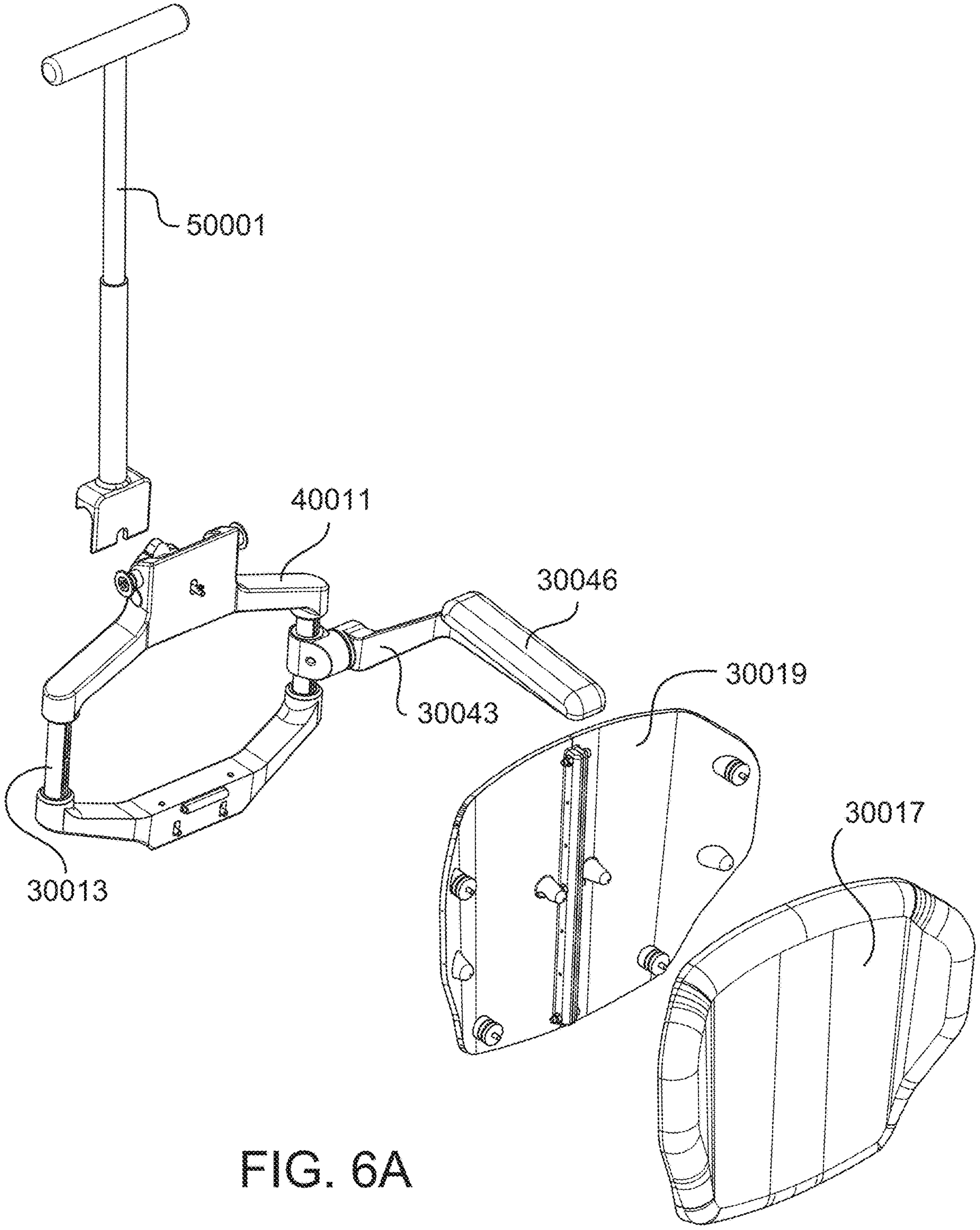
FIG. 6A is a schematic perspective exploded diagram of the attendant handle, backrest shell, backrest cushion, brackets, and armrest of the first configuration of the seat assembly of the present teachings.
Figure 6B:
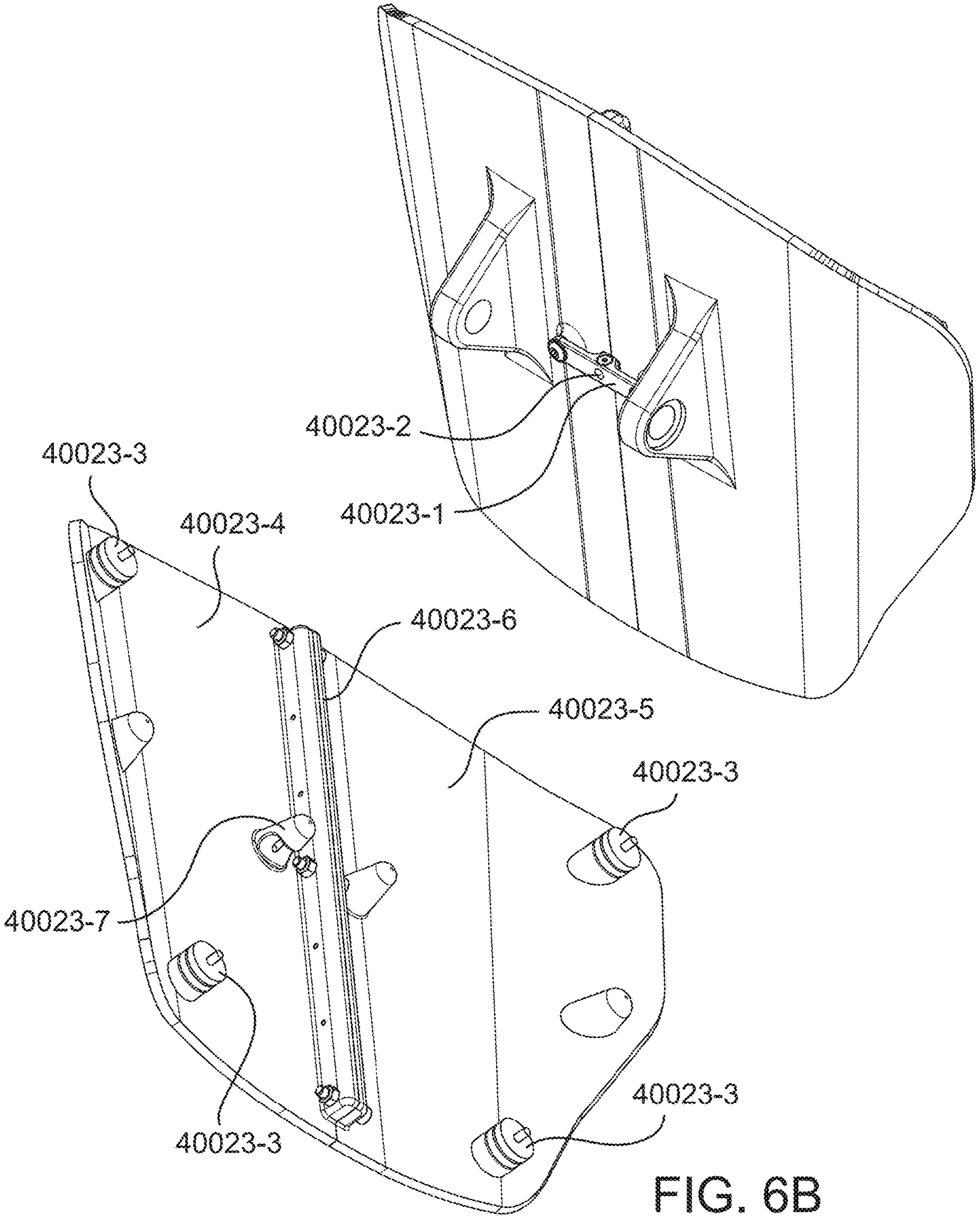
FIG. 6B is a schematic perspective diagram of the backrest shell of the present teachings.
Figure 6C:
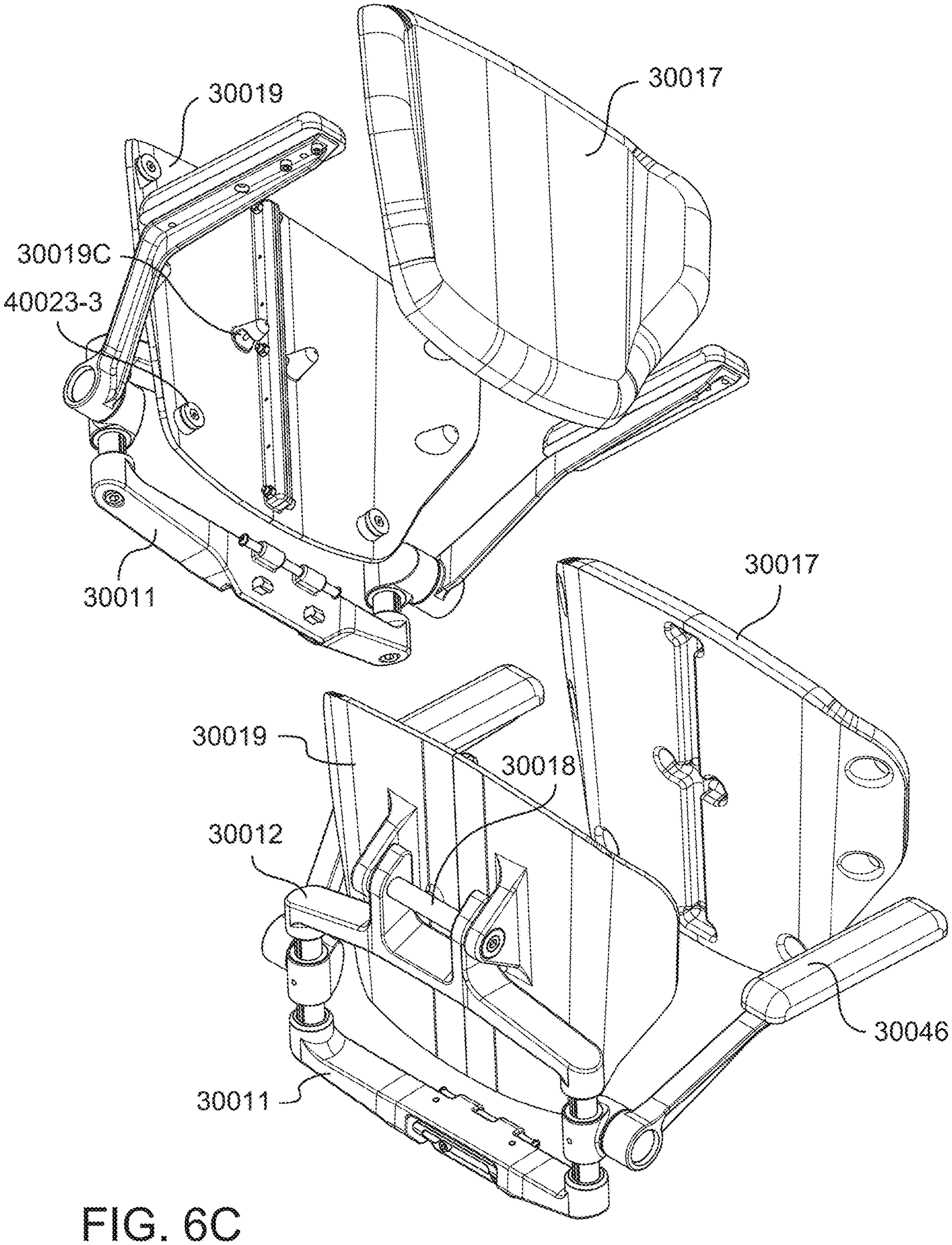
FIG. 6C is a schematic perspective exploded diagram of the second configuration of the top back frame bracket, backrest shell, and backrest cushion of the seat assembly of the present teachings.
Figure 6D:
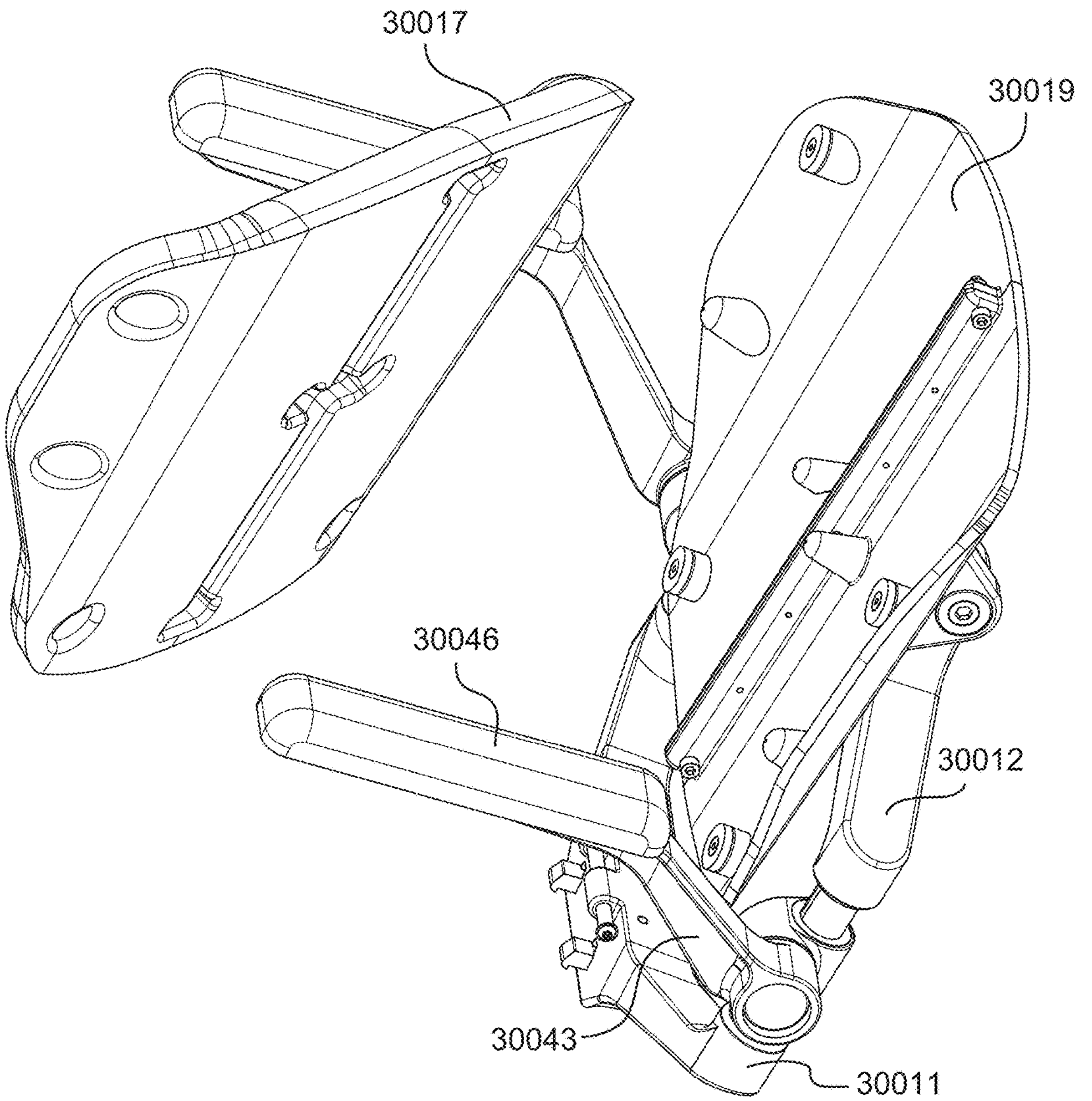
FIG. 6D is a schematic perspective exploded diagram of the second configuration of the backrest shell, backrest cushion, and armrests of the seat assembly of the present teachings.
Figure 6E:
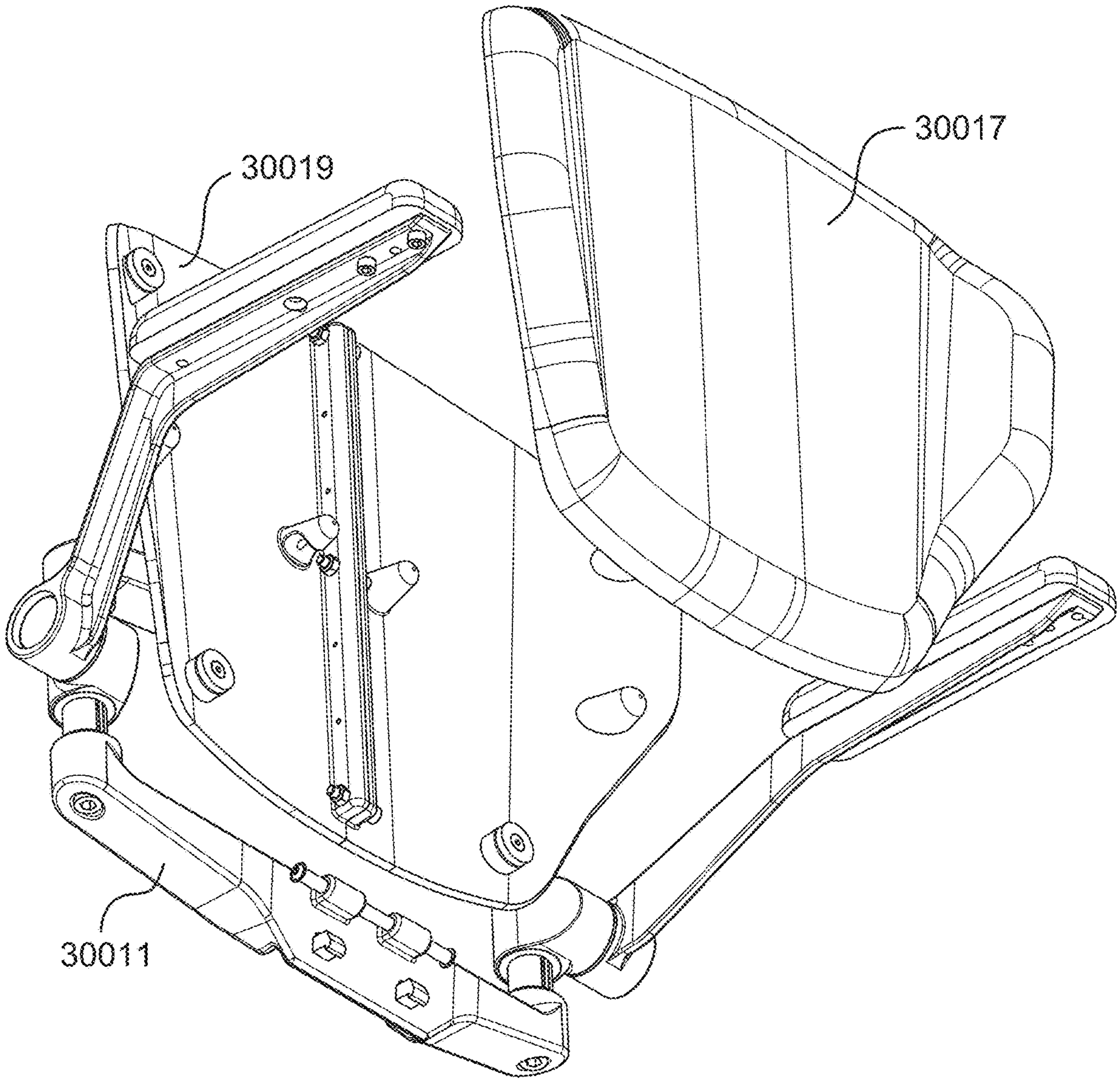
FIG. 6E is a schematic perspective exploded diagram of the rear tube holder bracket, backrest cushion, armrests, and backrest shell of the seat assembly of the present teachings.
Figure 6F:
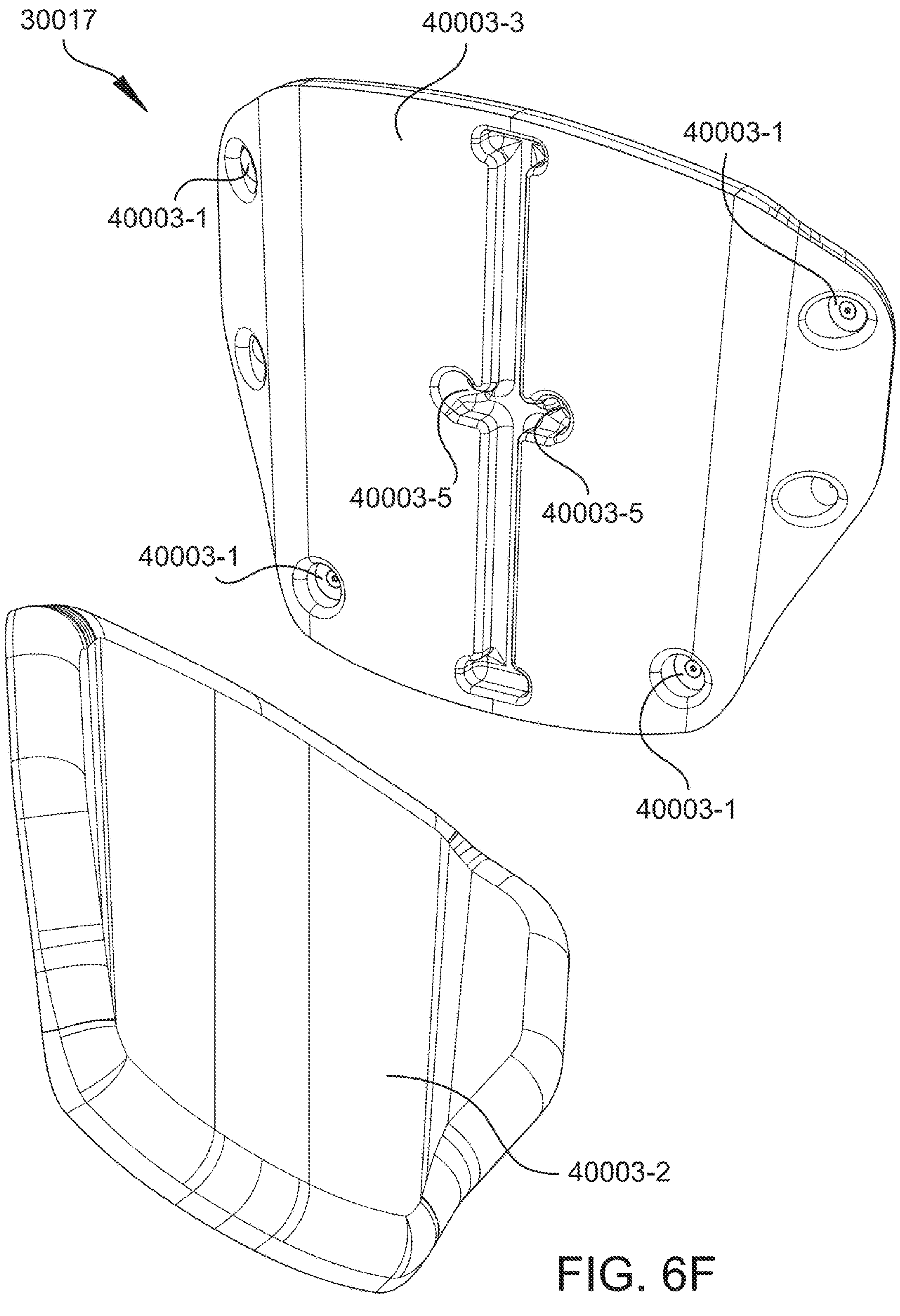
FIG. 6F is a schematic perspective exploded diagram of the cushion and backrest shell of the seat assembly of the present teachings.

Referring now to FIGS. 6A-6F, backrest shell 30019 can include knob interface bracket 40023-1 (FIG. 6B) that can accommodate angle adjustment knob 40049 (FIG. 6C), if it is present, through an operable coupling enabled by connecting screw cavity 40023-2 (FIG. 6B). Backrest shell 30019 can include multiple parts or can be manufactured as a single piece. In some configurations, backrest shell 30019 can include mirrored image backrest shell right 40023-4 (FIG. 6B) and backrest shell left 40023-5 (FIG. 6B) that can be joined at backrest shell ribs 40023-6 (FIG. 6B). Backrest shell right 40023-4 (FIG. 6B) and backrest shell left 40023-5 (FIG. 6B) can include at least one backrest magnet 40023-3 (FIG. 6B) that can accommodate attachment of backrest cushion 30017 (FIG. 6F). Attachment means to couple backrest shell 30019 with backrest cushion 30017 (FIG. 6F) can include, but are not limited to including, backrest magnets 40023-3 (FIG. 6B) that can be attached to backrest shell 30019 by any kind of fasteners including, but not limited to screws, bolts, hook-and-eye fasteners, and glue. Backrest shell 30019 can include at least one backrest spacer 40023-7 (FIG. 6B) that can provide for positioning of additional cushioning. At least one backrest spacer 40023-7 (FIG. 6B) can include recess 30019C (FIG. 6C) that can accommodate means to attach various pieces of backrest shell 30019 together.

Figure 6G:
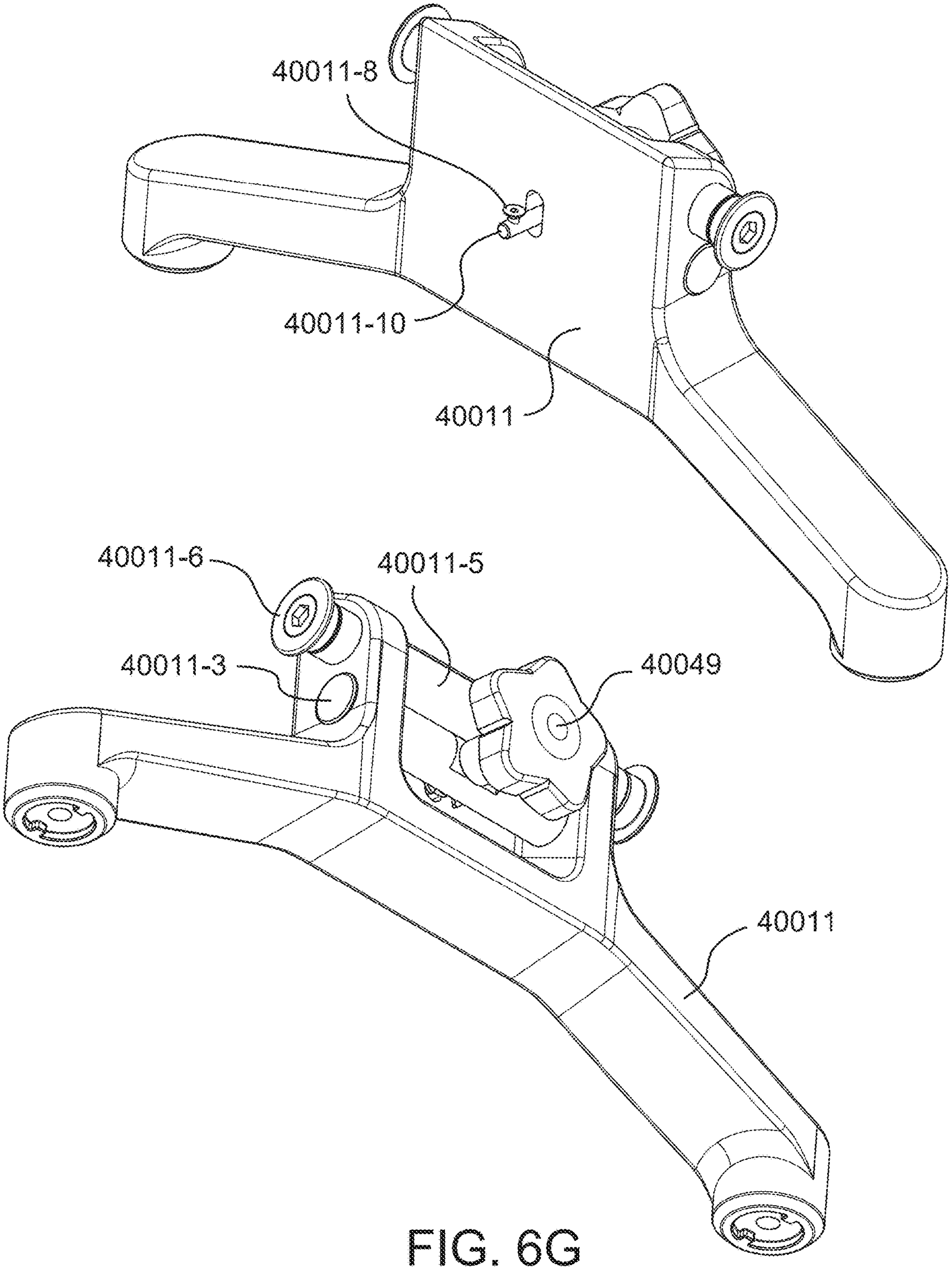
FIG. 6G is a schematic perspective diagram of the first configuration of the top back frame bracket of the seat assembly of the present teachings.
Figure 6H:
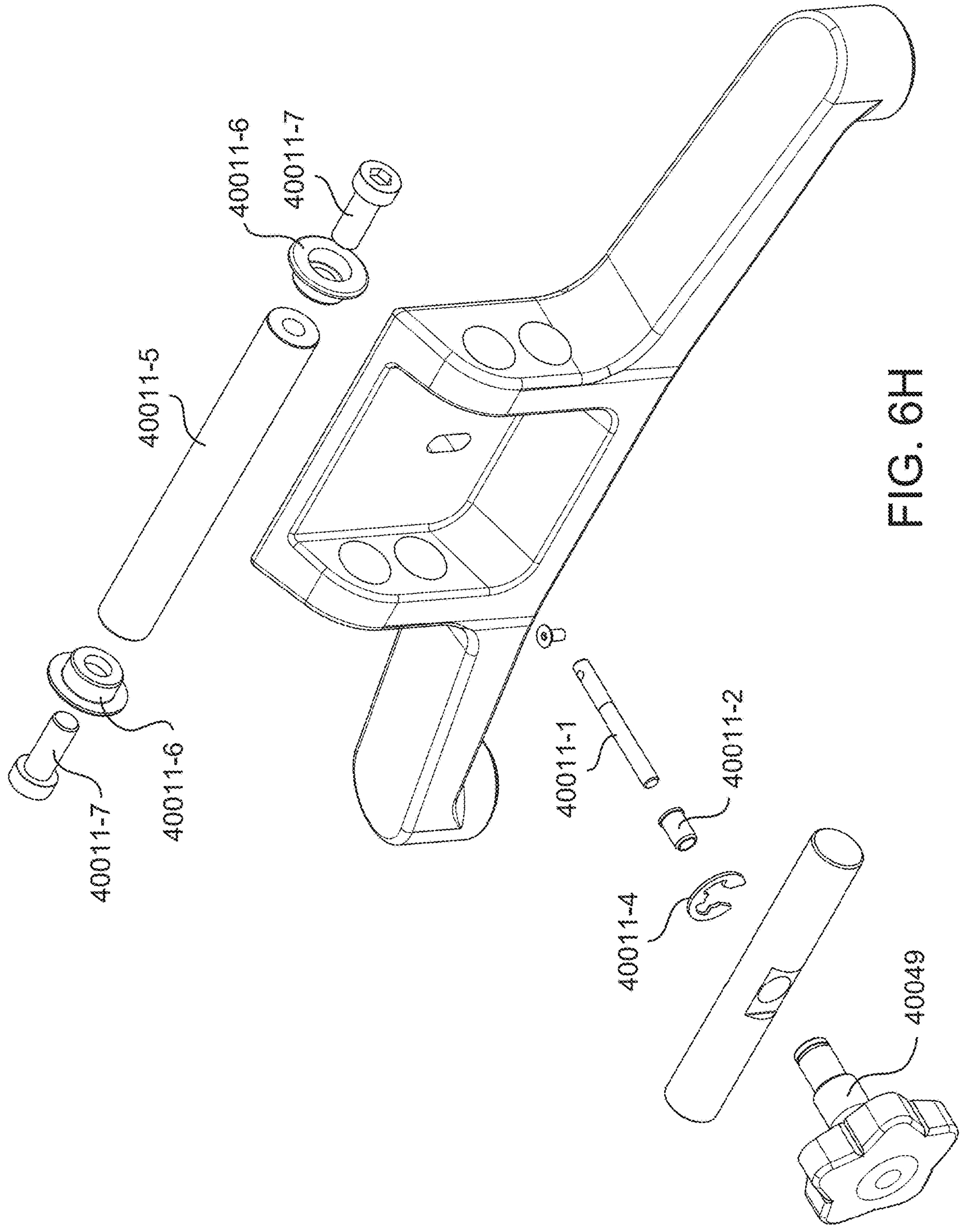
FIG. 6H is a schematic perspective exploded first view diagram of the first configuration of the top back frame bracket of the seat assembly of the present teachings.
Figure 6I:
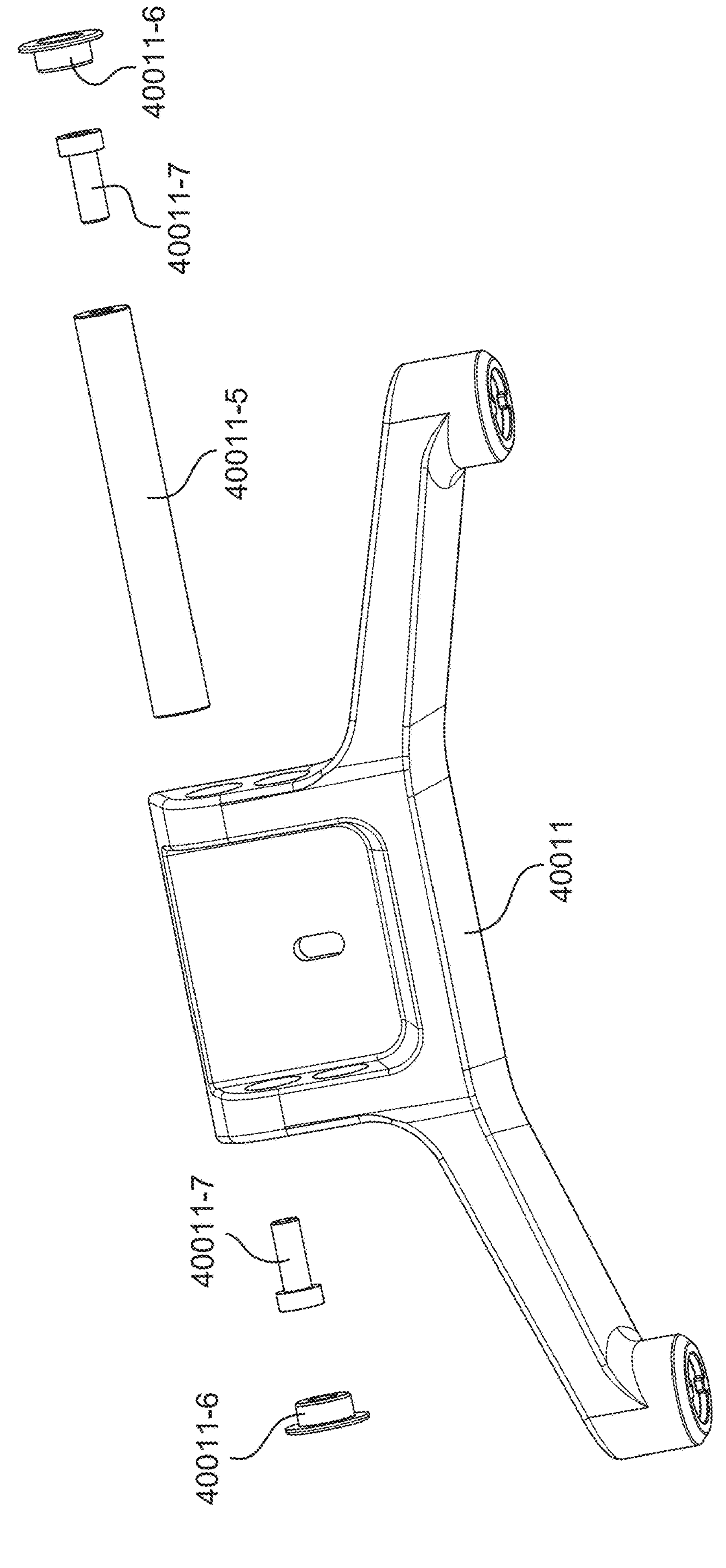
FIG. 6I is a schematic perspective exploded second view diagram of the first configuration of the top back frame bracket of the seat assembly of the present teachings.

Referring now to FIGS. 6G-6I, first configuration top back frame bracket 40011 (FIG. 6G) can provide recesses for mounting backrest angle adjust knob 40049 (FIG. 6H), if present. Angle adjust knob 40049 (FIG. 6H) can be operably coupled with threaded knob shaft 40011-1 (FIG. 6H) that can include a cavity to accommodate bracket knob connecting screw 40011-8 (FIG. 6G). Backrest angle adjust knob 40049 (FIG. 6H) can cause the angle of backrest shell 30019 (FIG. 6E) (and therefore backrest cushion 30017 (FIG. 6F)) to change during travel along threaded knob shaft 40011-1 (FIG. 6H) by threaded footrest insert 40011-2 (FIG. 6H) and retaining ring 40011-4 (FIG. 6H). Retaining ring 40011-4 (FIG. 6H) can include, but is not limited to including, an axially or radially assembled ring, an inverted ring, a beveled ring, and a spiral ring. Bracket knob connecting screw 40011-8 (FIG. 6G) can operably couple backrest shell 30019 (FIG. 6B) with backrest angle adjust knob 40049 (FIG. 6H) through knob interface bracket 40023-1 (FIG. 6B) to enable positional adjustment of backrest shell 30019 (FIG. 6B) by rotating backrest angle adjust knob 40049. Backrest angle adjust knob 40049 (FIG. 6H) can be operably coupled with connecting pin 40011-10 (FIG. 6G). When backrest angle adjust knob 40049 (FIG. 6H) is rotated, pressure is placed upon connecting pin 40011-10 (FIG. 6G) which can cause rotation of backrest shell 30019 (FIG. 6B). First configuration top back frame bracket 40011 (FIG. 6G) can provide recesses for backrest pivot shaft 40011-5 (FIG. 6C) that can be held in place by, for example, but not limited to, pivot shaft bolts 40011-7 (FIG. 6H) and recessed bolthead washers 40011-6 (FIG. 6H).

Referring now primarily to FIG. 6F, backrest cushion structure 30017 can include contoured backrest cushion 40003-2 on a first side of backrest cushion structure 30017. Contoured backrest cushion 40003-2 can be sized and padded to interface with a specific user. Backrest cushion structure 30017 can include backrest shell interface 40003-3 that can interface with backrest shell 30019. Backrest shell interface 40003-3 can include recessed features that can include at least one backrest cushion magnet 40003-1 that can operably couple with at least one backrest shell magnet 40023-3 (FIG. 2B) to enable removable coupling between backrest shell 30019 (FIG. 6B) and backrest cushion structure 30017. The recessed features can accommodate backrest spacers 40023-7 (FIG. 2B).

Figure 6J:
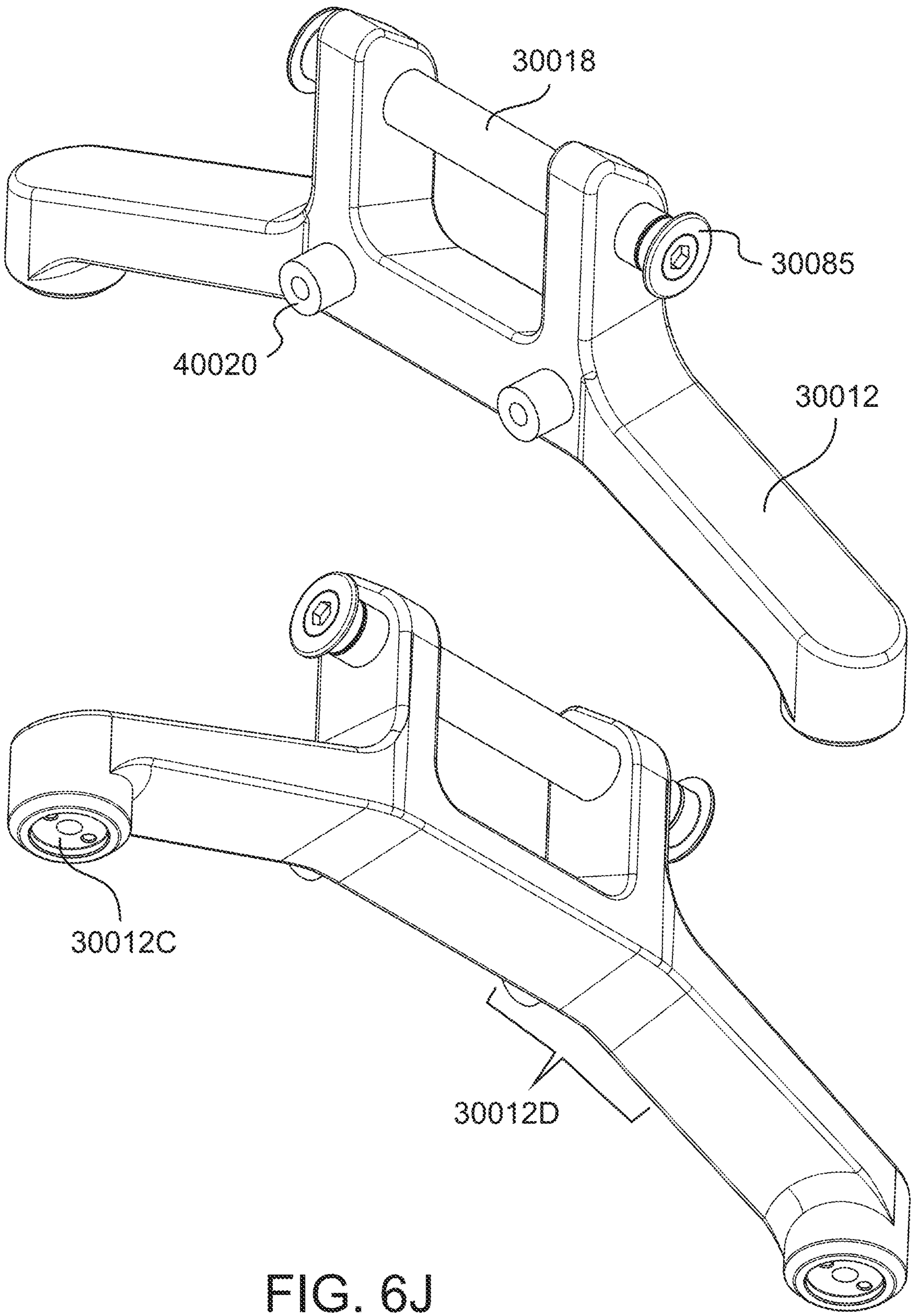
FIG. 6J is a schematic perspective exploded first view diagram of the second configuration of the top back frame bracket of the seat assembly of the present teachings.
Figure 6K:
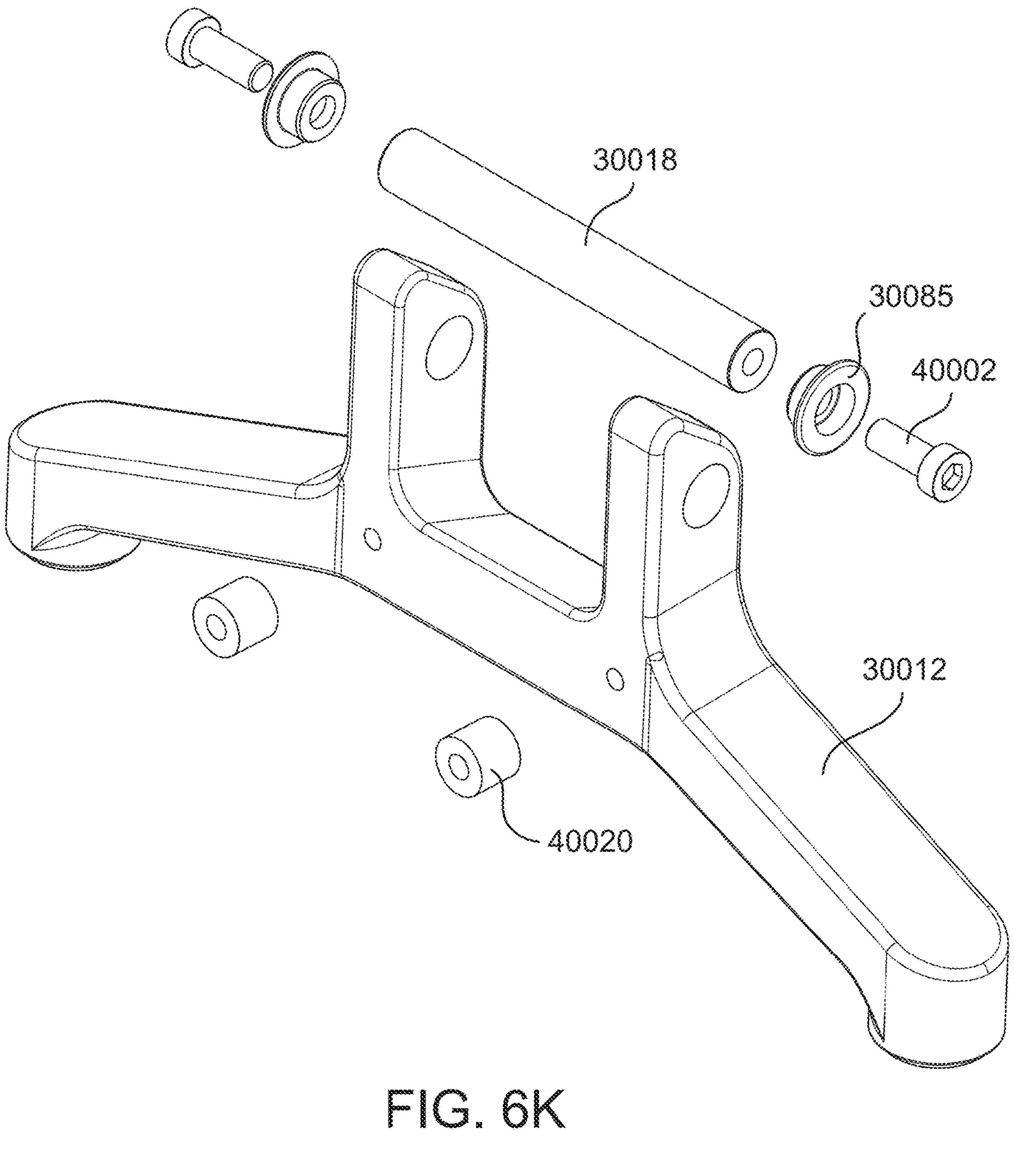
FIG. 6K is a schematic perspective exploded second view diagram of the second configuration of the top back frame bracket of the seat assembly of the present teachings.
Figure 6L:
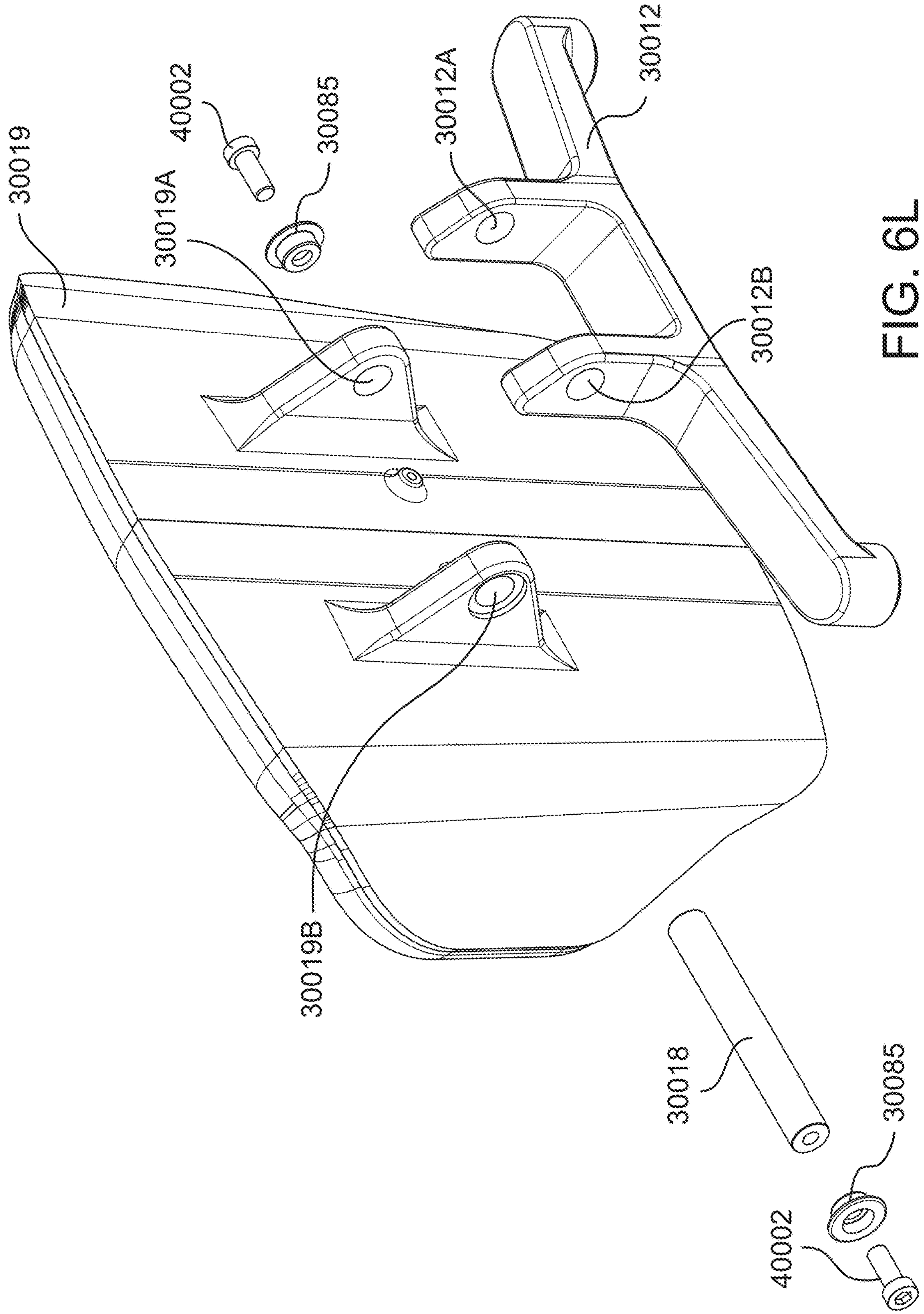
FIG. 6L is a schematic perspective exploded diagram of the second configuration of the top back frame bracket and backrest shell of the seat assembly of the present teachings.

Referring now to FIGS. 6J-6L, second configuration top back frame bracket 30012 can include backrest rotation pin 30018 that can be held in place by rotation pin bolt 40002 (FIG. 6K) and rotation pin bushing 30085 (FIG. 6K). Second configuration top back frame bracket 30012 can include at least one spacer 40020 that can maintain the distance between backrest shell 30019 (FIG. 6F) and top back frame bracket 30012. Top back frame bracket 30012 can include curvature angle 30012D (FIG. 6J) that can be varied, during manufacture, according to the shape of the backrest. Any shape of the backrest can be accommodated by modifying curvature angle 30012D (FIG. 6J) of top back frame bracket 30012. Top back frame bracket 30012 can operably couple with vertical back frame cane 30013 (FIG. 2A) at cane cavity 30012C (FIG. 6J). Second configuration top back frame bracket 30012 can operably couple with backrest shell 30019 by means of backrest rotation pin 30018 that can simultaneously pass through backrest pin cavities 30019A/30019B (FIG. 6L) and top bracket pin cavities 30012A/30012B (FIG. 6L).

Figure 7A:
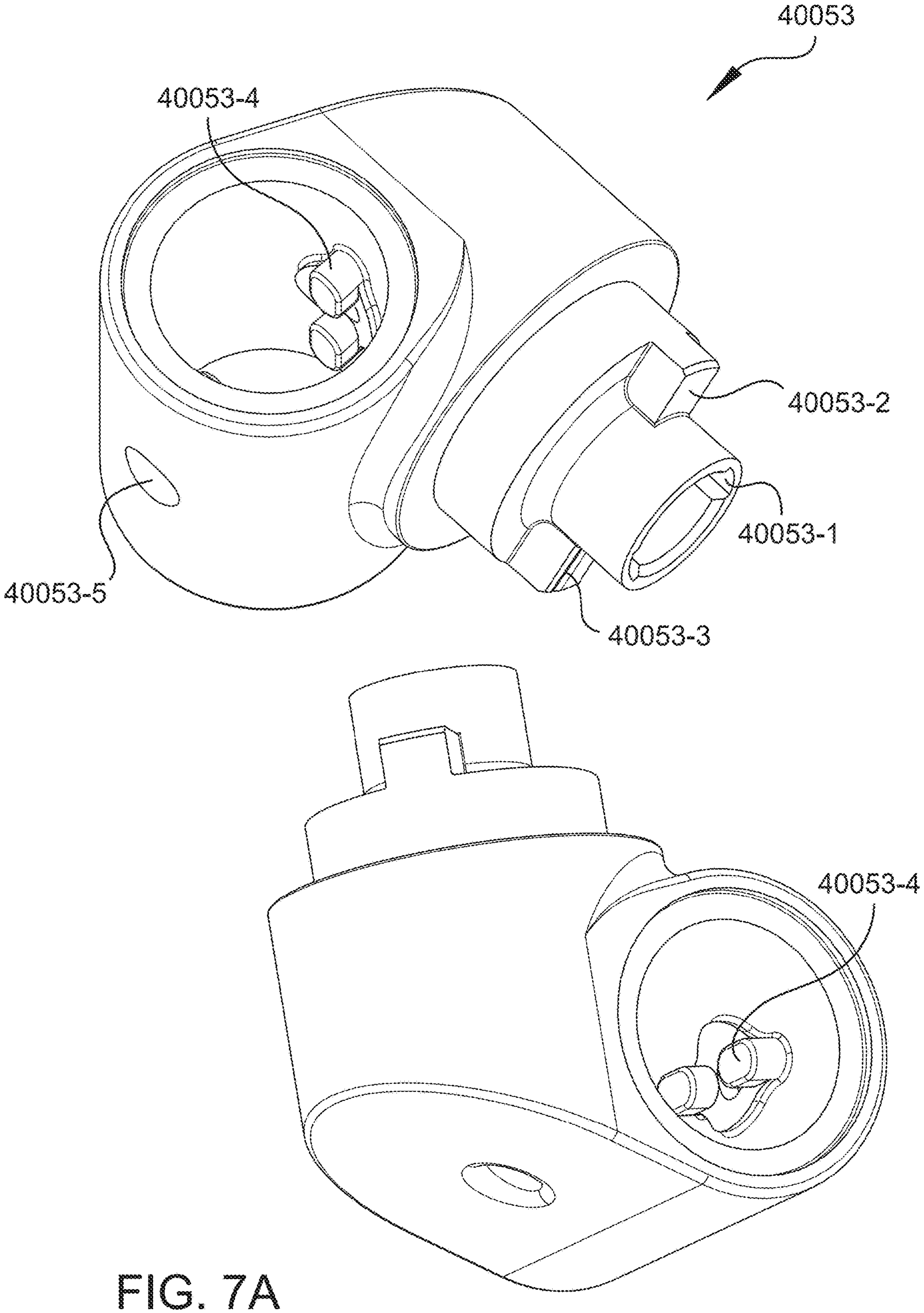
FIG. 7A is a schematic perspective diagram of the first configuration of the armrest mount bracket of the present teachings.

Referring now to FIG. 7A, first configuration armrest mount bracket 40053 can include contoured rests 40053-4 that can surround and admit female lock pin 30041-2 (FIG. 2A). Adjustment screw cavity 40053-5 can accommodate adjustment screw 40025-3 (FIG. 7L). At least one armrest wing 40053-3 can enable alignment of first configuration armrest mount bracket 40053 with armrest structure 30043 (FIG. 1). Recesses 40053-1 can operably couple armrest nut with hole 30044.

Figure 7B:
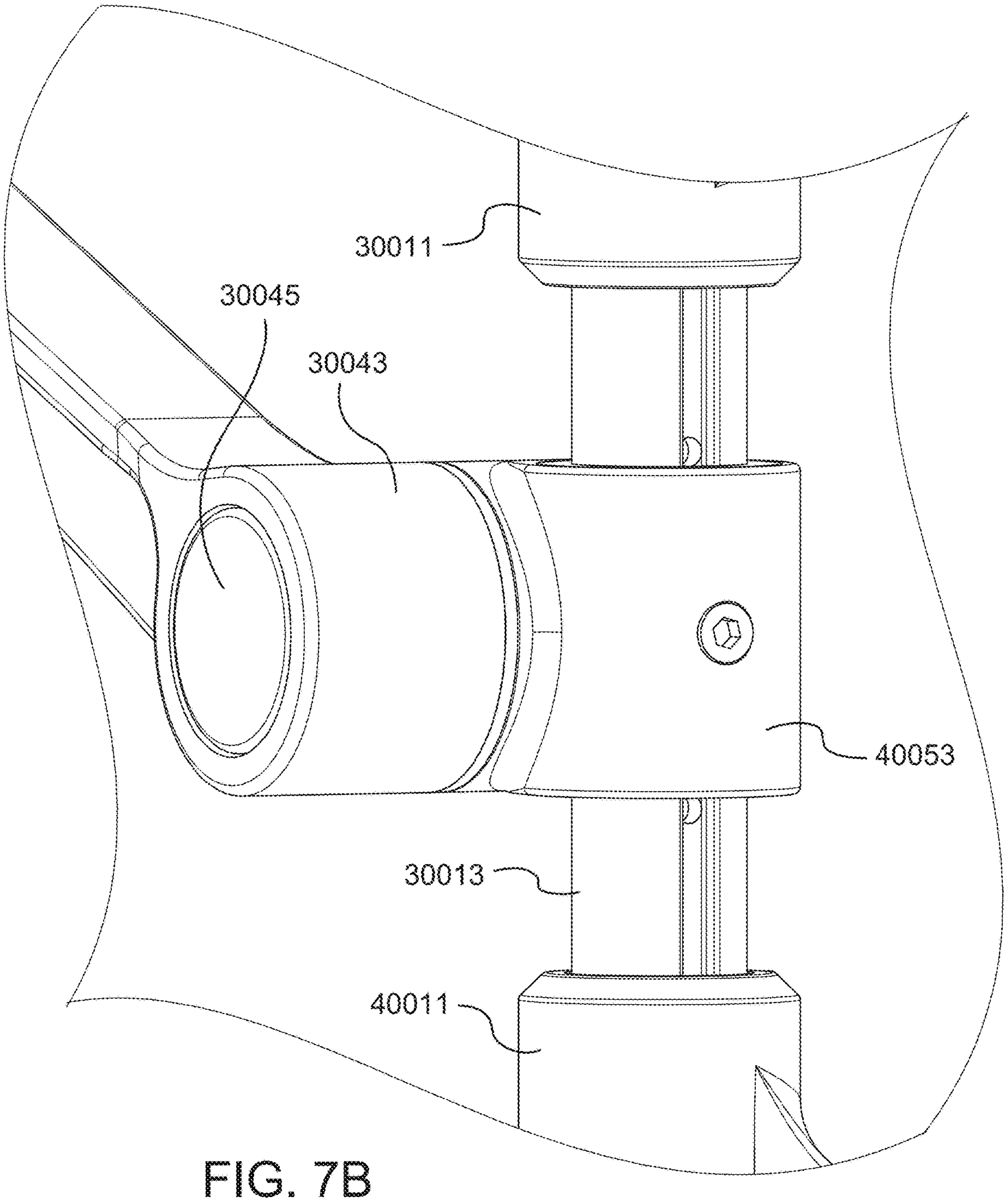
FIG. 7B is a schematic perspective detailed diagram of the first configuration of the armrest mount bracket, armrest, and vertical back frame cane of the present teachings.
Figure 7C:
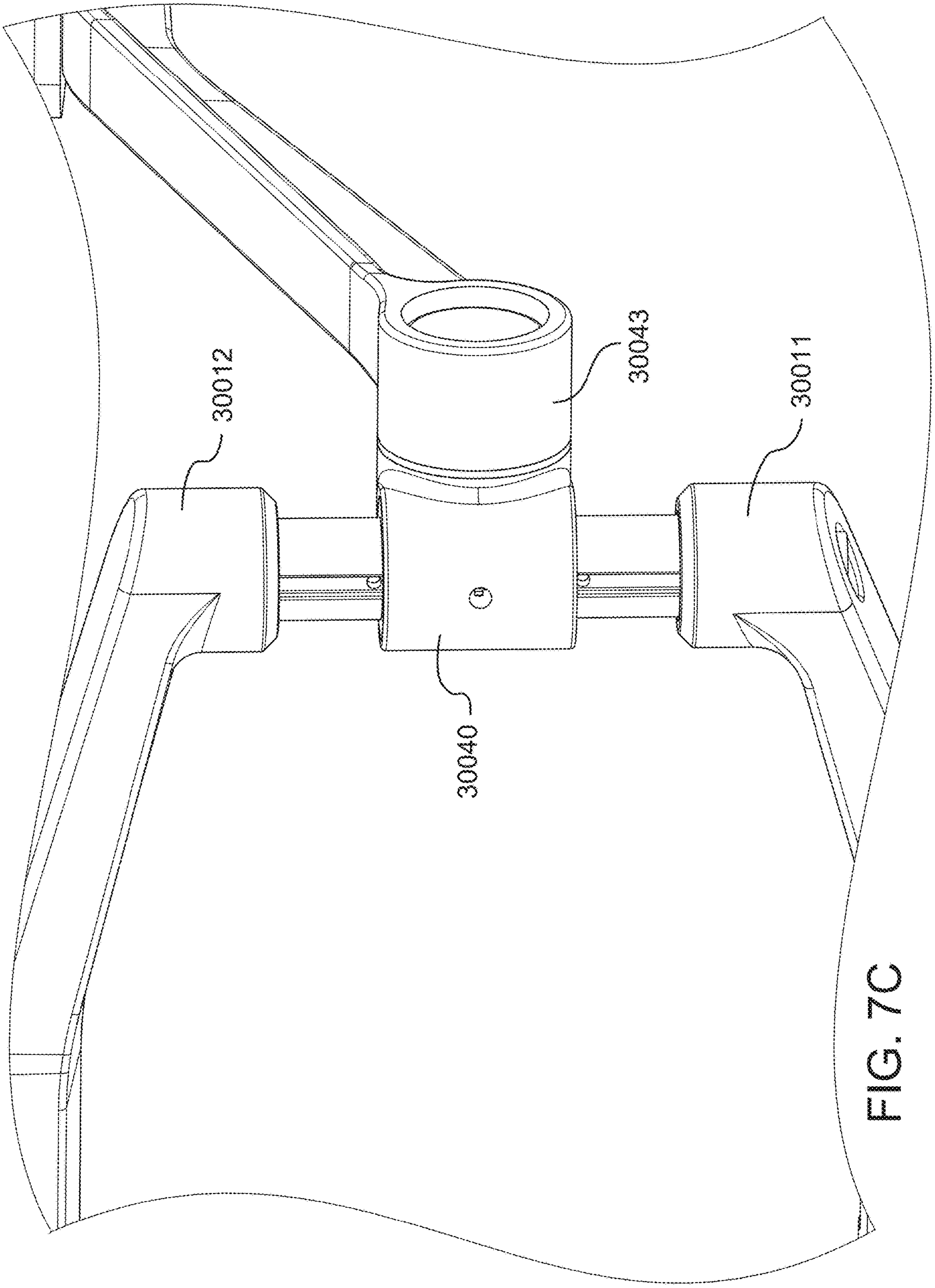
FIG. 7C is a schematic perspective detailed first view diagram of the second configuration of the armrest mount bracket, armrest, and vertical back frame cane of the present teachings.
Figure 7D:
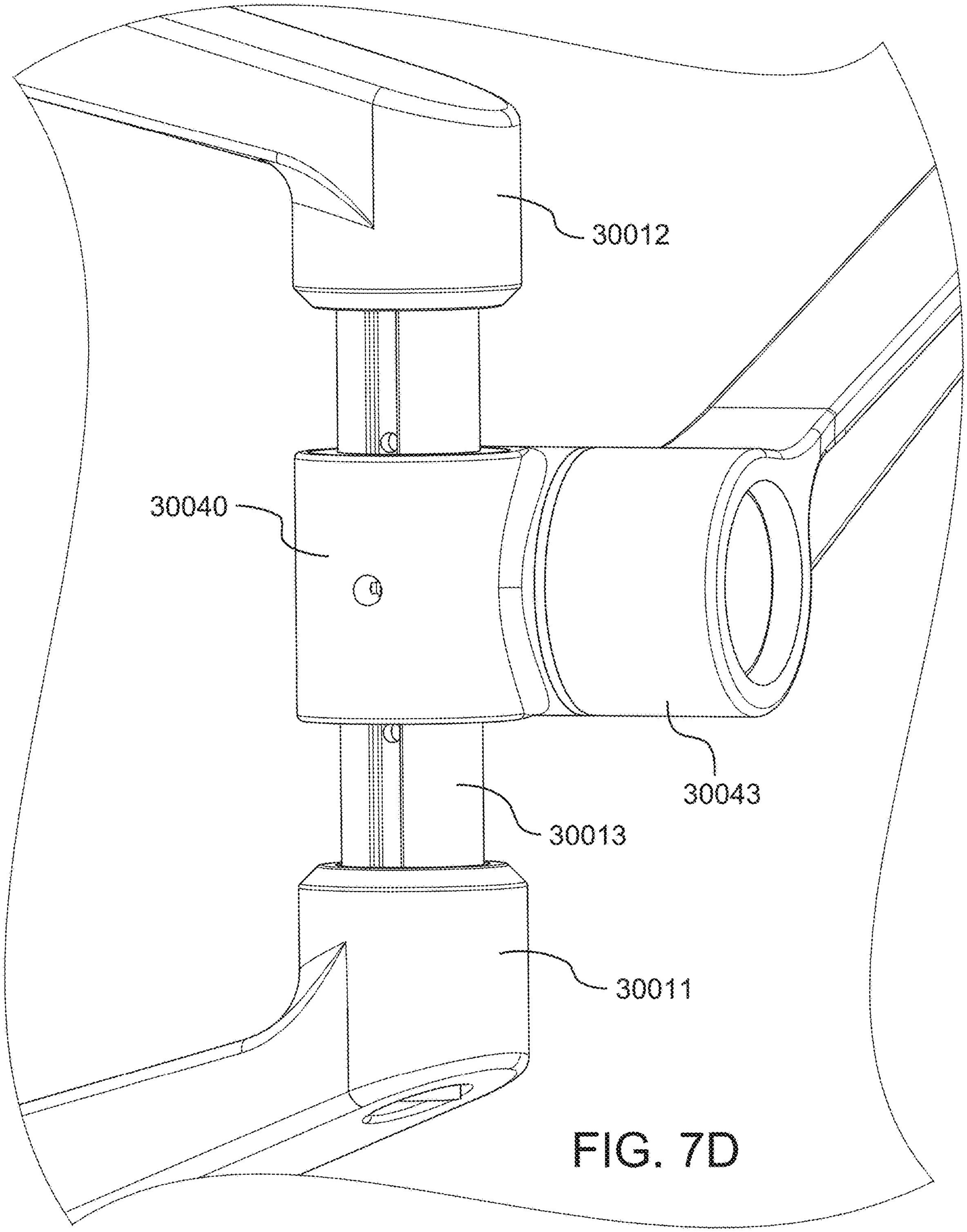
FIG. 7D is a schematic perspective detailed second view diagram of the second configuration of the armrest mount bracket, armrest, and vertical back frame cane of the present teachings.
Figure 7E:
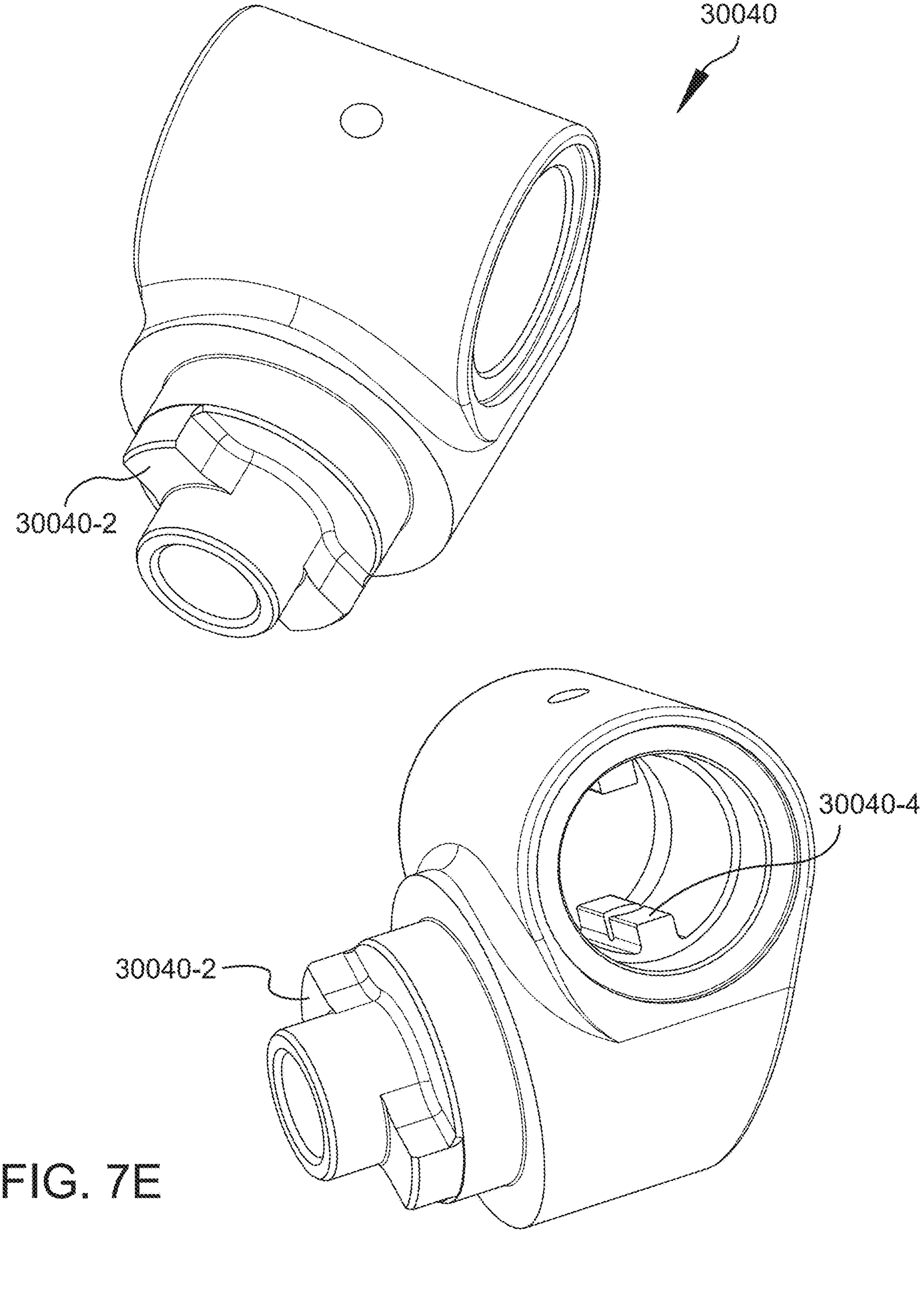
FIGS. 7E-7G are various views of schematic perspective diagrams of the second configuration of the armrest mount bracket of the present teachings.
Figure 7F:
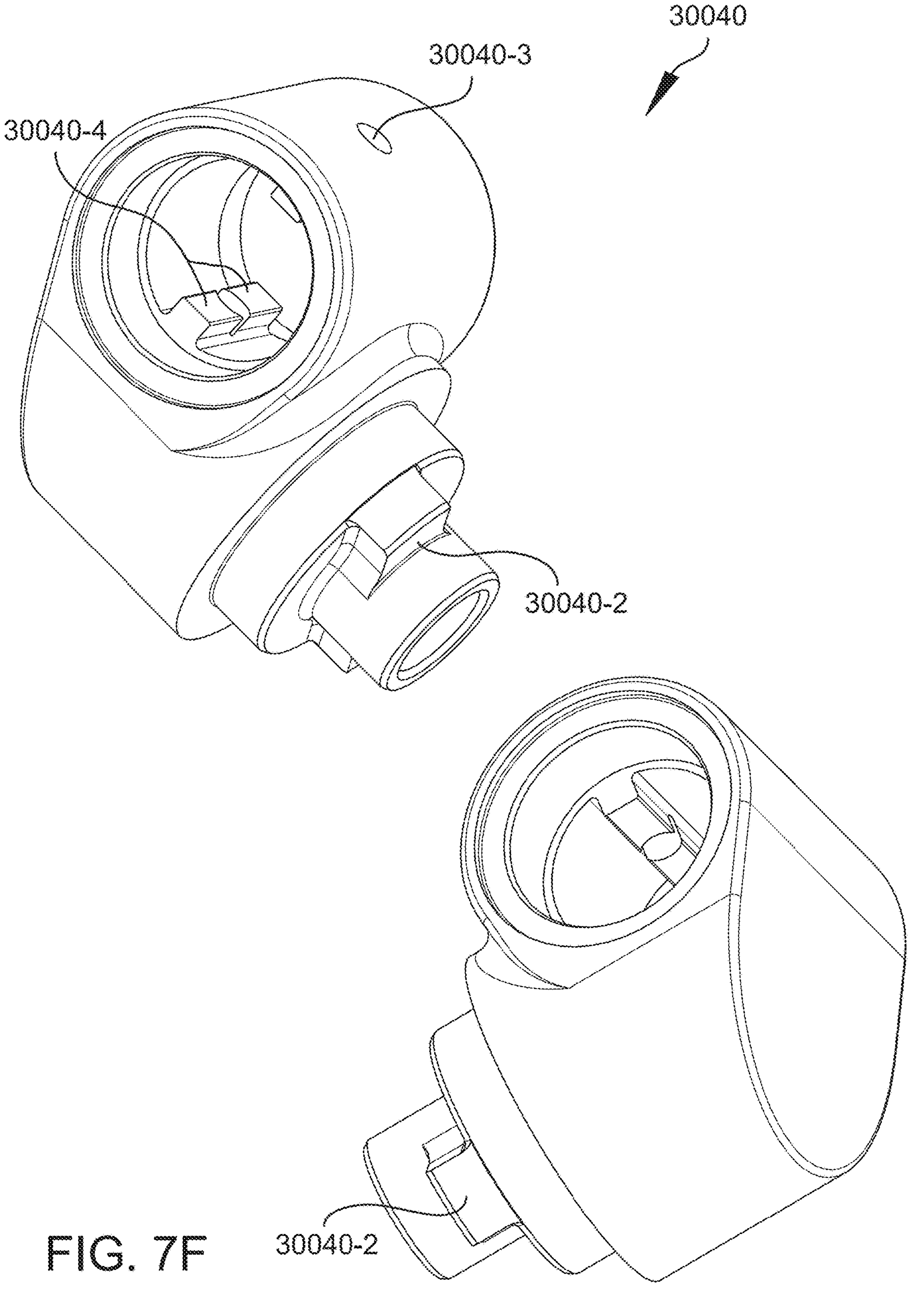
Figure 7G:
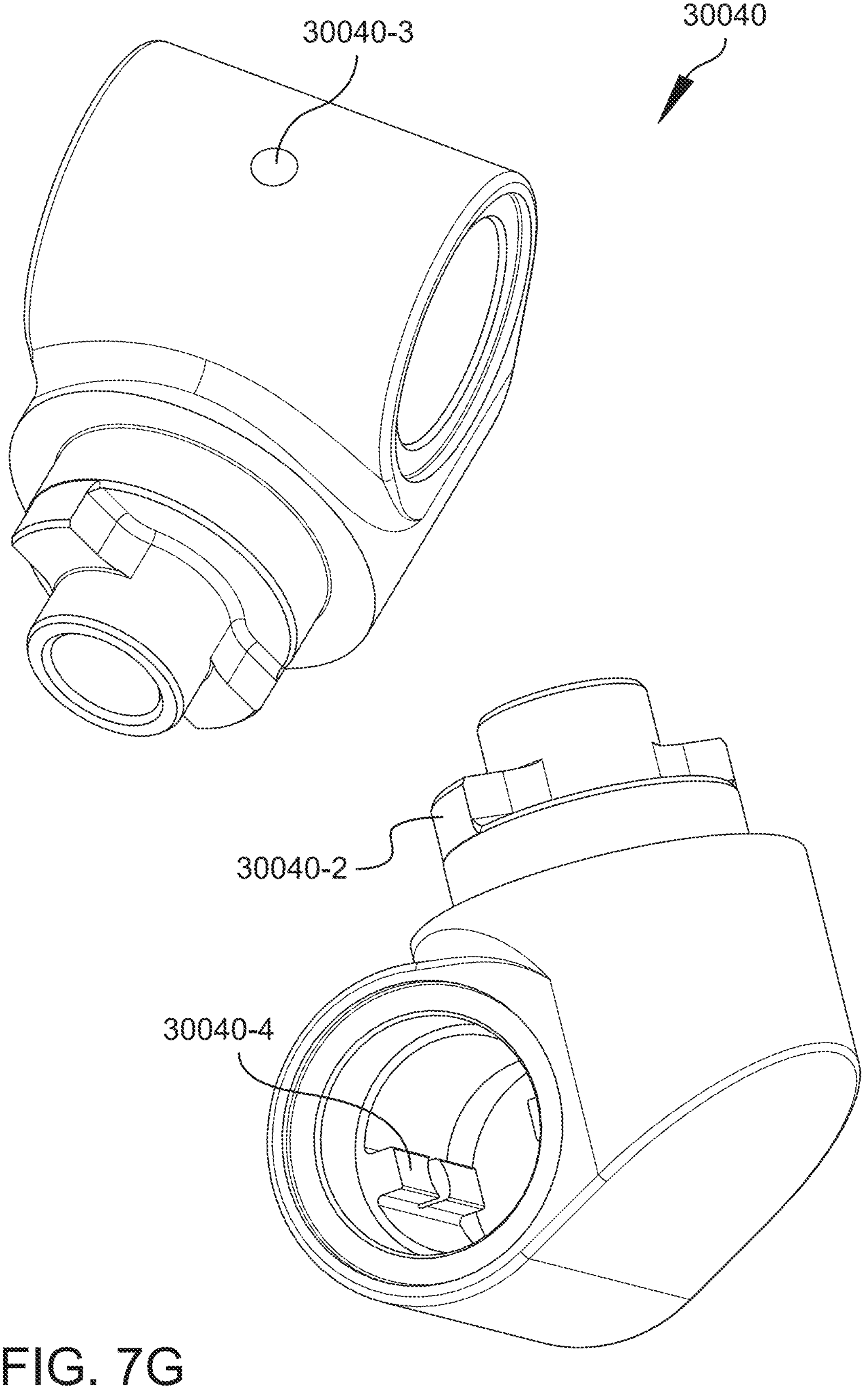

Referring now to FIGS. 7B-7D, armrest structure 30043 (FIG. 7B) can operably couple with first configuration armrest mount bracket 40053 (FIG. 7B), that can slide along vertical back frame cane 30013 (FIG. 7B). Armrest structure 30043 (FIG. 7C) can also operably couple with second configuration armrest mount bracket 30040 (FIG. 7C).

Figure 7H:
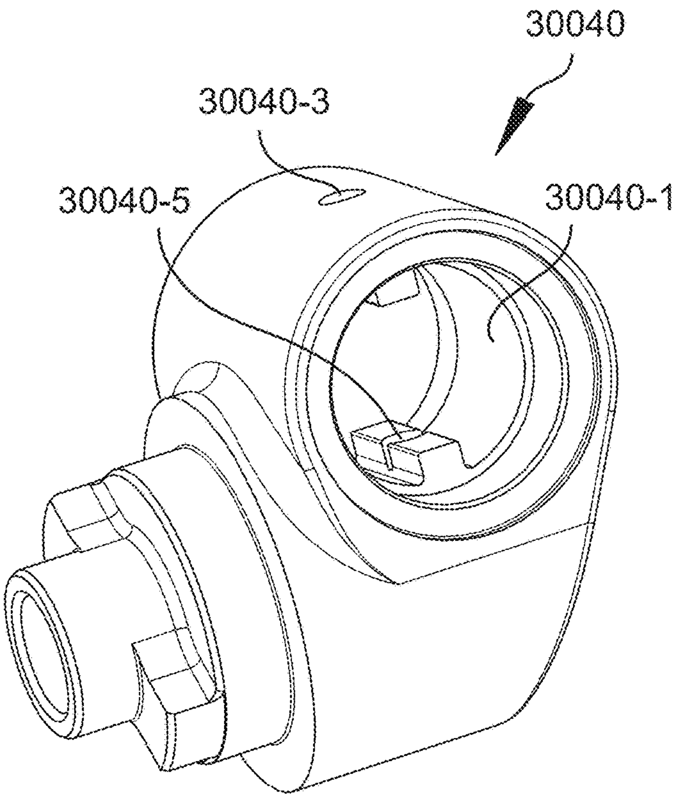
FIG. 7H is a cross section diagram of the second configuration of the armrest mount bracket of the present teachings.
Figure 7H:
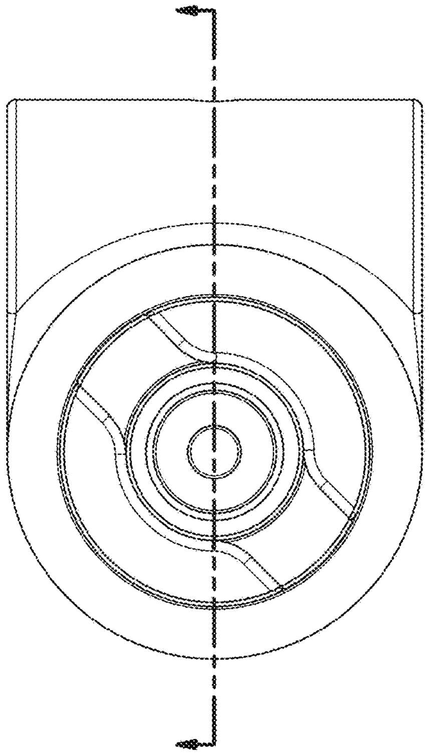
Figure 7H:
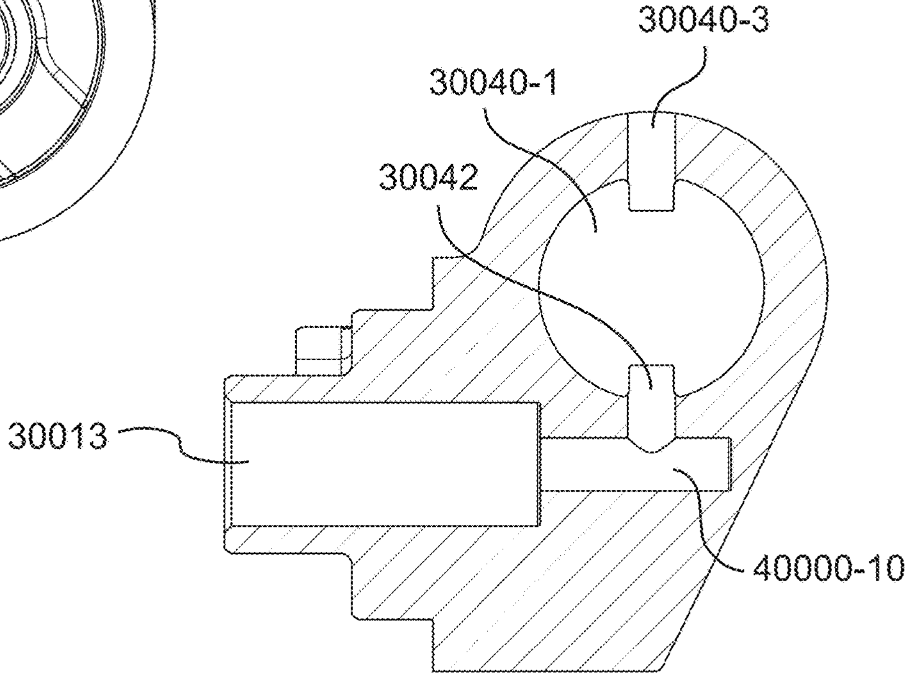
Figure 7I:
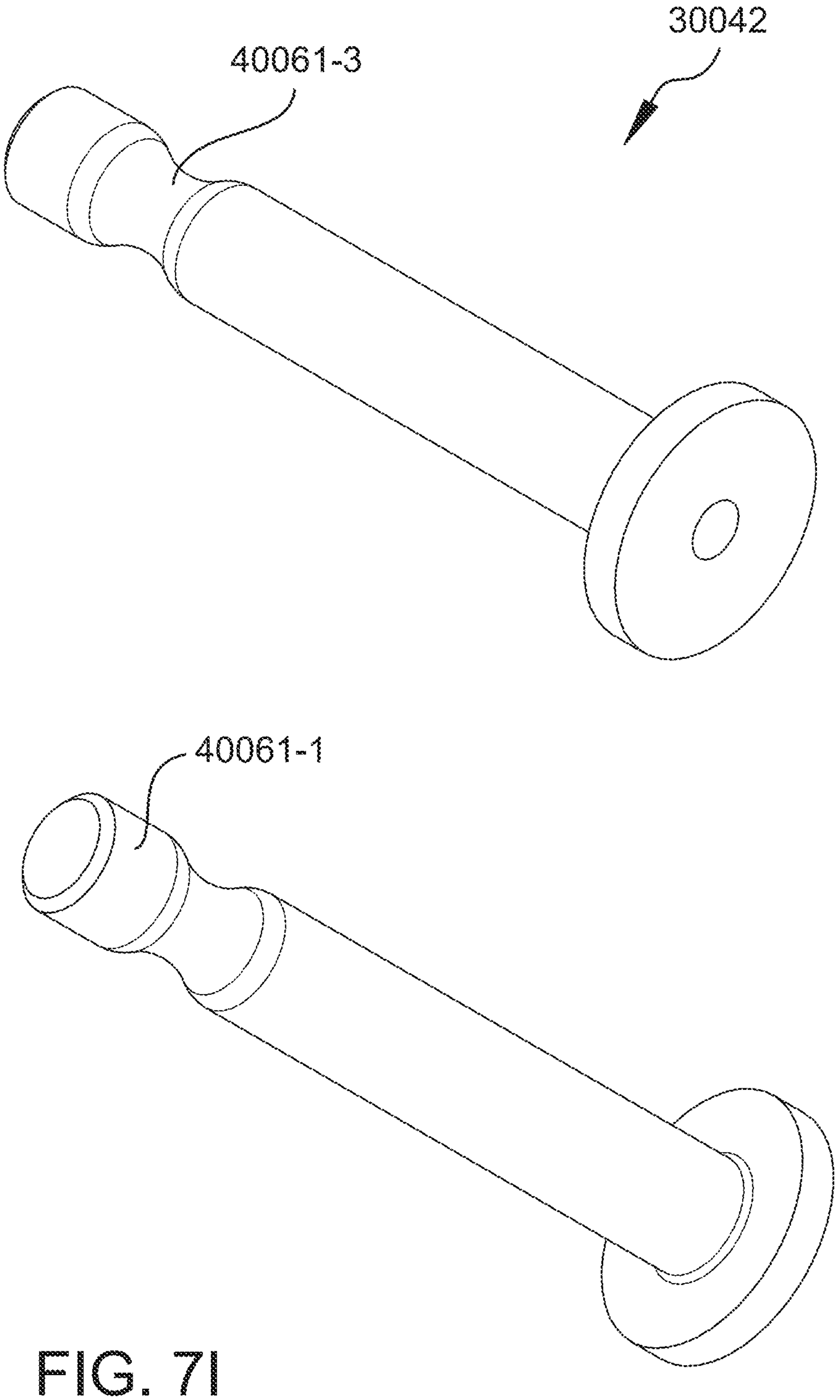
FIG. 7I is a perspective diagram of the button slide of the present teachings.
Figure 7J:
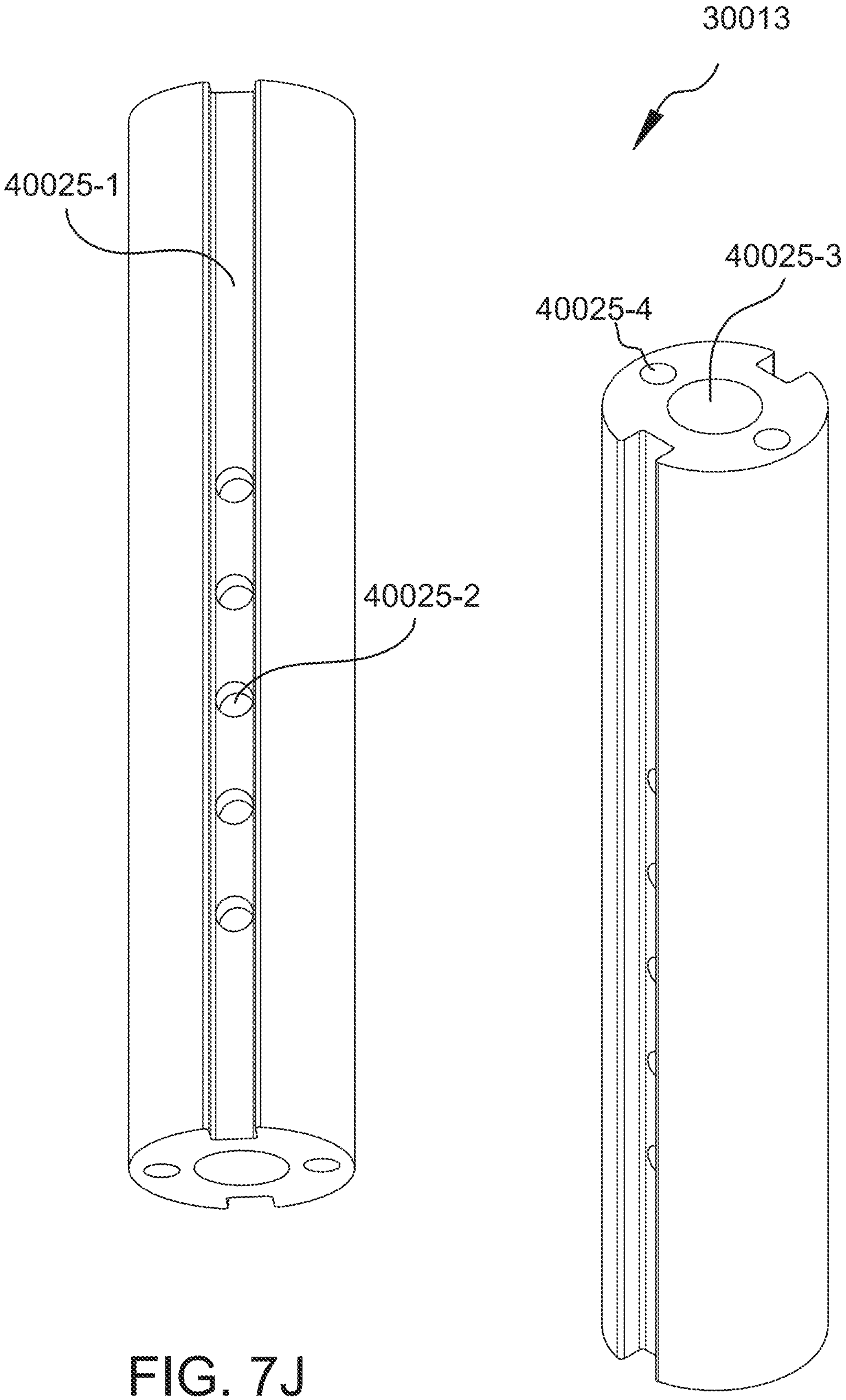
FIG. 7J is a perspective diagram of the vertical back frame cane of the present teachings.
Figure 7K:
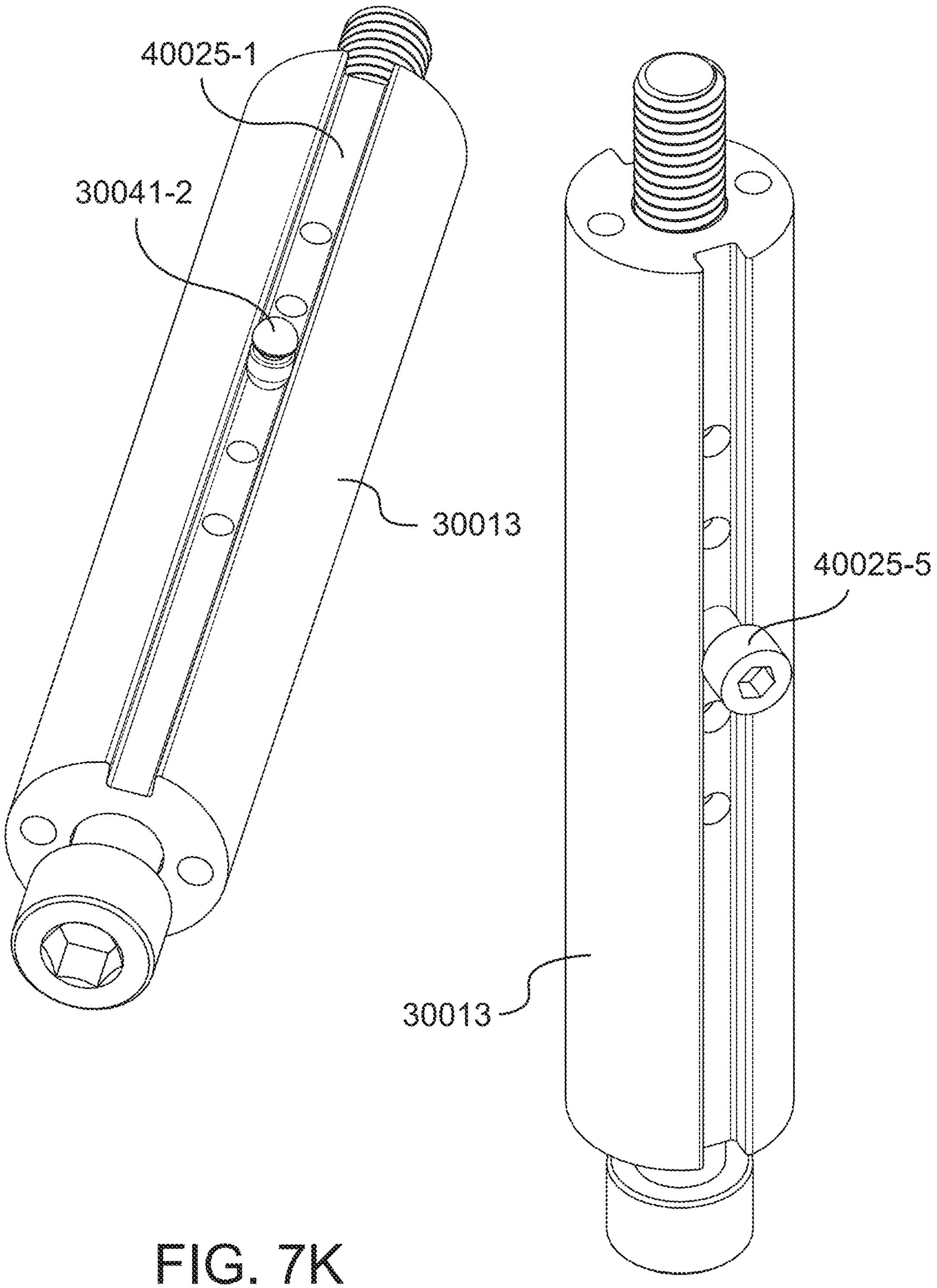
FIG. 7K is a perspective diagram of the vertical back frame cane operably coupled with the top back frame bracket and the rear tube holder bracket of the present teachings.
Figure 7L:
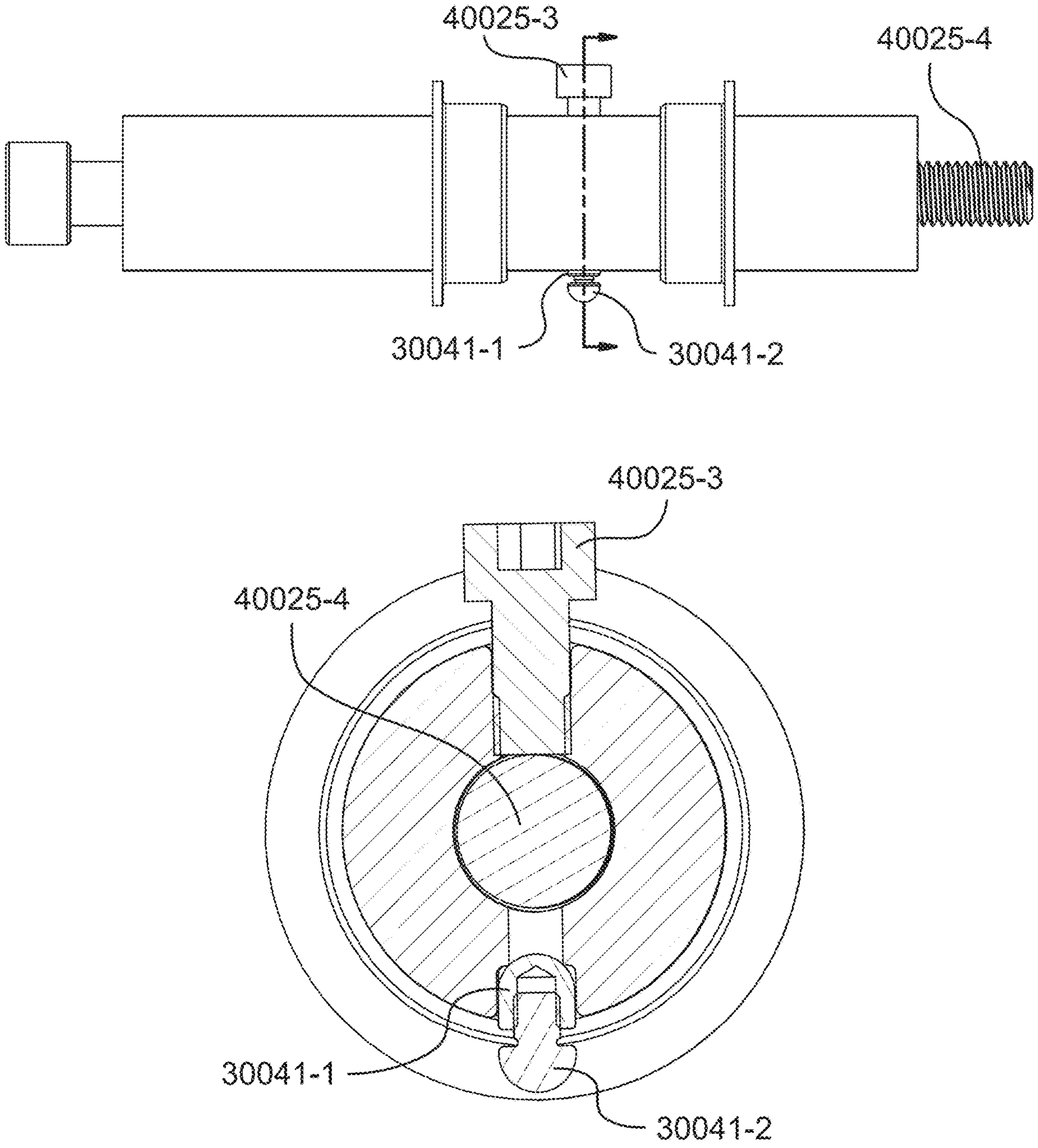
FIG. 7L is a cross section diagram of the female and male lock pins engaged with the vertical back frame cane of the present teachings.

Referring now to FIGS. 7E-7H, second configuration armrest mount bracket 30040 can include rectangular alignment tabs 30040-4 that can surround and admit female lock pin 30041-2 (FIG. 2A) at recess 30040-5 (FIG. 7H) and can rest in cane cavity 40025-1 (FIG. 7J). Alignment tabs 30040-4 can maintain the position of vertical back frame cane 30013 (FIG. 7D) within second configuration armrest mount bracket 30040. At least one armrest wing 30040-2 can enable alignment of second configuration armrest mount bracket 30040 with armrest structure 30043 (FIG. 1). Adjustment screw cavity 30040-3 can accommodate adjustment screw 40025-3 (FIG. 7K). Vertical back frame cane 30013 (FIG. 2A) can rest within mount bracket cavity 30040-1 (FIG. 7H). Positional maintenance pins (not shown) can rest in pin cavities 40025-4 (FIG. 7J) to maintain the position of second configuration vertical back frame cane 30013 (FIG. 7D) between second configuration top back frame bracket 30012 (FIG. 2A) and rear tube holder bracket 30011 (FIG. 2A).

Figure 8A:
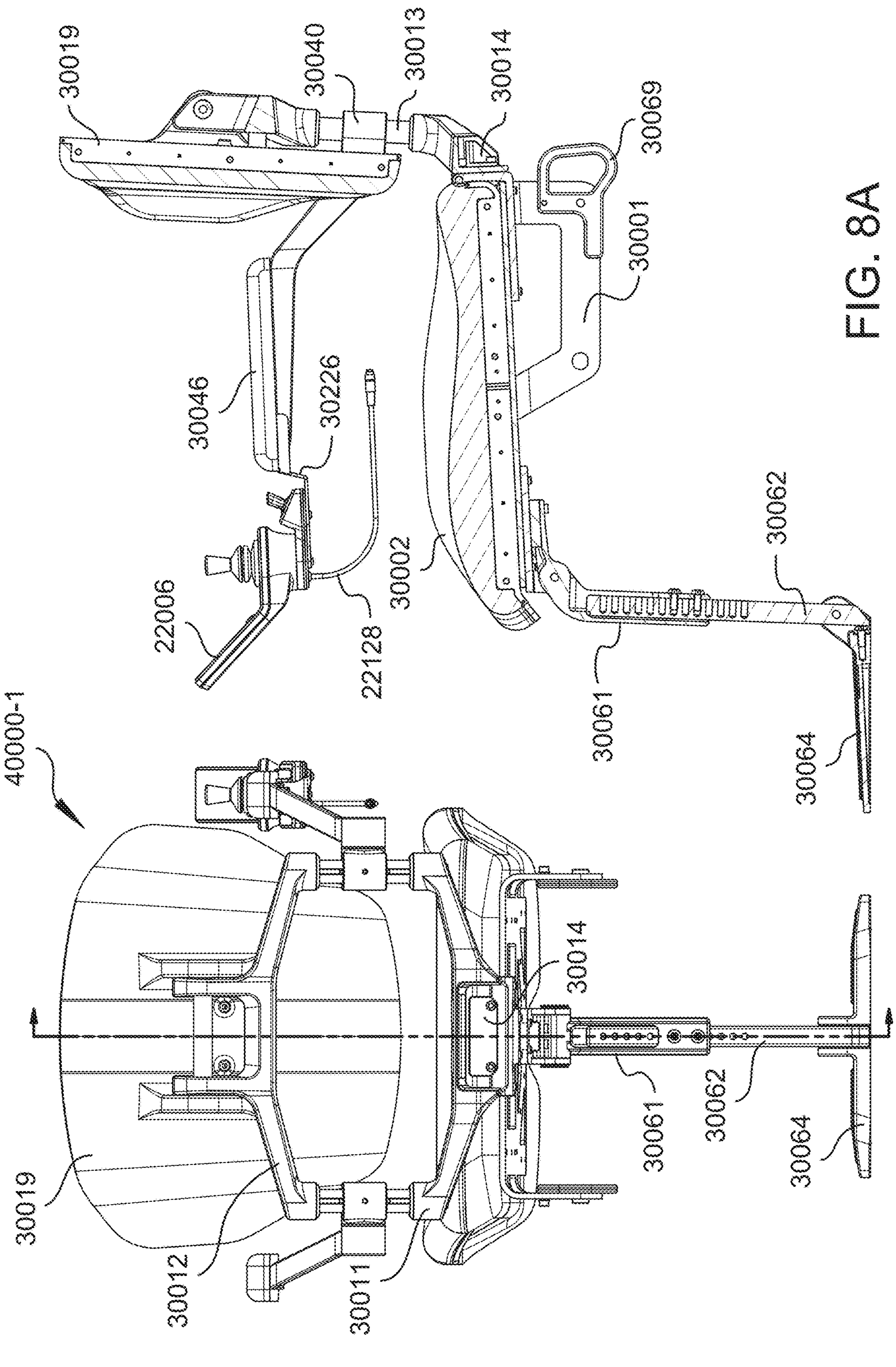
FIGS. 8A-8B are cross section diagrams of the footrest assembly operably coupled with the seat bracket of the present teachings.
Figure 8B:
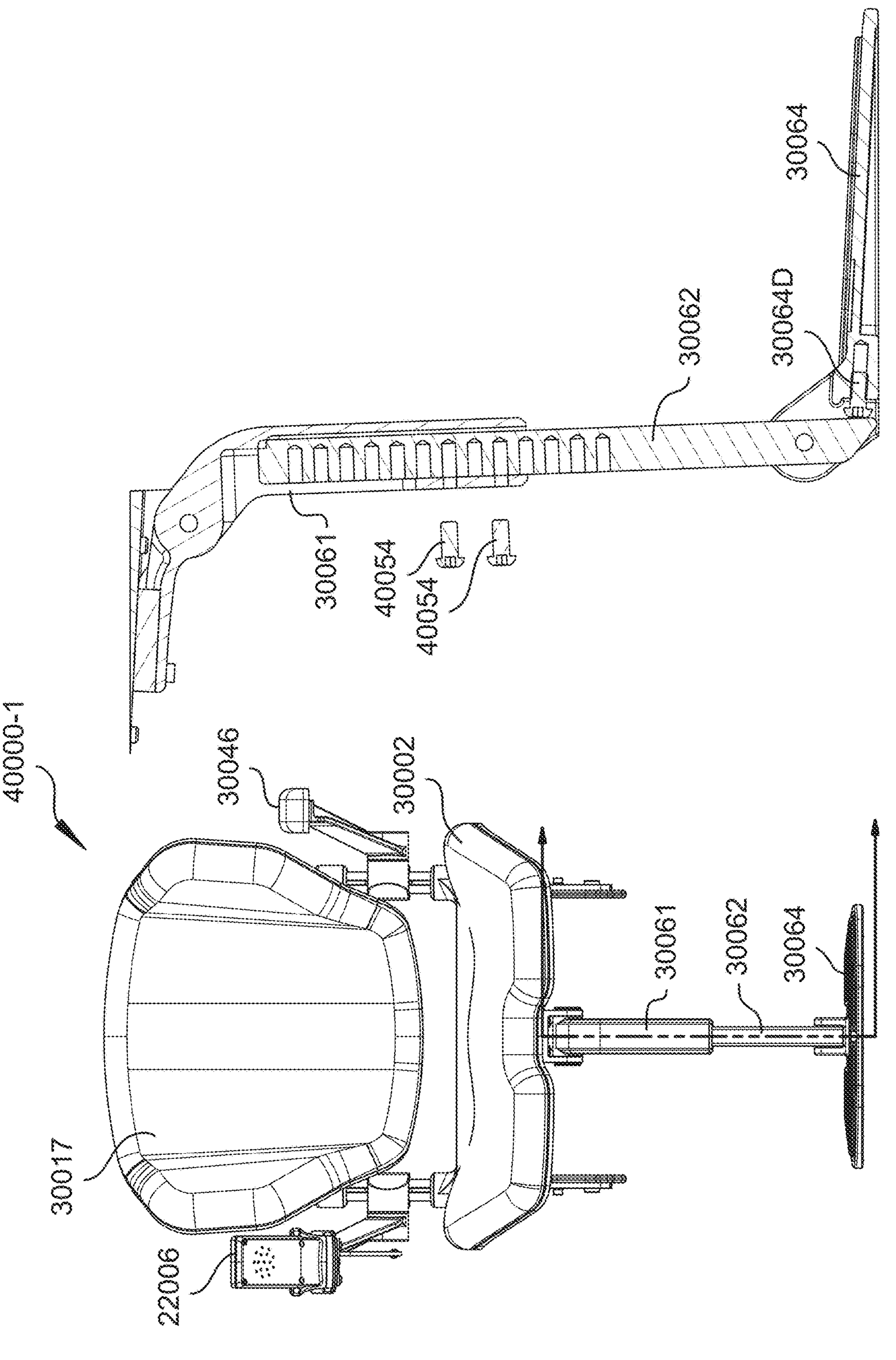

Referring now to FIGS. 8A and 8B, second configuration footrest 30064, second configuration lower footrest post 30062, and second configuration upper footrest post 30061 can combine to provide a footrest structure for seat assembly 40000-1. The height of footrest 30064 can be adjusted by raising and lowering second configuration lower footrest post 30062. The height can be secured by engaging a fastening means such as, for example, but not limited to, at least one screw 40054 coupling fastening cavities of second configuration upper footrest post 30061 and second configuration lower footrest post 30062. The angle of footrest 30064 can be adjusted by turning screw 30064D (FIG. 8B) either counterclockwise or clockwise, depending on the desired angle with respect to second configuration lower footrest post 30061.

Figure 8C:
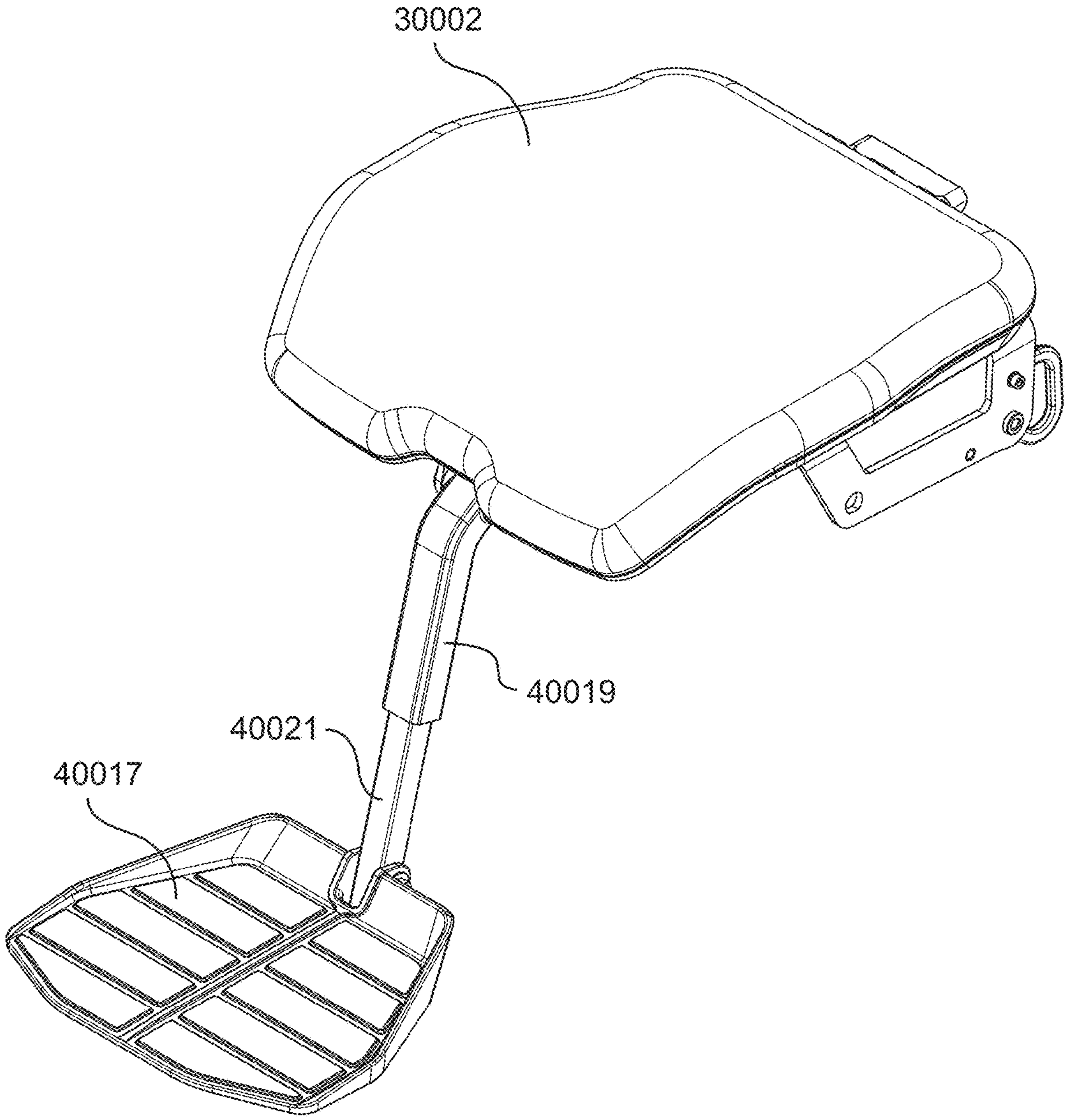
FIG. 8C is a perspective diagram of the first configuration of the footrest assembly and seat cushion of the present teachings.

Referring now to FIG. 8C, in some configurations, the orientation of first configuration upper footrest post 40019 and first configuration lower footrest post 40021 can be adjusted forwards and backwards relative to the direction of motion and seat cushion 30002. In some configurations, the position of first configuration footrest 40017 can be adjusted forwards and backwards to accommodate the comfort needs of the user. First configuration lower footrest post 40021 can telescope into first configuration upper footrest post 40019 to enable adjustment of the length of the footrest structure. In some configurations, the relative positions of first configuration lower footrest post 40021 and first configuration upper footrest post 40019 can be maintained by fastening means such as, for example, but not limited to, screws, bolts, hook-and-eye fasteners, and glue.

Figure 8D:
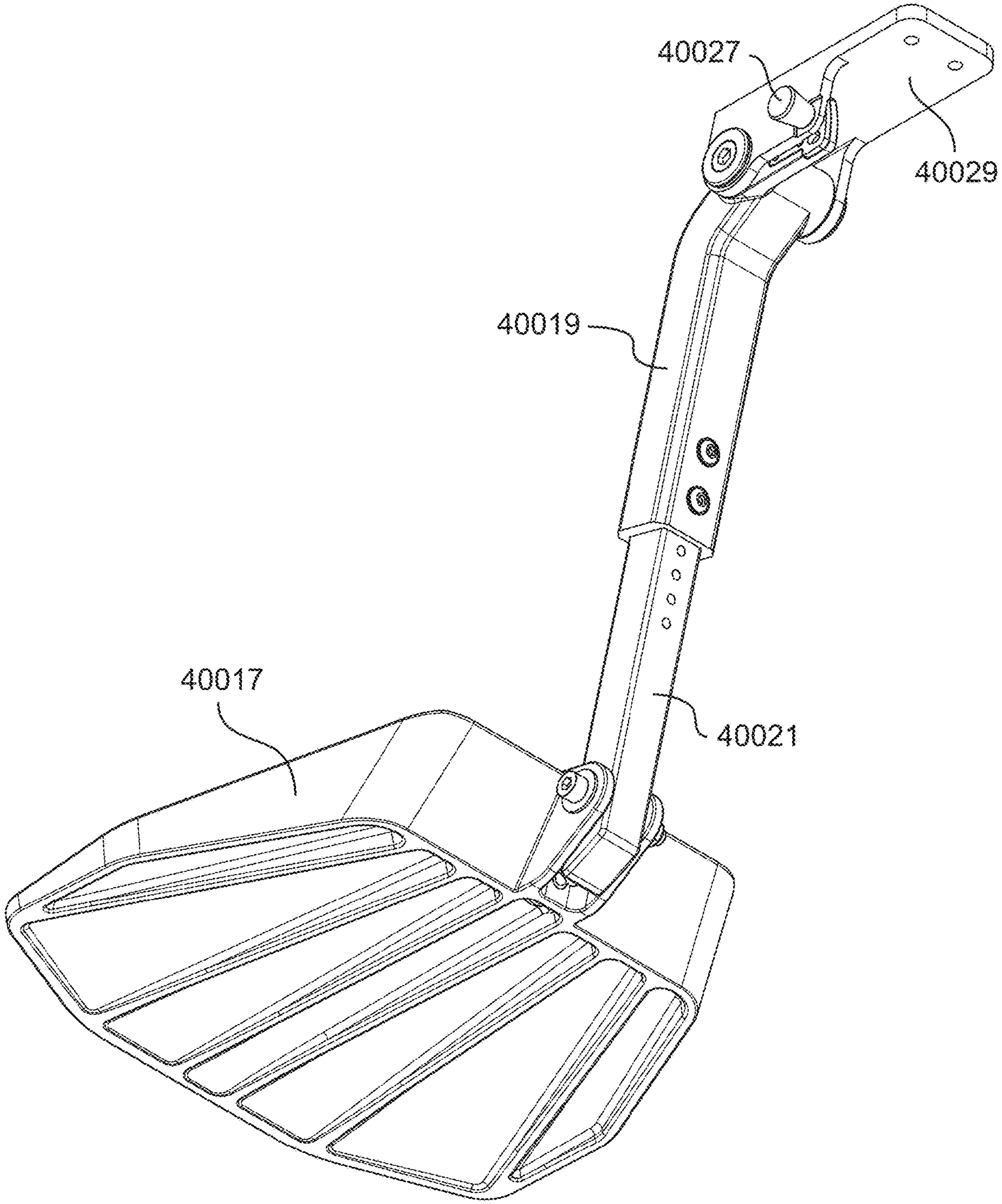
FIG. 8D is a perspective diagram of the first configuration of the footrest assembly of the present teachings.
Figure 8E:
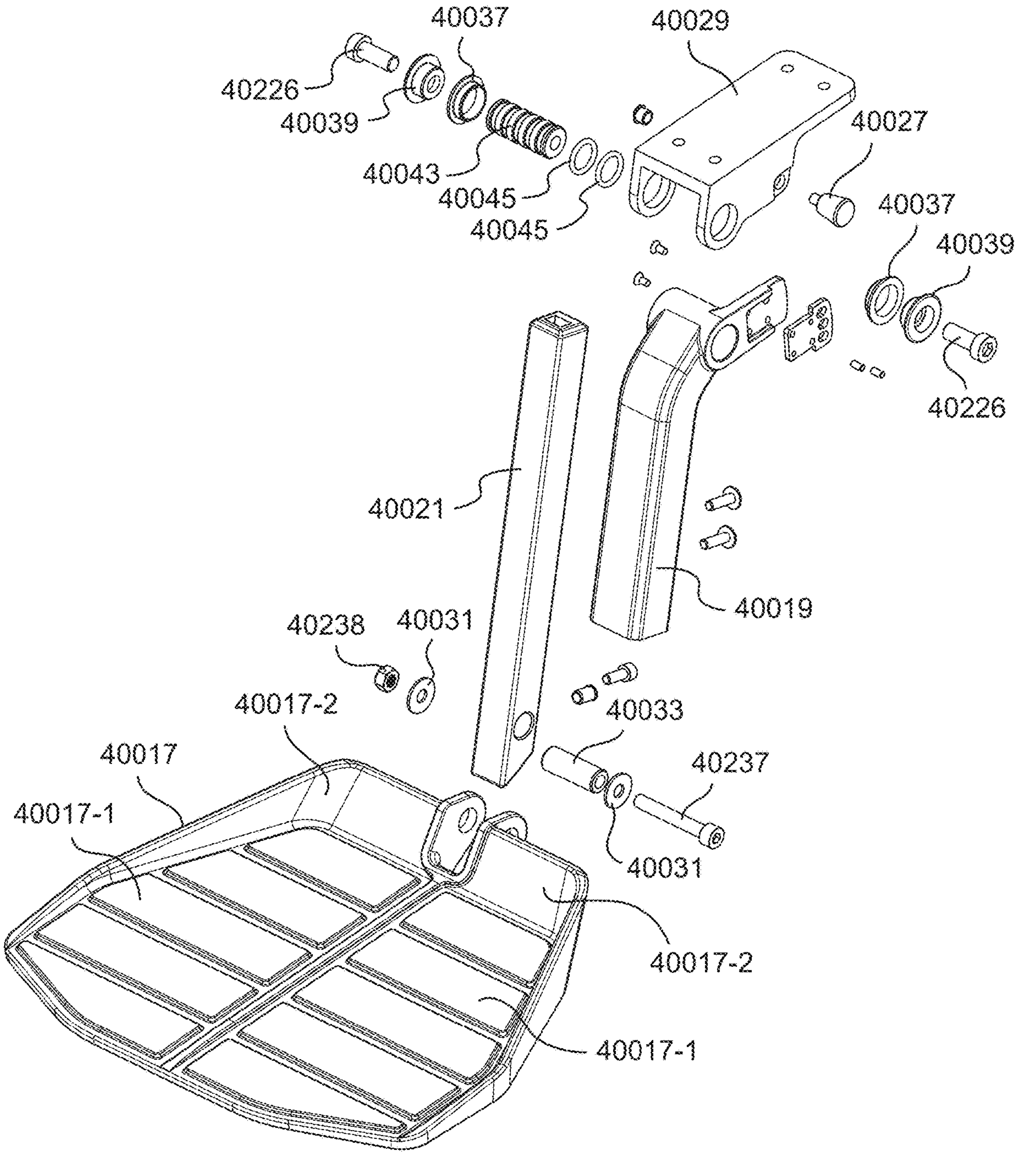
FIG. 8E is a perspective exploded diagram of the first configuration of the footrest assembly of the present teachings.
Figure 8F:
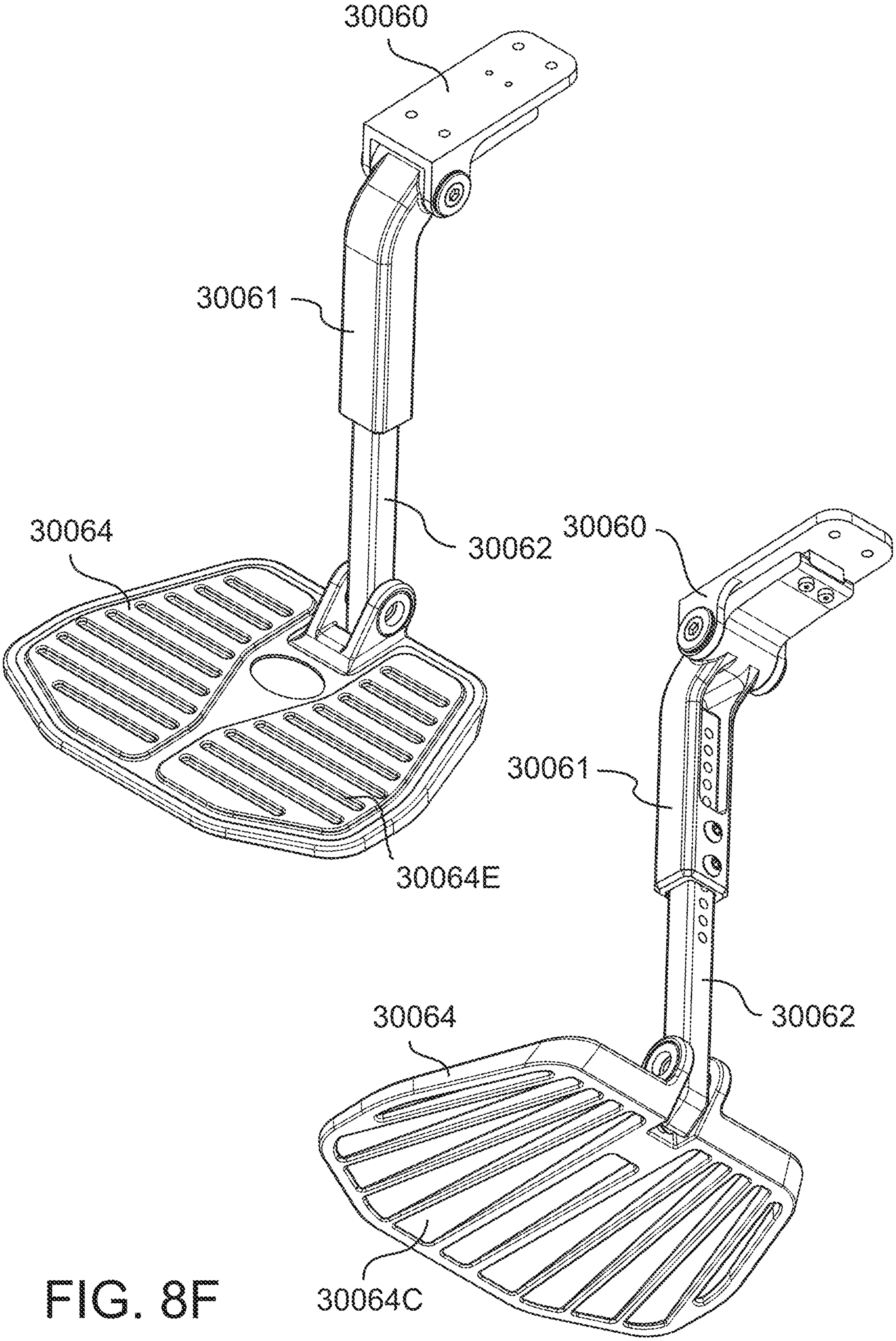
FIG. 8F is a perspective diagram of the second configuration of the footrest assembly of the present teachings.
Figure 8G:
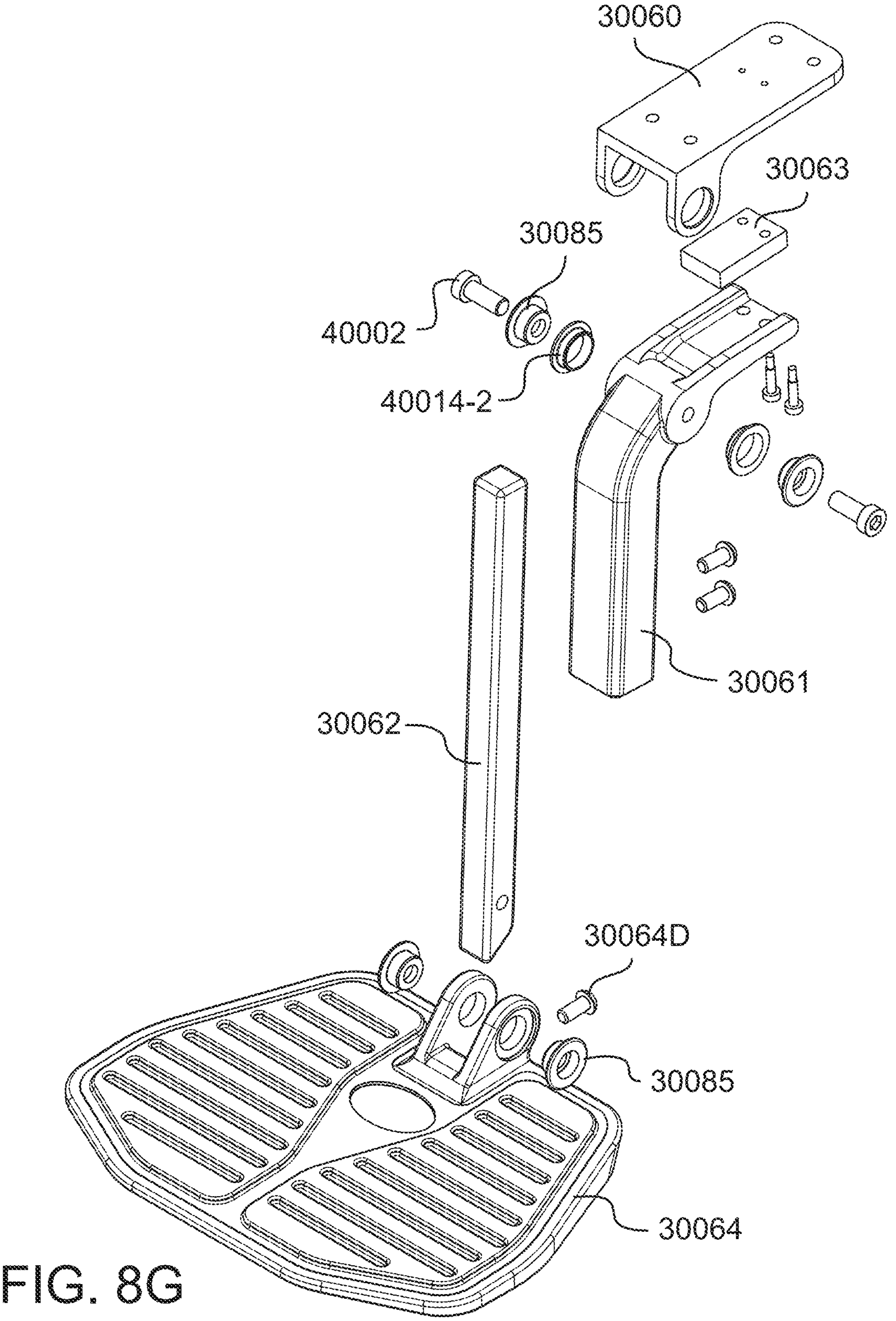
FIGS. 8G-8H are perspective exploded diagrams of the second configuration of the footrest assembly of the present teachings.

Referring now to FIGS. 8D-8E, footrest mount bracket 40029 can operably couple the footrest structure with seat pan mounting bracket 30001 (FIG. 4A). Upper footrest spacer 40043 (FIG. 8E), legrest flanged bushing 40037 (FIG. 8E), recessed bolthead washer 40039 (FIG. 8E), legrest swing bolt 40226 (FIG. 8E), and footrest o-ring 40045 (FIG. 8E) can, in combination, enable limited forward-backward movement of upper footrest post 40019. The forward position of the footrest structure can be maintained by spring plunger 40027. Lower footrest spacer 40033 (FIG. 8E), footrest swing bolt 40237 (FIG. 8E), footrest washer 40031 (FIG. 8E), and footrest nut 40238 (FIG. 8E) can, in combination, enable folding of first configuration footrest 40017 towards lower footrest post 40021. First configuration footrest 40017 can accommodate both feet, and can be constructed as a single item or in parts. The foot-facing surface of first configuration footrest 40017 can include non-slip features 40017-1 and rear stop 40017-2.

Figure 8H:
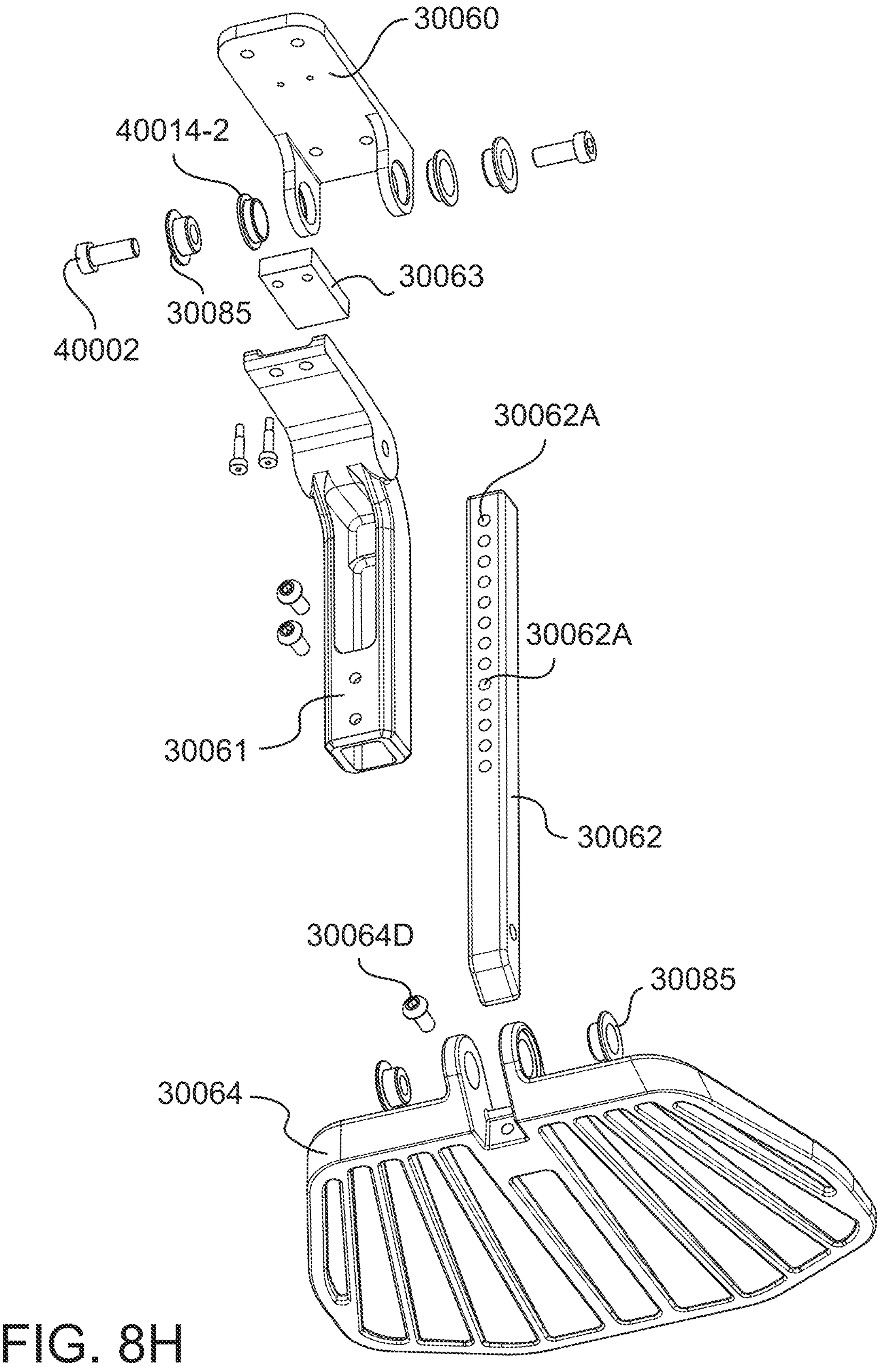
Figure 8I:
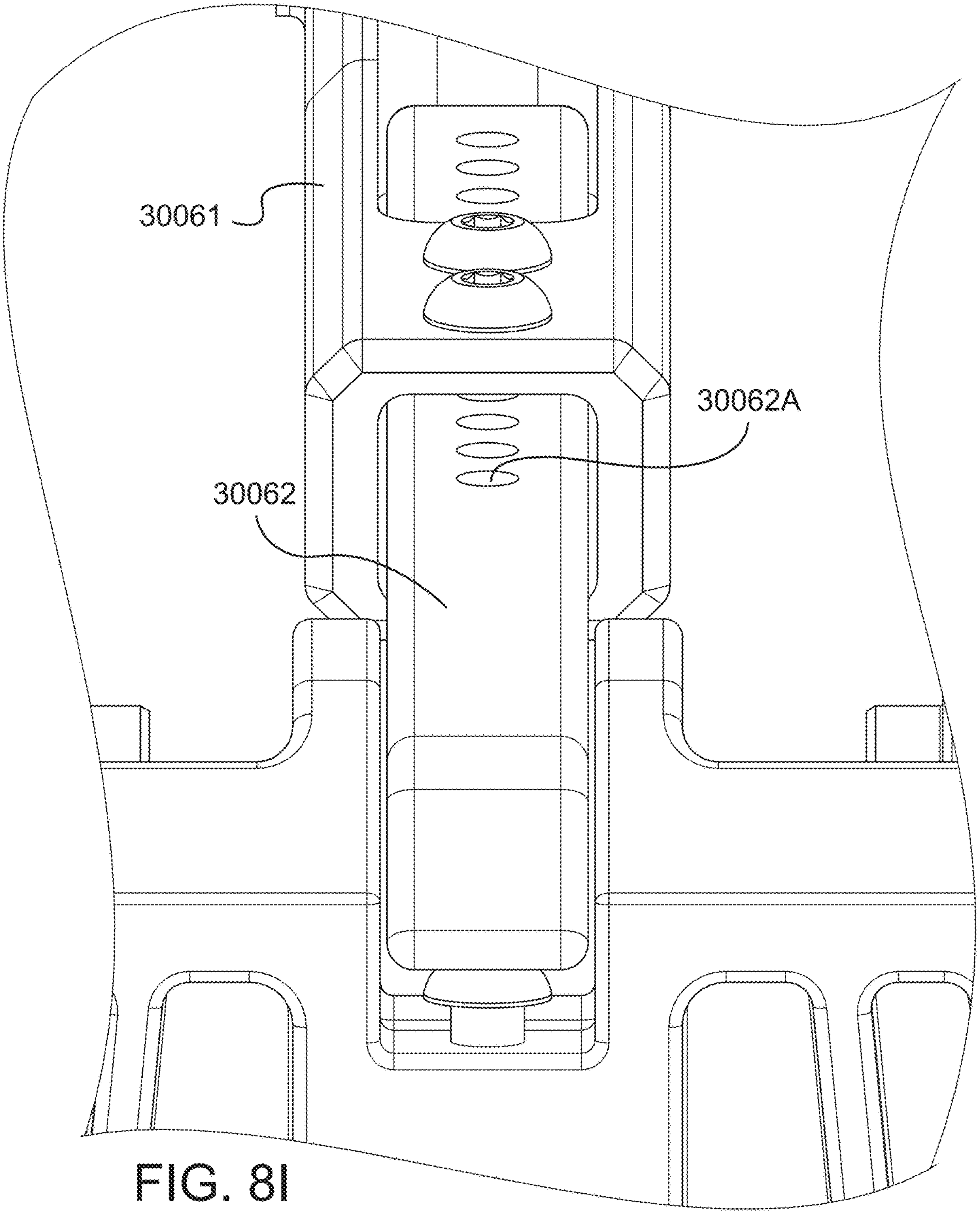
FIG. 8I is a detailed diagram of the footrest mounting rods of the present teachings.

Referring now to FIGS. 8F-8I, second configuration footrest 30064 can be operably coupled with second configuration lower footrest post 30062, which can cooperatively engage with second configuration upper footrest post 30061 to raise and lower footrest 30064. The height of footrest 30064 can be fixed by engaging a fastener into adjustment cavity 30062A when the desired height is attained. Height adjustment can be tooled or tooless, depending upon, for example, the type of fastener used. Second configuration upper footrest post 30061 can be operably coupled with seat bracket 30001 (FIG. 1), by means of footrest bracket 30060, and can include limited backward rotation in response to pressure exerted upon footrest 30064. Bumper 30063, constructed of a compliant material, can buffer the effect of the pressure. Joints in the seat assembly can be reinforced by a combination of recessed bushing 30085 (FIG. 8H), for example, and bolt 40002 (FIG. 8H). Bolt 40002 (FIG. 8H) can be inserted into the recess of recessed bushing 30085 (FIG. 8H) and engaged therein. Any subsequent stress on the joint can be met by both the strength of bolt 40002 (FIG. 8H) itself in addition to the strength of recessed bushing 30085 (FIG. 8H). Further, the head of bolt 40002 (FIG. 8H) can reside within the recess of recessed bushing 30085 (FIG. 8H), maintaining a flush appearance. Other joints in the seat assembly can be constructed in a similar manner. In some configurations, footrest first rib pattern 30064C can differ from footrest second rib patter 30064E. In some configurations, footrest first rib pattern 30064C can accommodate manufacturing and cost requirements, while footrest second rib pattern 30064E can accommodate user slip protection.

Figure 9A:
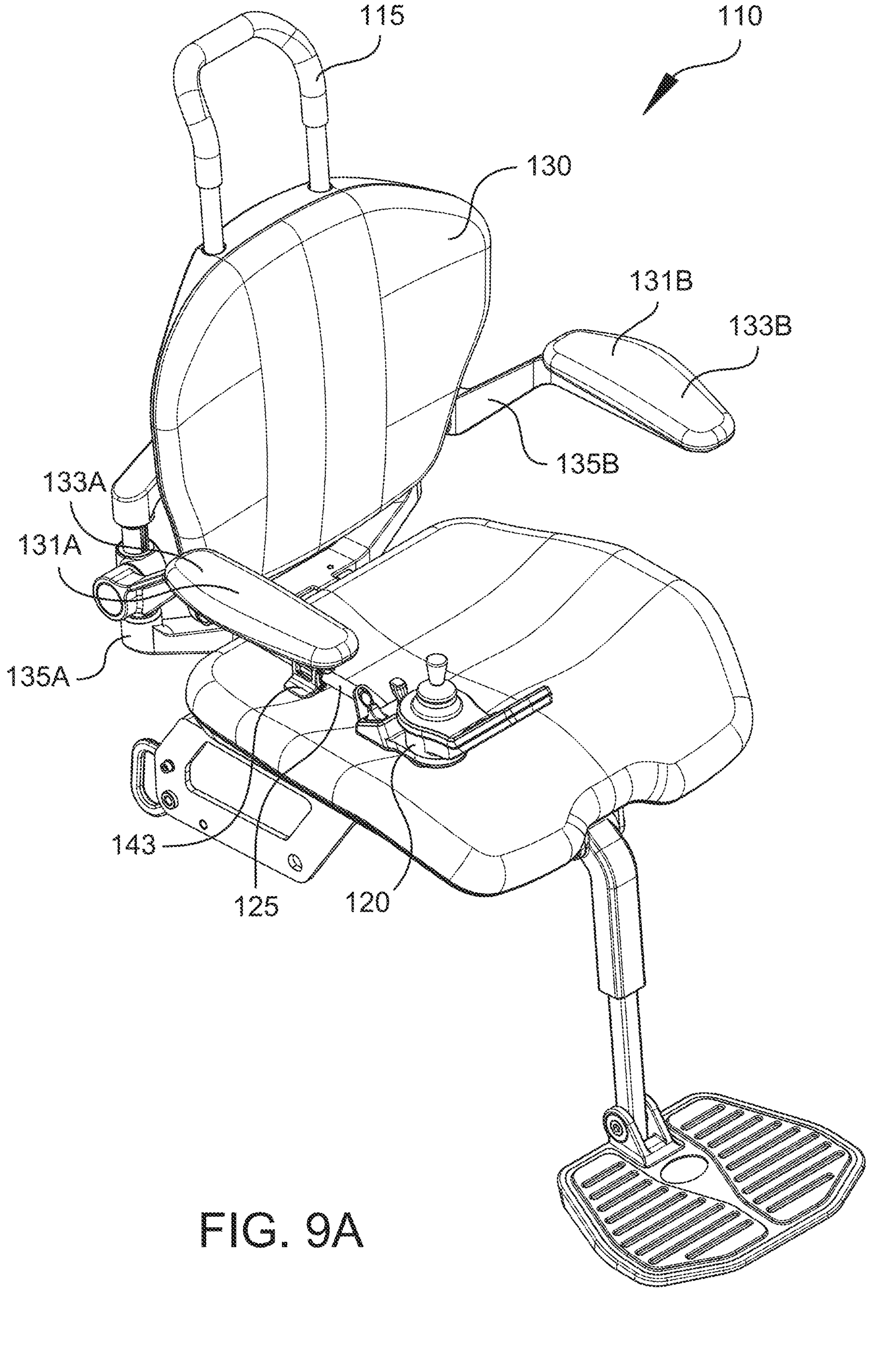
FIGS. 9A-9C are perspective diagrams of another configuration of the seat assembly of the present teachings including a user control mounting means.
Figure 9B:
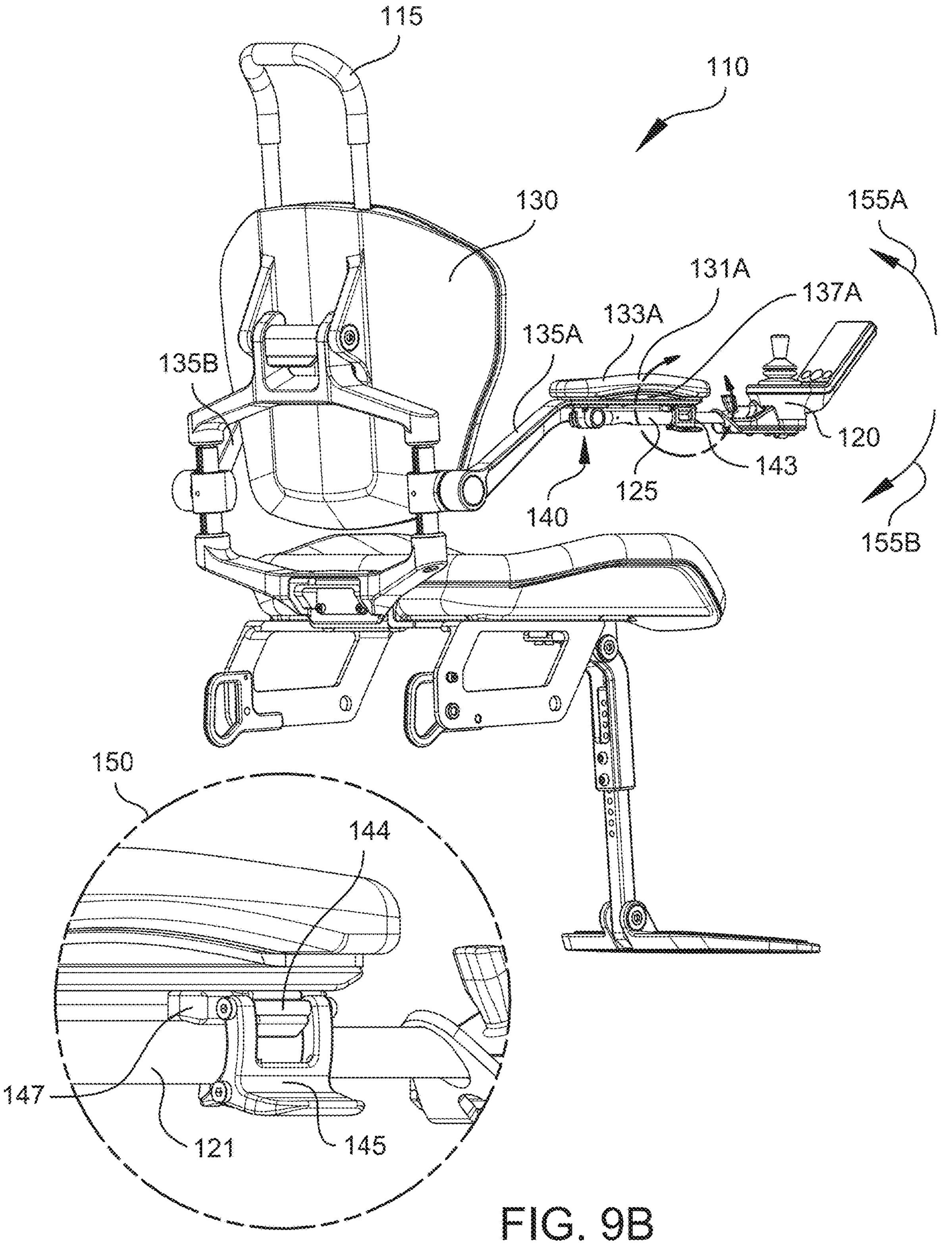
Figure 9C:
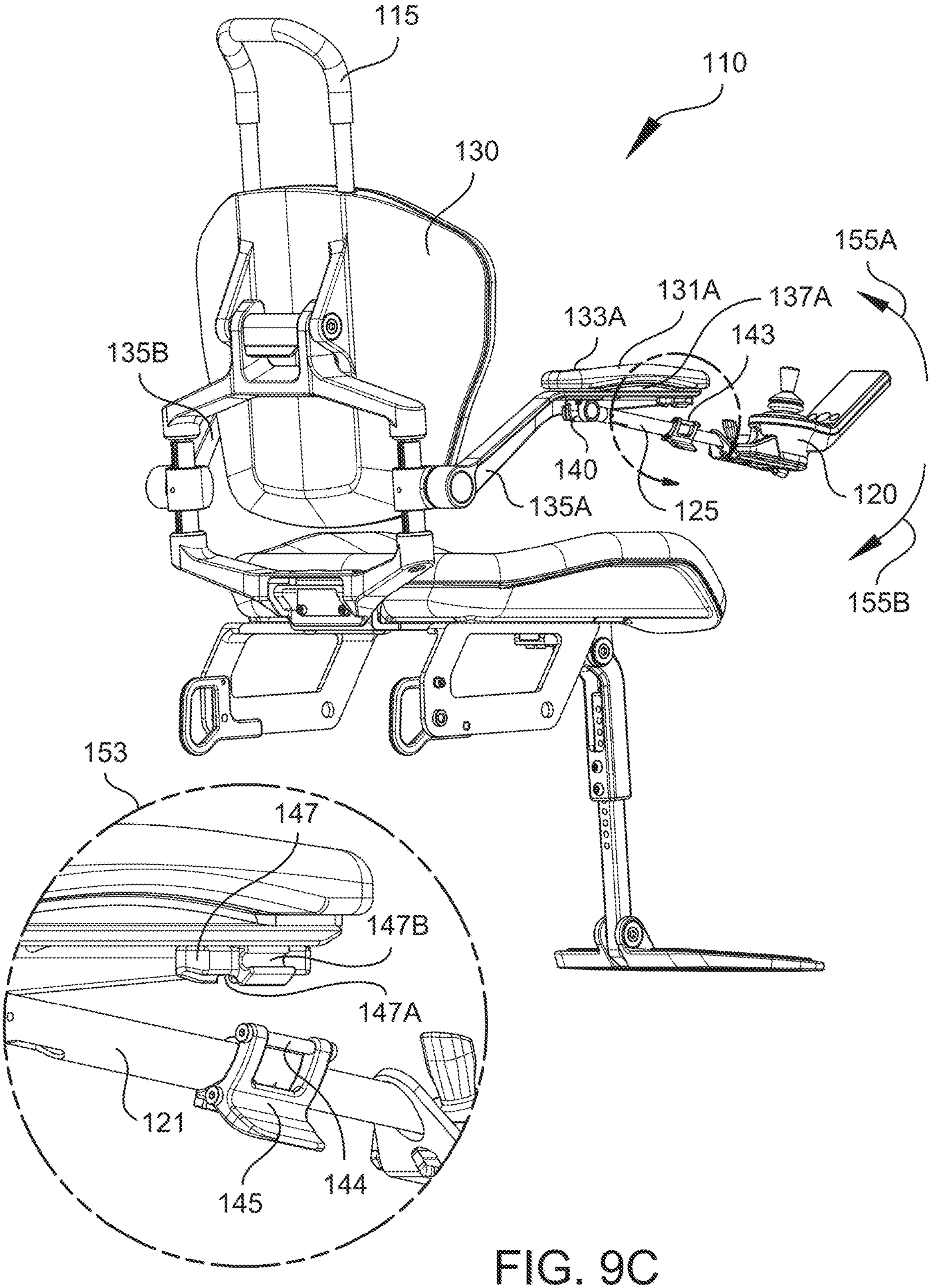

Referring now to FIGS. 9A-9C, a seating assembly 110 can offer a plurality of automated or user-operable features to facilitate expedient performance of routine tasks by user of seating assembly 110, specifically when seating assembly 110 is provided on a wheelchair or any other mobility device. Seating assembly 110 can be further constructed to suit pre-determined requirements of individuals with physical constraints. These physical constraints can range from injuries or issues related to the lower body organs, spinal cord issues or neurological issues damaging communication of brain with other parts of the body. It should be noted that the use of the seating assembly 110 cannot be limited to individuals with above discussed apprehensions only and can be used by any individual irrespective of any physical constraints. Further, seating assembly 110 can be used by individuals of varying ages and body types. Most features of the seating assembly 110 can be adjustable and/or can be removably attached based on user preferences.

Continuing to refer to FIGS. 9A-9C, seating assembly 110 can be employed with a mobility device such that seating assembly 110 can engage a user controller 120 that can operate features of a mobility device/wheelchair and seating assembly 110. User controller (UC) 120 can also comprise structural features such as but not limited to, mounts, coupling junctions, etc., to engage with seating assembly 110 and subsequently with a mobility device (not shown). Structural features as discussed above and others, (not shown) can enable mounting of UC 120 with seating assembly 110 and/or with another component of mobility device/wheelchair. Positioning of UC 120, with respect to seat assembly 110, can be governed by degree of comfort with which user of seating assembly 110 can reach and operate UC 120. In some configurations, UC 120 can be mounted to seating assembly 110 through user control mount 125.

Figure 12A:
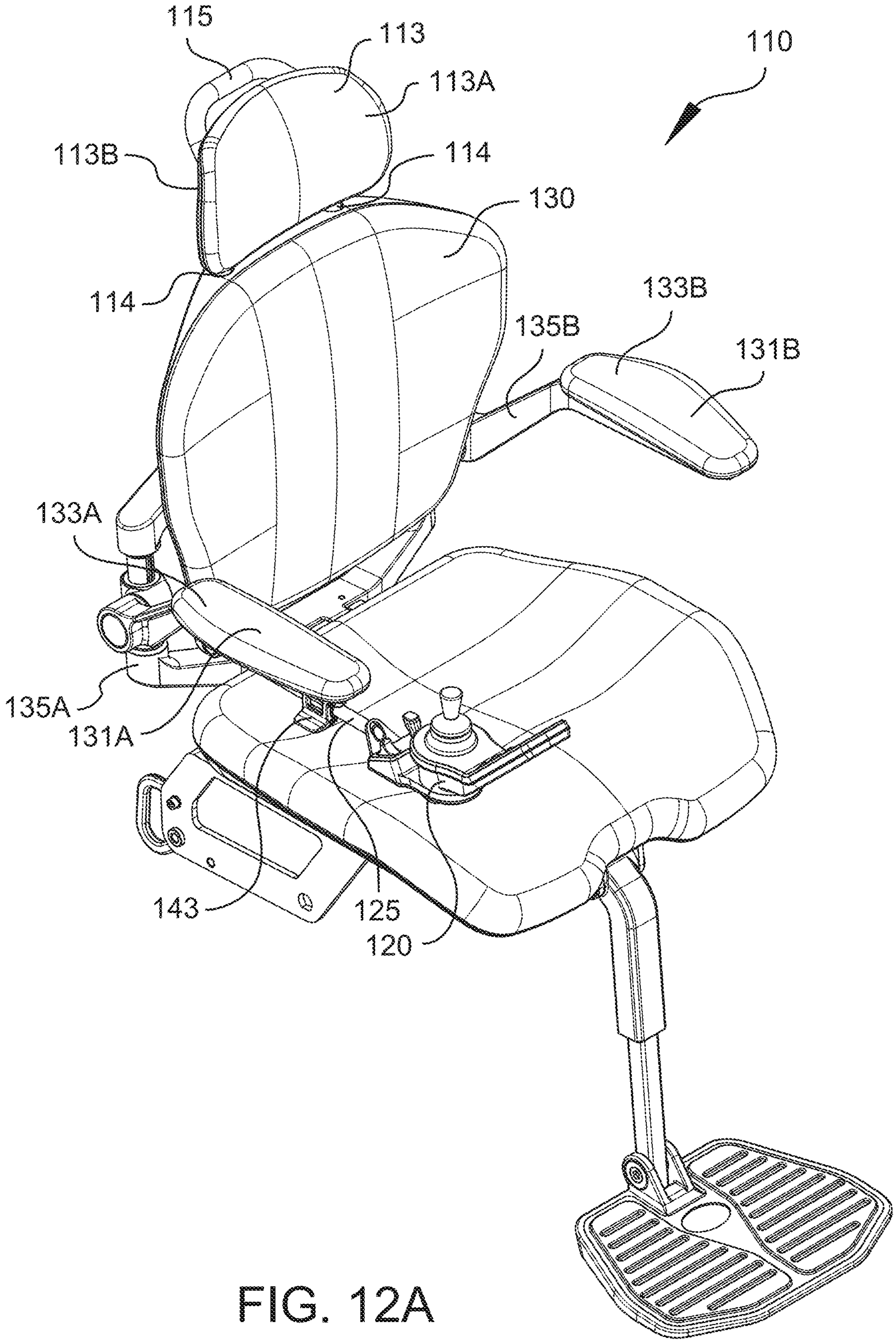
FIGS. 12A-12C are perspective diagrams of the attendant handle and headrest of another configuration of the seat assembly of the present teachings.

Continuing to refer to FIGS. 9A-9C, UC mount 125 can be constructed to have substantially ambidextrous parts, enabling cost-effective manufacture of UC mount 125. UC mount 125 can be manufactured based on user preference. Armrests 133A and 133B (FIG. 12A) can be engaged with the remainder of seating assembly 110 through corresponding armrest supports 135A and 135B. Each armrest support 135A, 135B can comprise a first region that can attach respective armrest support 135A and 135B to a frame (not shown) of seating assembly 110 and a second region configured to receive at least one arm cushion thereupon. Arm cushion 131A can be committed to armrest 133A and arm cushion 131B can be dedicated to armrest 133B (FIG. 12A).

Referring to FIGS. 9B and 9C, second regions of armrest supports 135A and 135B can further comprise corresponding base surfaces 137A (FIG. 9B) that can face away from arm cushions 131A and 131B. These base surfaces 137A (FIG. 9C) can provide receiving platforms to engage UC mount 125, the UC tilt mechanism. A coupling assembly 140 (FIG. 10A) can moveably attach UC mount 125 with the armrest base surfaces 137A. In some configurations, a plurality of coupling assemblies 140 (FIG. 10A) can be used to engage UC mount 125 with at least one of armrests 133A and/or 133B. Coupling assemblies 140 (FIG. 10A) can operate jointly or discretely from one another for achieving engagement. Moveably coupling UC mount 125 with armrest base surface 137A can allow UC 120 to be placed in more than one position, alternating towards vertical position 155A and towards horizontal position 155B. Each of the optional positions can allow the user to conveniently operate UC 120 and consequently operate the mobility device/wheelchair that can be operably coupled with seating assembly 110. Provision of optional positions for UC 120 can allow user to align with respect to a piece of furniture without being obstructed by a rigid position of UC 120. For example, the user of a mobility device such as a wheelchair with seating assembly 110 can sit against a table or desk maintaining or adjusting the distance between the wheelchair and the table without any obstruction from or damage to UC 120.

Referring now to FIGS. 9B-9C, locking apparatus 143 on UC mount 125 can allow UC 120 to be held in first position 150 (FIG. 9B) when a locking mechanism is deployed. In unlocked condition, UC mount 125 can be transitioned and held into second position 153 (FIG. 9C). Seat assembly 110 can include first position 150 (FIG. 9B) in which user control mount 125 is locked, and second position 153 (FIG. 9C) in which user control mount 125 is unlocked. In unlocked condition, the user of seating assembly 110 can adjust UC 120 into a preferred position by shifting UC mount 125 away from armrest 133A. Second position 153 (FIG. 9C) can be variable. In first position 150 (FIG. 9B) or when user mount 125 is operably coupled with armrest support 135A, UC mount 125 can be generally parallel to armrest 133A. While in second position 153 (FIG. 9C), UC mount 125 can form an angle with respect to armrest 133A, causing displacement of UC 120.

Figure 10A:
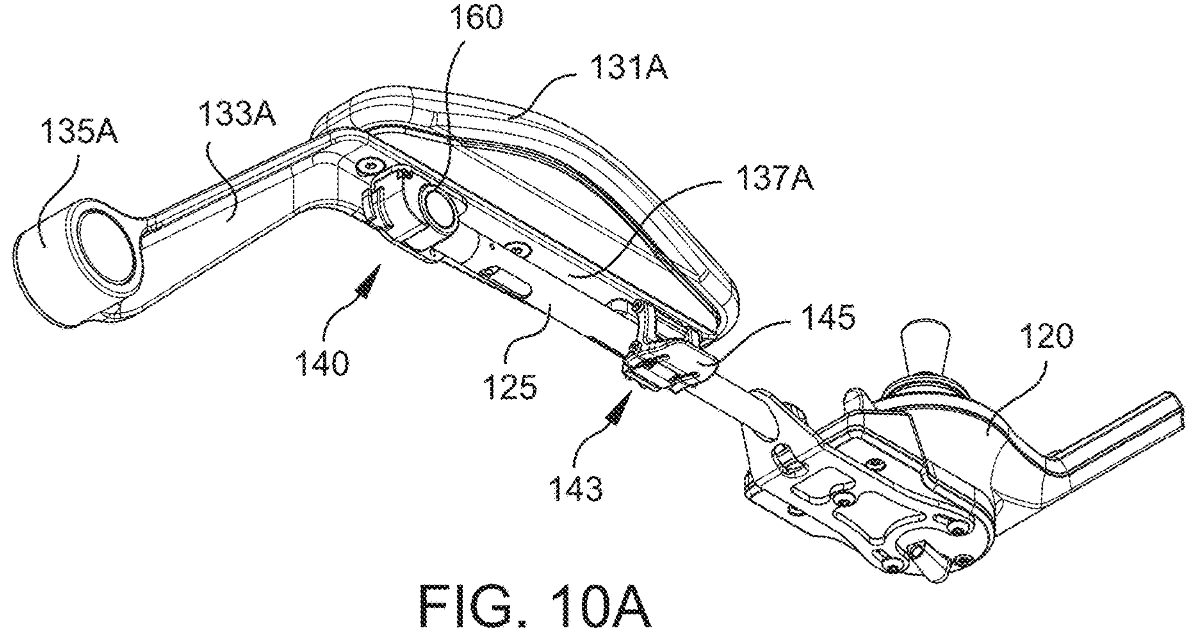
FIGS. 10A-10B are perspective diagrams of the coupling assembly for the user control mounting means of FIGS. 9A-9C.
Figure 10B:
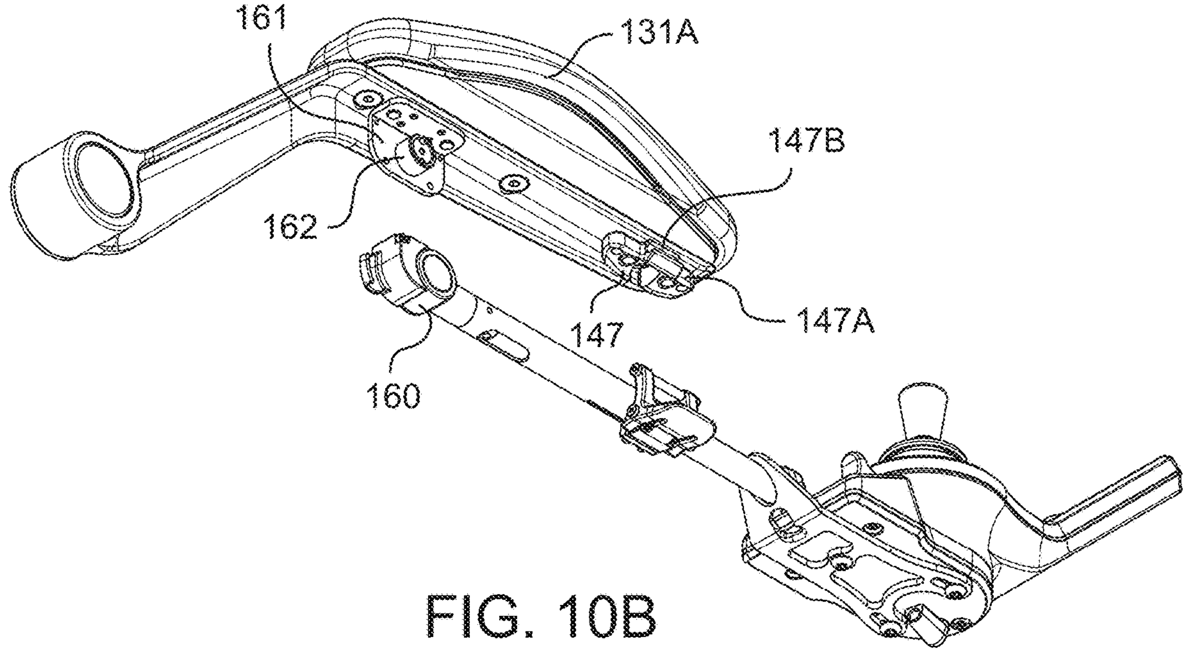

Referring now to FIG. 10A, coupling assembly 140 can operate in conjunction with locking mechanism 143 to engage UC mount 125 (FIG. 9B) with armrest 133A, and can enable UC mount 125 (FIG. 9B) to reversibly displace from first position 150 (FIG. 9B) to a second position 153 (FIG. 9C). Locking mechanism 143 can optionally comprise receptacle 147 (FIG. 10B) and lever 145. Receptacle 147 (FIG. 10B) can engage with base surface 137A of armrest 133A, and can jointly operate with lever 145 to engage shaft 121 (FIG. 9C) of UC mount 125 with base surface 137A. In a locked position, UC mount shaft 121 (FIG. 9C) can be operably coupled with base surface 137A such that a coupling segment of lever 145 can link with a complementing coupling part in receptacle 147 (FIG. 10B) and trap shaft 121 (FIG. 9C) there between. Receptacle 147 (FIG. 10B) can comprise primary receptacle 147A (FIG. 10B) and secondary receptacle 147B (FIG. 10B). Primary receptacle 147A (FIG. 10B), which can roughly match the cylindrical shape of telescoping tube 121A, can serve as a trench to receive, and provide lateral restraint for, shaft 121 (FIG. 9C) of UC mount 125 when it is in first position/locked position 150 (FIG. 9B). Lever 145 can be operably engaged with shaft 121 (FIG. 9C) and can comprise bar segment 144 (FIG. 9B) that can serve as a coupling segment, and can be trapped into secondary receptacle 147B (FIG. 10B) when UC mount 125 is in a locked position. The user can trap or release bar segment 144 (FIG. 9B) from secondary receptacle 147B (FIG. 10B) by operating lever 145 (FIG. 10B) that can include a paddle configured to be operated by a user. While in first position 150 (FIG. 9B) or locked position, lever 145 can be angled with respect to shaft 121 (FIG. 9C) of mount 125, such that bar segment 144 (FIG. 9B) is confined in secondary receptacle 147B (FIG. 10B). In second position 153 (FIG. 9C), lever 145 can form a renewed angle with respect to shaft 121 (FIG. 9C), releasing bar segment 144 (FIG. 9B) from secondary receptacle 147B (FIG. 9C). The coupling can allow a user to unlock and displace UC 120 (FIG. 9B) at a desirable angle with respect to armrest 133A (FIG. 10A). In some configurations, shaft 121 (FIG. 9C) can include a telescopic conduit such that a user can alter the length of shaft 121 (FIG. 9C) as per the length of the user's arm. In some configurations, telescoping conduit can be secured without tools, for example, but not limited to, securing with wing nuts and/or thumb screws. In some configurations, shaft 121 (FIG. 9C) can include a multi-part component. In some configurations, shaft 121 (FIG. 9C) can include a single, continuous elongation. In some configurations, shaft 121 can include a filler such as, for example, a textured tape.

Referring now specifically to FIGS. 10A and 10B, coupling assembly 140 can engage at least one end of UC mount 125 with armrest 133A. A pivoting assembly 160 and bracket 161 can form coupling assembly 140 such that bracket 161 can enable engagement between base 137A and pivoting assembly 160. Bracket 161 can be rigidly fastened with base surface 137A and pivoting assembly 160 engages therewith such that rotary portion (not shown) can pivot away and towards base surface 137A. Bracket 161 can further comprise cylindrical protrusion that can serve as roller 162 (FIG. 11D) around which pivoting assembly 160 can be operatively housed. Pivoting assembly 160 can engage with bracket 161 by receiving roller 162 (FIG. 11D) into a roller space 163. Coupling and frictional interaction between roller 162 (FIG. 11D) and remaining components of pivoting assembly 160 have been discussed in greater detail in later part of this specification. Bracket 161 can be affixed to base 137A through fastening agents such as, but not limited to, screws, bolts, pins, etc., fastening components such as those enlisted above and others. Similar fastening agents can be employed for receptacle 147 (FIG. 10B) and lever 145 of locking mechanism 143. A user control bed 123 can be a part of UC mount 125 such that bed 123 can permanently couple with shaft 121. User control 125 can be held on the UC bed 123 through fastening components such as, but not limited to, screws and bolts affixed therewith. A base (not shown) of the user control 120 and/or UC bed 123 can provide a plurality of fastening junctions that can allow a user to orient UC 120 as required. Displacement of UC mount shaft 121 can cause subsequent displacement of UC bed 123 and hence UC 120.

Figure 11A:
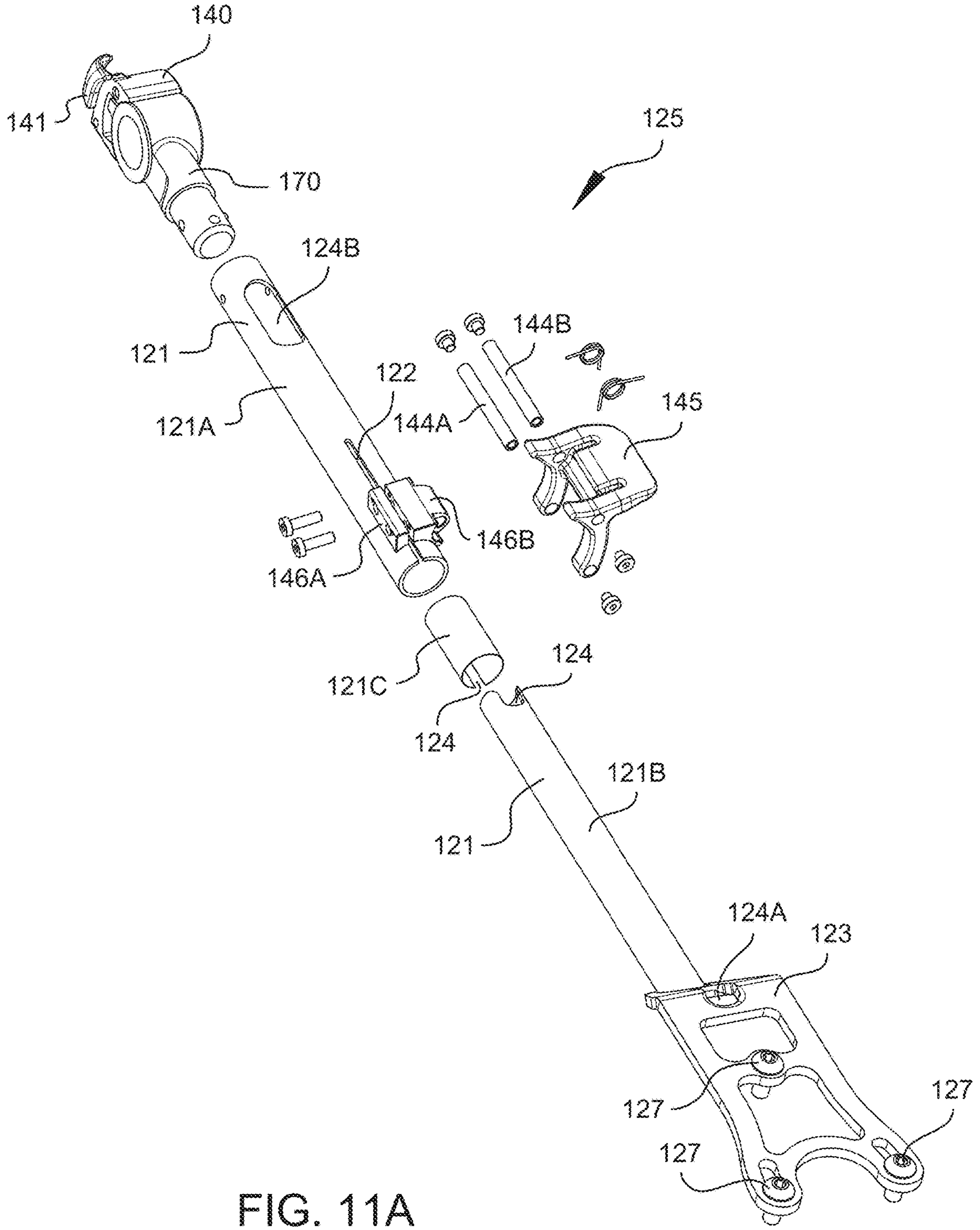
FIGS. 11A-11D are perspective diagrams of details of the user control mounting means of the present teachings.

Referring now to FIG. 11A, UC mount 125 can comprise a shaft 121 operably coupled with UC bed 123 on the distal end of shaft 121, and pivoting assembly 140 on the proximal end of shaft 121. Fasteners 127 can operably couple UC 120 (FIG. 9A) with UC mount bed 123. Any kind and shape of user controller with fastening points the approximate locates of fasteners 127 can be attached to UC mount bed 123. Shaft 121 can include a multi-part component. Shaft 121 of can include first tube 121A and a second tube 121B. Second tube 121B can at least partially nest inside first tube 121A and can cooperatively, with first tube 121A, provide a telescopic elongation to adjust the combined length of shaft 121. In some configurations, first tube 121A can possess a diameter larger than the diameter of second tube 121B to achieve nesting and telescopic length adjustment. Shaft segments 121A and 121B can provide a roll degree of freedom therewith, providing additional positioning options to user. Shaft segment 121A can comprise a longitudinal incision 122 to receive shaft segment 121B of varying diameters. Incision 122 can further allow first shaft segment 121A to acceptably deform when a second shaft segment 121B is received therein. In some configurations, shaft 121 can include rigid or incompressible spacer 121C to ensure compact fitting between first shaft segment 121A and second shaft segment 121B. In some configurations, shaft 121 can include no spacer or can be a single-piece, continuous device. When UC mount 125 is in position 150 (FIG. 9B), bumpers (not shown) formed by a cavity within receptacle 147, extending into the cylindrical cutout of second lever segment 144B can press against first shaft segment 121A, creating a compression that can inhibit possible unwanted mechanical movement.

Continuing to refer to FIG. 11A, shaft 121 and shaft segments 121A, 121B, and 121C can jointly define track 124 in shaft 121. Track 124 can house cables or power and data cords (not shown) between UC 120 (FIG. 12A) and a mobility device. First aperture 124A, disposed on a distal end of shaft 121 can serve an entry gate for receiving cables or cords from UC 120 (FIG. 12A) that can be attached to UC mount bed 123. Cables and cords can extend along track 124 and can exit from a second aperture 124B, that can be disposed on proximal end of shaft 121. Apertures 124A and 124B can further facilitate swapping of cable unions, as required. Exiting cables and cords can be engaged with hanger 141 that can be optionally integrated with coupling assembly 140. The layout for receiving cables can enable cable management related to the mobility device.

Continuing to refer to FIG. 11A, incision 122 on first shaft segment 121 can be pinched by constricting blocks 146A and 146B. Blocks 146A and 146B can be optionally disposed on either sides of incision 122 and can be constricted together through fastening features such as, but not limited to screws, pins, and bolts. In some configurations, blocks 146A, 146B can be welded onto shaft segment 121A as a single block. Shaft segment 121A can be slitted to provide incision 122 and uniformly divided blocks 146A and 146B on either sides of incision 122. At least one of divided blocks 146A and/or 146B can further comprise an attachment means to engage lever 145 therewith. Divided blocks 146A, 146B and lever 145 can together, at least partly, form locking mechanism 143 (FIG. 12A). Lever 145 can serve as user operated portion of locking mechanism 143 (FIG. 12A) and receptacle 147 (FIG. 9C) can jointly achieve locking and releasing of shaft 121.

Continuing to refer to FIG. 11A, lever 145 can comprise two segments. First lever segment 144A can jointly operate with receptacle 147 (FIG. 9C) to trap and release shaft 121. In some configurations, first lever segment 144A can include a bar that can be held in primary receptacle 147A (FIG. 9C). Second lever segment 144B (FIG. 9C) can serve to attach lever 145 with at least one of divided blocks 146A and/or 146B to primarily engage lever 145 with shaft 121. In some configurations, the engagement can optionally include a hinge connection to allow desirable operation of lever 145. In some configurations, swiveling motion of lever 145 can be achieved by force application from a user operation on lever 145, and can engage or release first lever segment 144A with primary receptacle 147A (FIG. 9C), causing shaft 121 to be engaged or disengaged from secondary receptacle 147B (FIG. 9C) of receptacle 147 (FIG. 9C). The swivel motion can be spring-loaded.

Figure 11B:
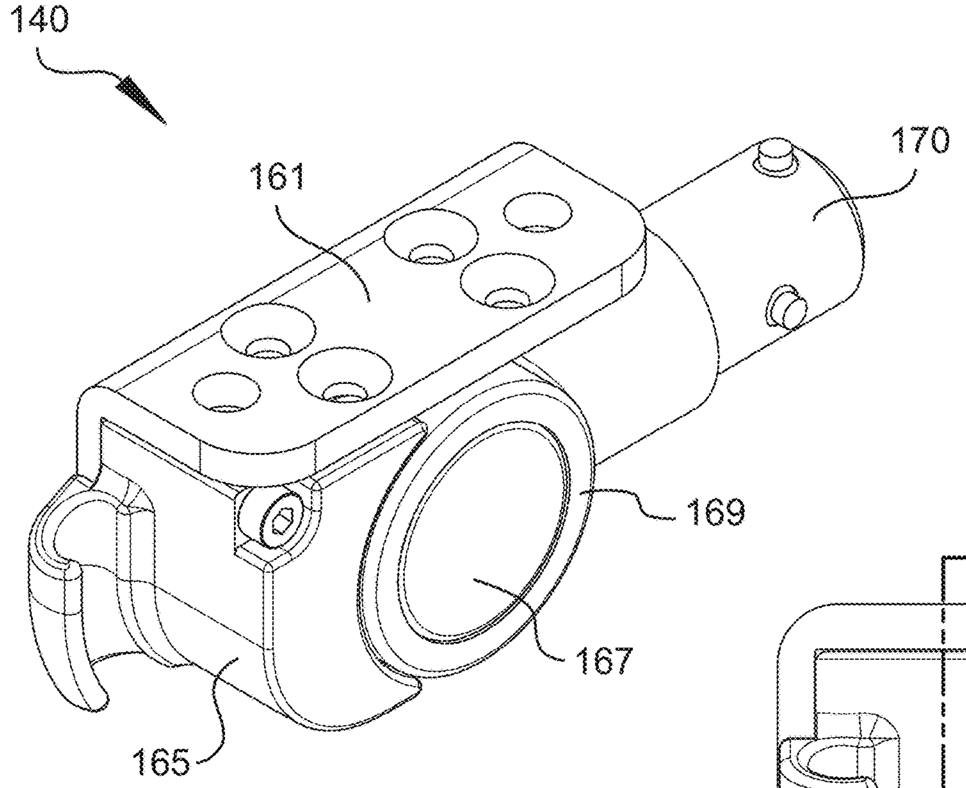
Figure 11C:
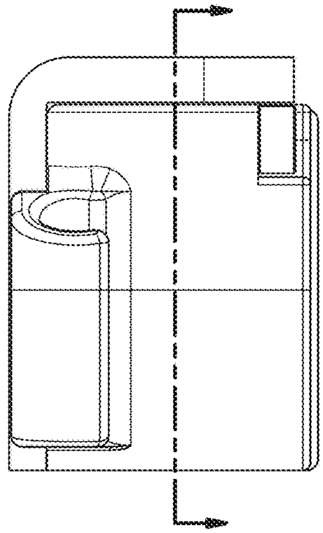
Figure 11C:
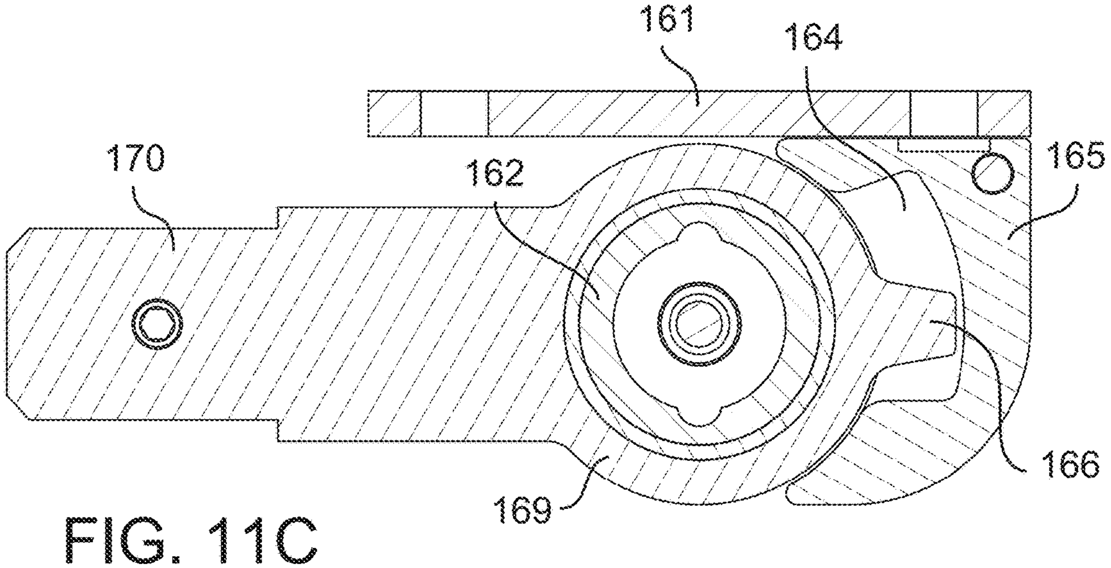
Figure 11D:
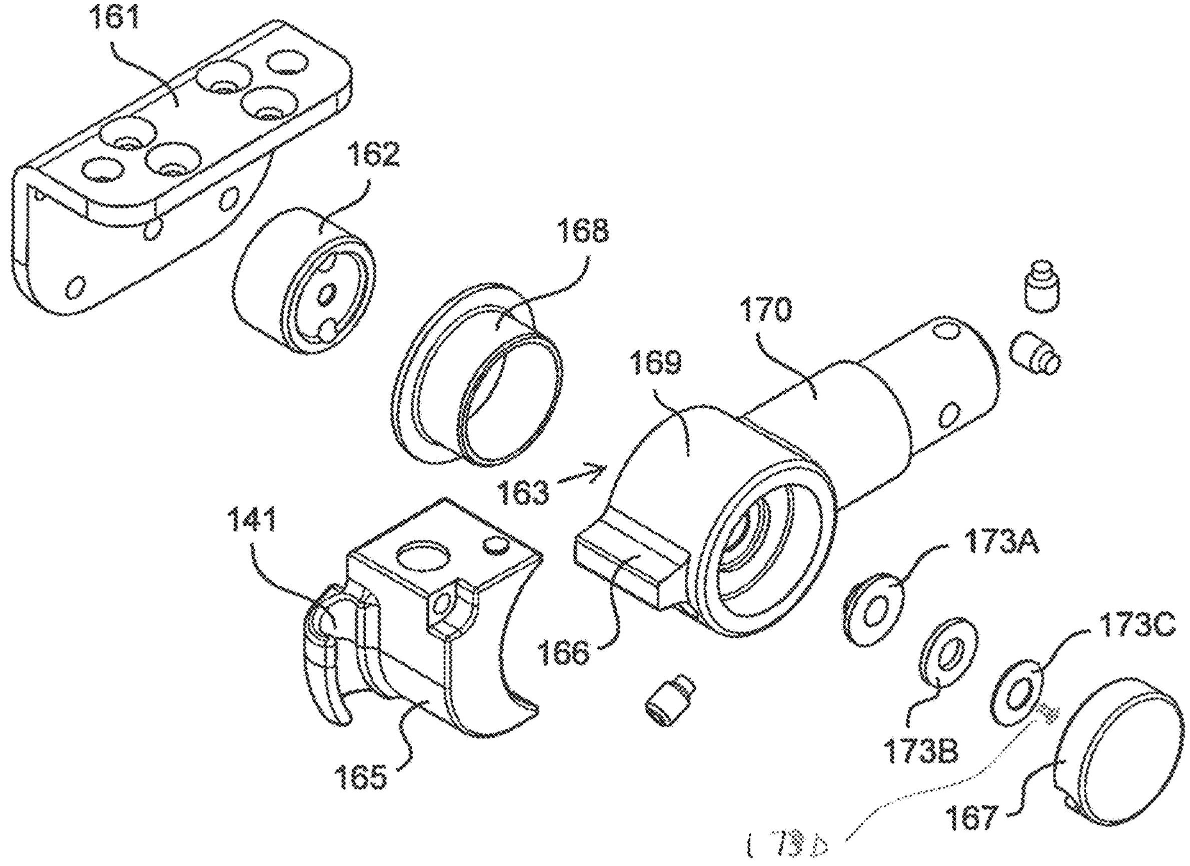

Referring now to FIGS. 11B-11D, pivoting assembly 140 (FIG. 11B) can be optionally positioned at the proximal end of shaft 121, allowing operable engagement between UC mount 120 (FIG. 9A) and base 137A (FIG. 9C) belonging to one of armrests 133A or 133B (FIG. 12A). Bracket 161 can rigidly engage with armrest base 137A (FIG. 9C) and can further couple with a housing 165 therewith. Bracket 161 can be integrated with roller 162 (FIG. 11D) such that roller 162 (FIG. 11D) can receive other components of rotary structure 169. In some configurations, bracket 161 and roller 162 (FIG. 11D) can be a single, continuous component. Rotary structure 169 can receive roller 162 (FIG. 11D) in a roller space 163 (FIG. 11D). At least one bearing and/or bushing such as but not limited to, flanged bushing 168 (FIG. 11D) can be employed to provide a thrust bearing between bracket 161 and rotary structure 169. In some configurations, flanged bushing 168 (FIG. 11D) can be replaced by or supplemented with any other components that can enable avoidance of contact between similar materials of bracket 161 and rotary structure 169. Flanged bushing 168 (FIG. 11D) can serve as a radial bearing in rotary structure 169 (FIG. 11D) for roller 162 (FIG. 11D). The radial compression between the surfaces of roller space 163 (FIG. 11D), flanged bushing 168 (FIG. 11D) and roller 162 (FIG. 11D) can largely govern required friction to allow pivoting motion of pivoting assembly 160 (FIG. 10A).

Referring to FIG. 11D, in company with receiving roller 162, rotary structure 169 can also operably engage with housing 165. Rotary structure 169 can be composed of a cylindrical portion disposed in between a radial projection 166 and an elongated portion 170. Projection 166 can partially oscillate in pocket 164 (FIG. 11C) of housing 165 such that its oscillation can transition into a pivoting motion of rotary structure 169 and consequently pivot elongation 170. At least a part of the periphery of housing 165 can serve as hard-stops for regulating oscillatory motion of projection 166. In some configurations, hard stop elements can be provided in housing 165 and, in some configurations, hard stop elements can be distinct from the body of housing 165. In some configurations, housing 165 can limit travel to 30°. In some configurations, housing 165 can be manufactured by machining or printing. In some configurations, pocket 164 (FIG. 11C) of housing 165 can comprise one or more shim structures that can be removably retained therein. As a result, a variable hard stop can be provided for oscillatory motion of projection 166. Altering the motion of projection 166 can impact the angular adjustment of UC mount 120 (FIG. 9A) with respect to shaft 121 (FIG. 11A). Shaft 121 (FIG. 11A) can couple with pivoting assembly 140 (FIG. 11B) by at least partially retaining elongation 170 in track 124 of hollow shaft 121 (FIG. 11A).

Continuing to refer to FIG. 11D, a plurality of washers or like components such as but not limited to, compression springs, can be employed in rotary structure 169 to provide axial pre-load between rotary structure 169 and bracket 161 through flanged bushing 168. The pre-load can create additional friction. In some configurations, bushing 173A, flat washer 173B and Belleville washer 173C, held together by, for example, shoulder bolt 173D can achieve the pre-load. The number and type of washers and/or bushings can be varied based on the extent of pre-load desired. End cap 167 can be affixed to rotary structure 169 to enclose rotary components. Materials and dimensions of the sub-components of rotary structure 169 can be determined based on a desired friction there between such that UC mount 125 (FIG. 11A) can be pivoted with a desired force application and can halt at a desirable second position 153 (FIG. 9C). Additional fastening elements can be employed to ensure a uniform pivoting of most sub-components of rotary structure 169. In some configurations, rotary structure 169 can be a solid piece, without roller pocket 163 and/or roller 162.

Referring now to FIG. 12A, third configuration seating assembly 110 can comprise headrest 113 that can be disposed on backrest 130. Headrest 113 can be engaged with backrest 130 through discrete attachments 114 that can be completely dedicated to this coupling. Attachment 114 can allow user to alter position of headrest 113 with respect to backrest 130. As a result, users of varying heights can adjust headrest 113 as per personal convenience. In some configurations, rails 109 (FIG. 9A) can serve as pairing means for accepting headrest 113 with backrest 130. In some configurations, headrest 113 can be rigidly fastened to rails 109 (FIG. 9A) or can be adjustably fastened to rails 109 (FIG. 9A). In case of an adjustable attachment between headrest 113 and rails 109 (FIG. 9A), a user can alter the position of headrest 113 with respect to backrest 130 and the desired height of attendant handle 115. A plurality of attachment mechanisms can be employed for adjustably engaging headrest 113 with rails 109 (FIG. 9A). At least one attachment mechanism can cause headrest 113 to slide along length of rails 109 (FIG. 9A). Headrest 113 can further be composed of cushion 113A and base 113B. Attachments 114 and/or rails 109 (FIG. 9A) can be partially or completely captured between cushion 113A and base 113B to ensure the attachments and/or rails 109 (FIG. 9A) do not interfere when a user's head rests on headrest 113. In some configurations, headrest 113 can be removably attached with attachment 114 and/or rails 109 (FIG. 9A). As a result, user can enjoy an option of using seating assembly 110 without headrest 113, when desired.

Figure 12B:
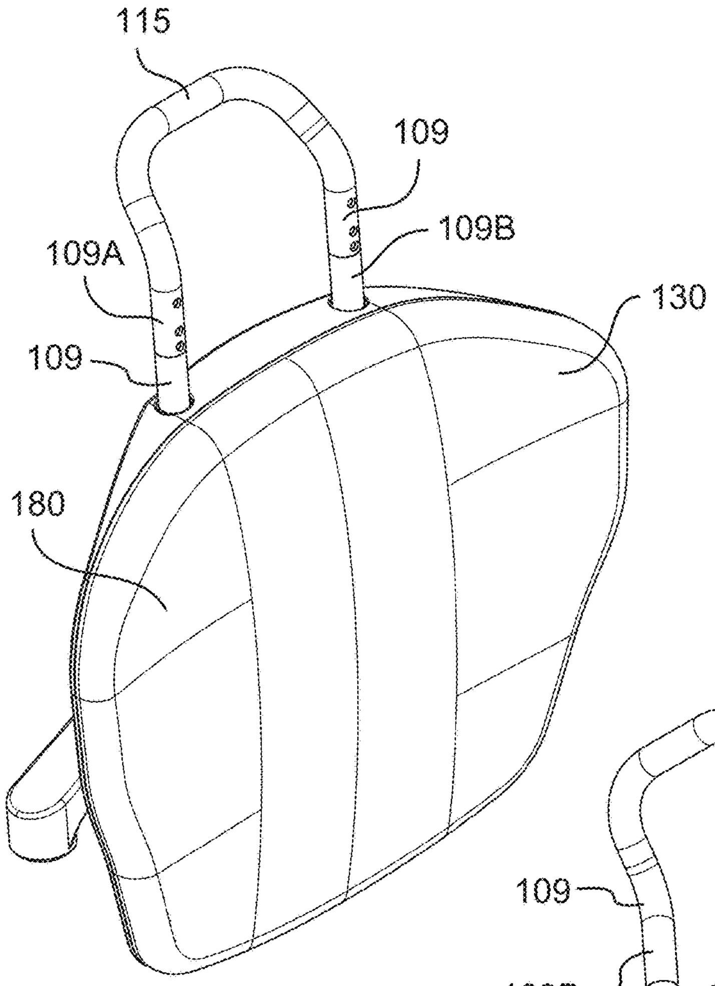
Figure 12C:
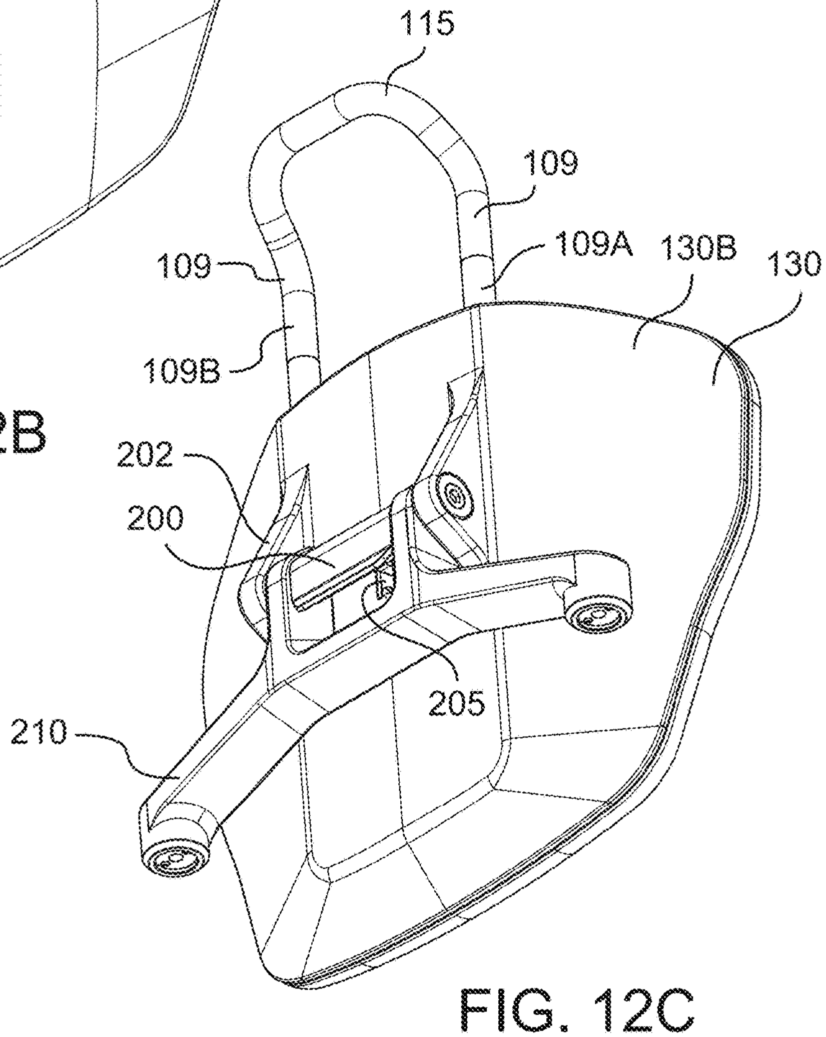

Referring now to FIGS. 12B-12C, attendant handle 115 can be housed in backrest 130. Handle 115 can serve as an auxiliary feature to maneuver seating assembly 110 (FIG. 12A) by an individual other than user of seat assembly 110 (FIG. 12A). Handle 115 is also referred to as an attendant handle since it can be used by an attendant assisting a user of seat assembly 110 (FIG. 12A) during occasions that demand additional and/or external support to supplement movement capability of a wheelchair or mobility device containing seating assembly 110 (FIG. 12A). In some configurations, an attendant can use handle 115 when a user of seat assembly 110 (FIG. 12A) is climbing stairs in a wheelchair or any mobility device that can contain seat assembly 110 (FIG. 12A). In some configurations, when a user is operating a wheelchair or mobility device over a terrain that offers a higher friction against wheels of the wheelchair or mobility device, handle 115 can be used. Attendant handle, such as, but not limited to, attendant handle 115 can serve as a convenient gripping and force bearing component to maneuver a wheelchair or mobility device on which seat assembly 110 (FIG. 12A) may be affixed.

Figure 13A:
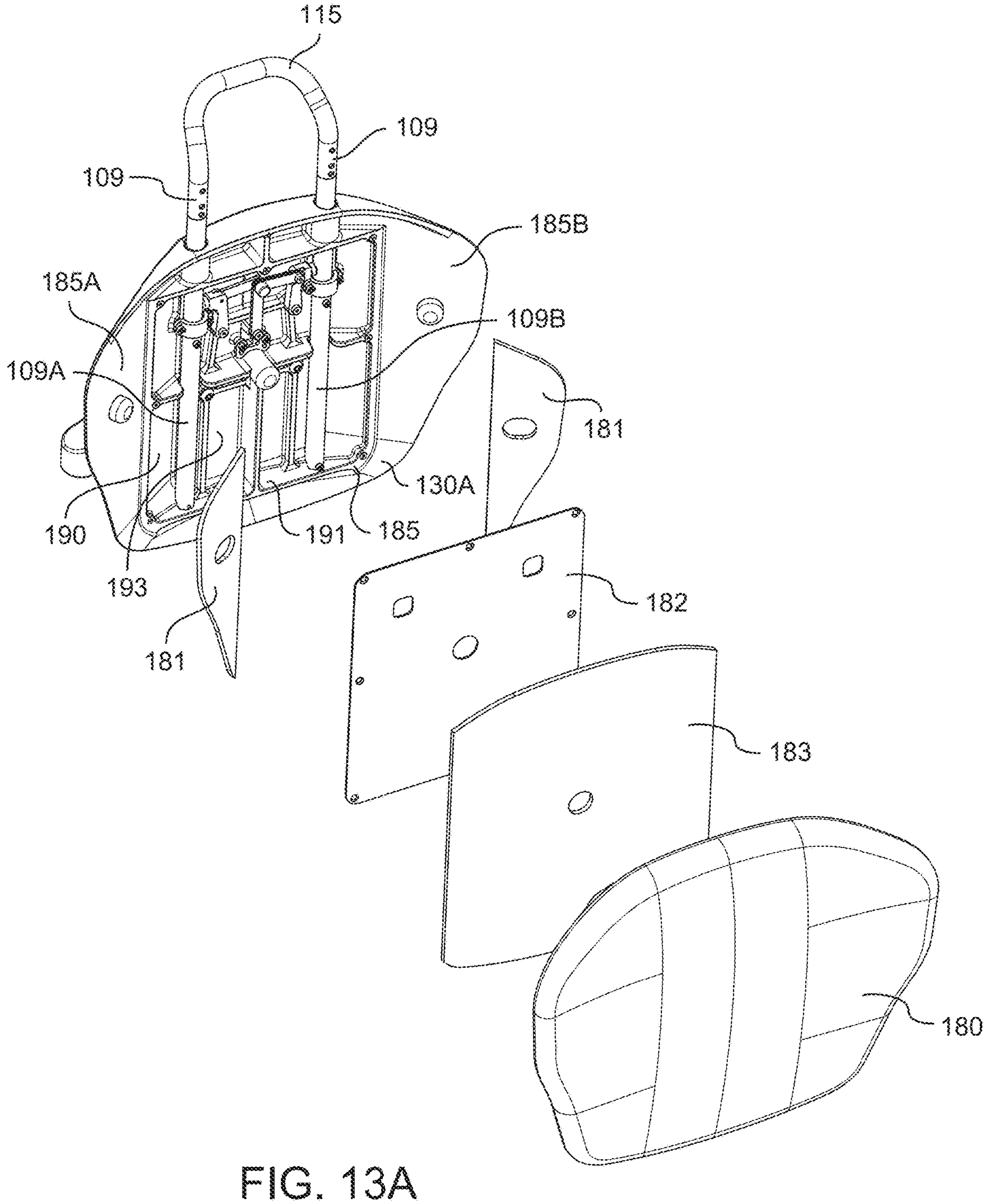
FIGS. 13A-13D are perspective diagrams of the backrest of another configuration of the seat assembly of the present teachings.

Continuing to refer to FIGS. 12B-12C, handle rails 109 can moveably engage attendant handle 115 with backrest 130. Handle 115 can travel away from and towards backrest 130 through handle rails 109. The travelling motion of handle rails 109 can occur along the length of rail slots or pathways 109A and 109B that can nest in backrest 130. An attendant can adjust the length of attendant handle 115, as per preference and/or required by any circumstances. Backrest 130 can further comprise a front surface 130A (FIG. 13A) and an opposing back surface 130B. Front surface 130A (FIG. 13A) can provide a mounting surface for cushion surface 180 that can cover or partially cover front surface 130A (FIG. 13A). A plurality of engagement methods can be employed to attach cushion surface 180 to front surface 130A (FIG. 13A). In some configurations, cushion surface 180 can be coupled with front surface 130A (FIG. 13A) through a fastener such as, but not limited to, a screw or a bolt. In some configurations, cushion surface 180 can be coupled with front surface 130A (FIG. 13A) through VELCRO® strips provided on the opposing side of cushion surface 180 that can mate with corresponding VELCRO® strips disposed on front surface 130A (FIG. 13A). The engagement methods can allow a user of seat assembly 110 (FIG. 12A) to conveniently switch cushion surface 180 as per preference.

Referring to FIG. 12C, back surface 130B of backrest 130 can comprise latch 200 to operate attendant handle 115. Latch 200 can further comprise flange 205 that can participate in operating and locking the mechanism, optionally disposed in the interior of front surface 130A (FIG. 13A) of backrest 130 (FIG. 12A). Raised supports 202, in conjunction with frame portion 210, can retain latch 200 against back surface 130B of backrest 130. Raised supports 202 can be integral with back surface 130B and can provide a first pair of apertures 212A (FIG. 13D). In some configurations, raised supports 202 can be molded with back surface 130B during manufacture. In some configurations, raised supports 202 can be welded to backrest 130 (FIG. 12A). Raised supports 202, latch 200 and frame 210 can provide coupling features that can further mutually align to engage latch 200 there between.

Referring now to FIG. 13A, front surface 130A can include a plurality of cover layers that can enclose an attendant handle operating assembly 190. Casing 191 can be integrated with or attached to backrest 130 (FIG. 12A), and can house attendant handle operating assembly 190. In some configurations, backrest 130 (FIG. 12A) can be molded with casing 191 and a plurality of subframes 193 can be provided therein. The plurality of subframes 193 can receive corresponding components that can make up attendant handle operating assembly 190. Securing layers 181, 182 and 183 can be positioned between attendant handle operating assembly casing 191 and cushion surface 180. Layers 181, 182, 183 can ensure a reliable covering of attendant handle operating mechanism 190 such that mechanism 190 can function without external intervention that can obstruct operating of assembly 190. A combination of cover layers 181, 182 and 183 can further serve as an upholstery or padding to receive cushion surface 180. A plurality of combinations can be used to cover operating assembly 190 and a plurality of permutations and combinations of these layers can serve as upholstery for cushioning surface. The combinations can include, but are not limited to, a varying number of cover layers, varying material/s for cover layer and similar alternations. Additionally, cover layers 181, 182, 183 can be fastened using a number of fasteners such as, but not limited to, screws, bolts, and pins. Cover layers can be positioned such that fasteners or engaging agents do not interfere with handle operating assembly 190. In some configurations, casing 191 can be embossed into inner face 185, allowing components of assembly 190 to be nested therein. Platforms or surfaces 185A and 185B can receive cover layers 181 can assist in further partially providing upholstery for layers 182 and 183 and cushion surface 180. A desirable spaced enclosure can be formed through casing 191 and cover layers 181, 182, 183, that can retain operating assembly 190, and can allow unobstructed functioning of components of operating assembly 190.

Continuing to refer to FIG. 13A, covering layers 181, 182 and 183 of present teachings can be a single-part or a multi-part component. A first or immediate covering layer 181 that can face operating assembly 190, can optionally be a two or more-piece component such that each component piece engages with an area of inner face 185 of backrest 130 (FIG. 12A). In some configurations, the engagement can occur at an area other than the area occupied by attendant handle operating assembly 190. In some configurations, inner surface 185 can be divided into two regions. First region 185A can be occupied by attendant handle operating mechanism assembly 190, and second region 185B can partially or completely accept cover layers 181, 182 and 183 to engage with surface 185. Region 185A can be centrally located on surface 185, and region 185B can be positioned peripherally and can engage layers 182 and 183 therewith. Each piece of first layer 181 can mate to entirely cover casing 191. Covering layers such as, but not limited to, cover layers 181 and 183, can affix thereupon to provide a secure cover for casing 191. A plurality of fastening agents such as, but not limited to, screws, bolts, and pins, can be used to combine covering layers 181, 182 and 183.

Figure 13B:
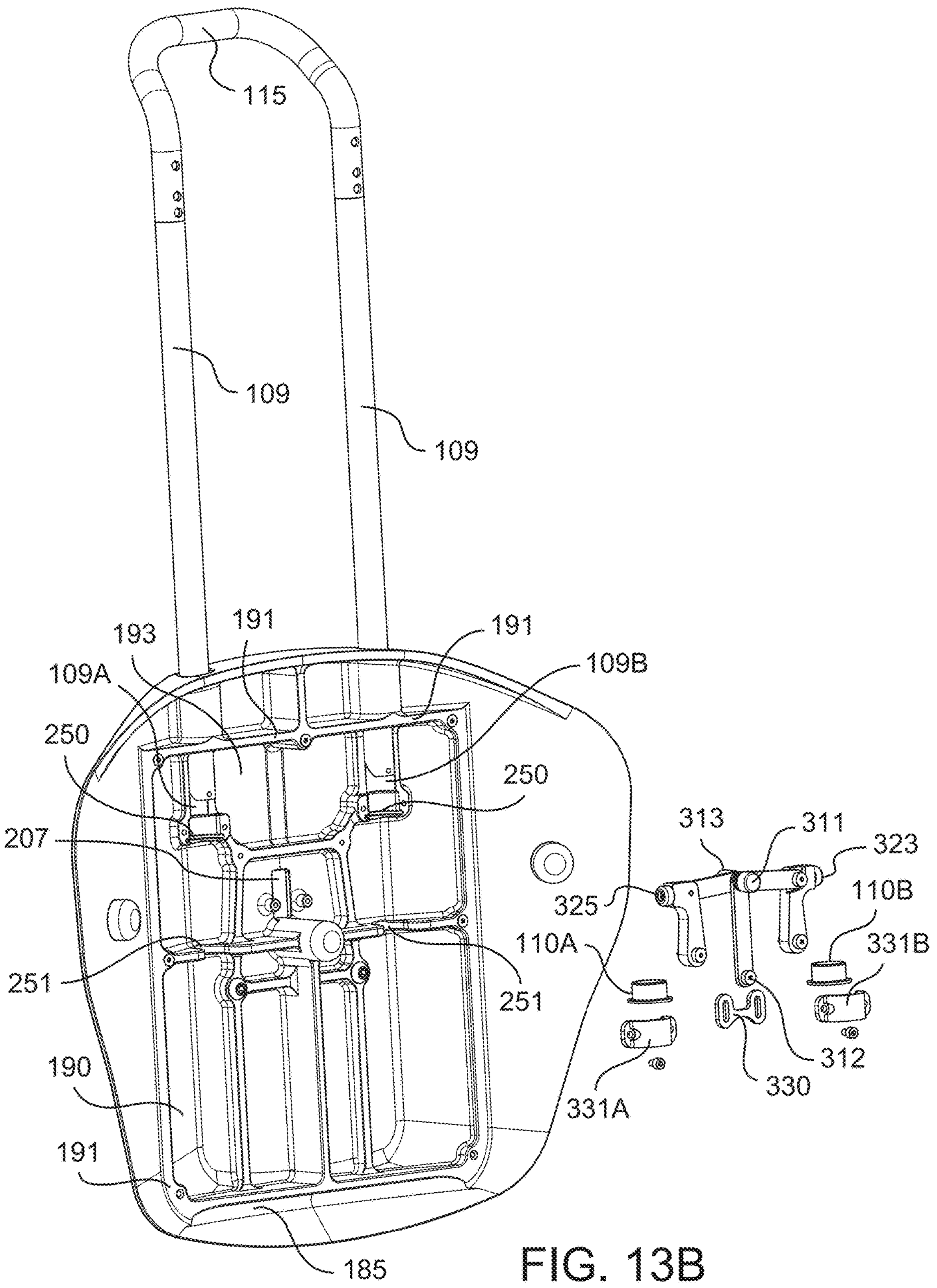

Referring now to FIG. 13B, inner face 185 of backrest 130 can comprise an optionally embossed or pressed case 191 that can house attendant handle operating mechanism 190. A plurality of subframes 193 can be provided in case 191. The plurality of subframes 193 can serve as receptacles for moving parts that can jointly retain, lock, release and allow rails 109 along substantially vertical pathways or slots 109A and 109B. Subframes 193 can also serve as receptacles and/or fastening junctions for moving components housed therein. One purpose of these moving components can be to trap and release rails 109 by operation of latch 200 (FIG. 12B). Attendant handle operating assembly 190 can comprise at least one focal point 311 that can serve as an engagement junction for most moving components of assembly 190. Adjustable joint 312 can optionally engage a second engagement point of moving components of assembly 190 such that adjustable joint 312 can be restricted to travel at variable hard stop 330. In some configurations, operating assembly 190 can comprise a plurality of beams or bars that can mate at focal point 311.

Continuing to refer to FIG. 13B, case 191 can comprise pathways 109A and 109B for rails 109 of attendant handle 115. Rails 109 can be inserted through a plurality of aligned apertures in backrest 130 (FIG. 12A) to receive and retain rails 109. Subframes 193 can further define edges 250 and 251 along each pathway 109A and 109B. Edges 250 and 251 can be sized and shaped to at least partially rim received rails 109. Edges 250 and 251 can serve at alignment junctions to ensure that rails 109 do not derail pathways 109A and 109B. Attachment features in the form of cuffs 110A and 110B can be held by edges 250 and/or 251. Cuffs 110A and 110B can be retained in edges 250 and/or 251 and can subsequently receive rails 109 therein. In some configurations, cuffs 110A and 110B can serve as bushings to provide a smooth sliding surface for rails 109. Traps 331A and 331B can retain cuffs 110A and 110B to enable positioning of rails 109. Edges 250 and 251 can be dimensioned to receive rails 109 along with retaining members 110A, 110B and traps 331A, 331B and any other retaining members, such as, but not limited to, bushings and washers. Following alignment in pathways 109A and 109B, the disposition of moving components of operating assembly 190 can enable capturing and releasing rails 109 in pathways 109A and 109B.

Figure 13C:
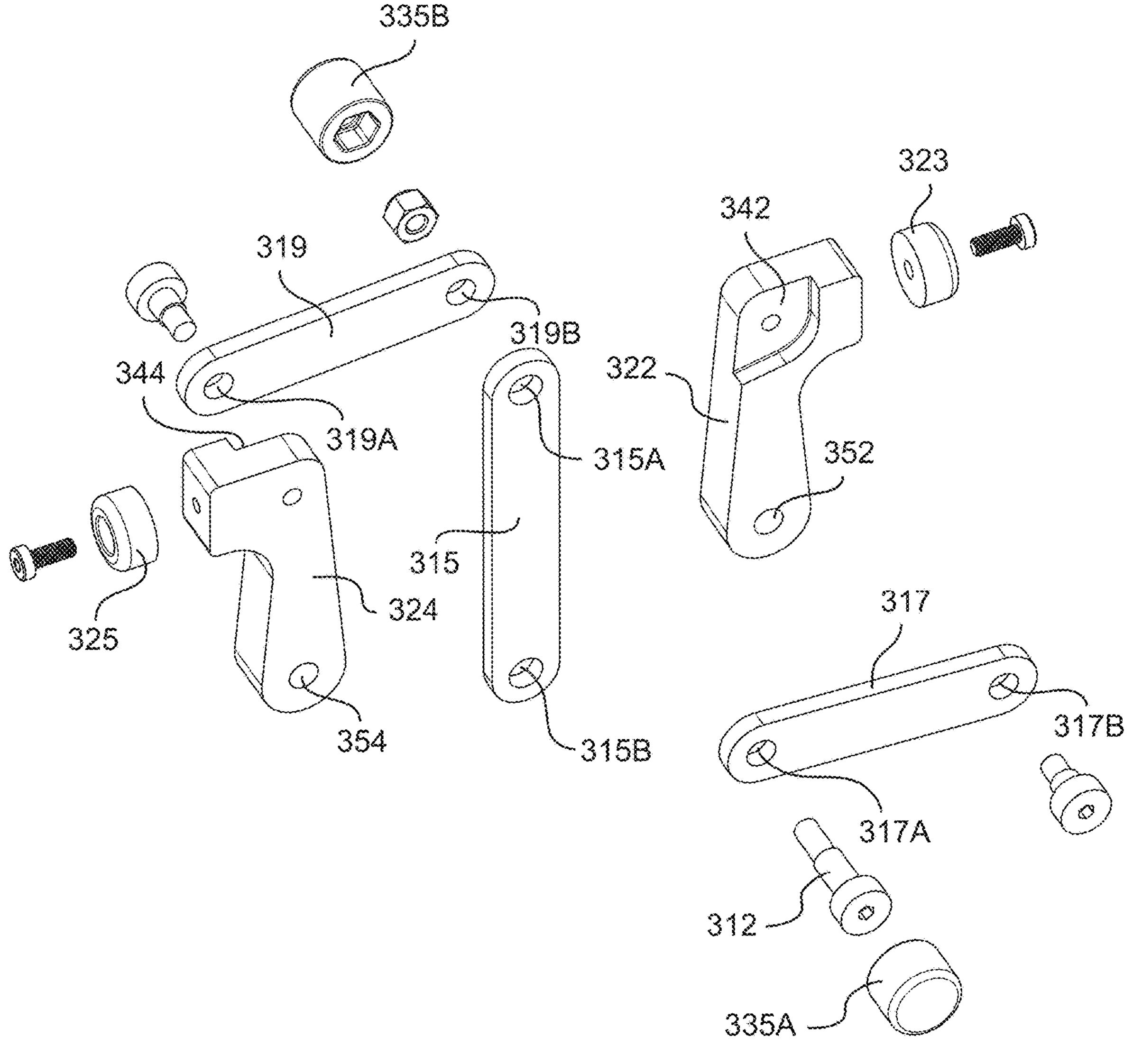
Figure 13D:
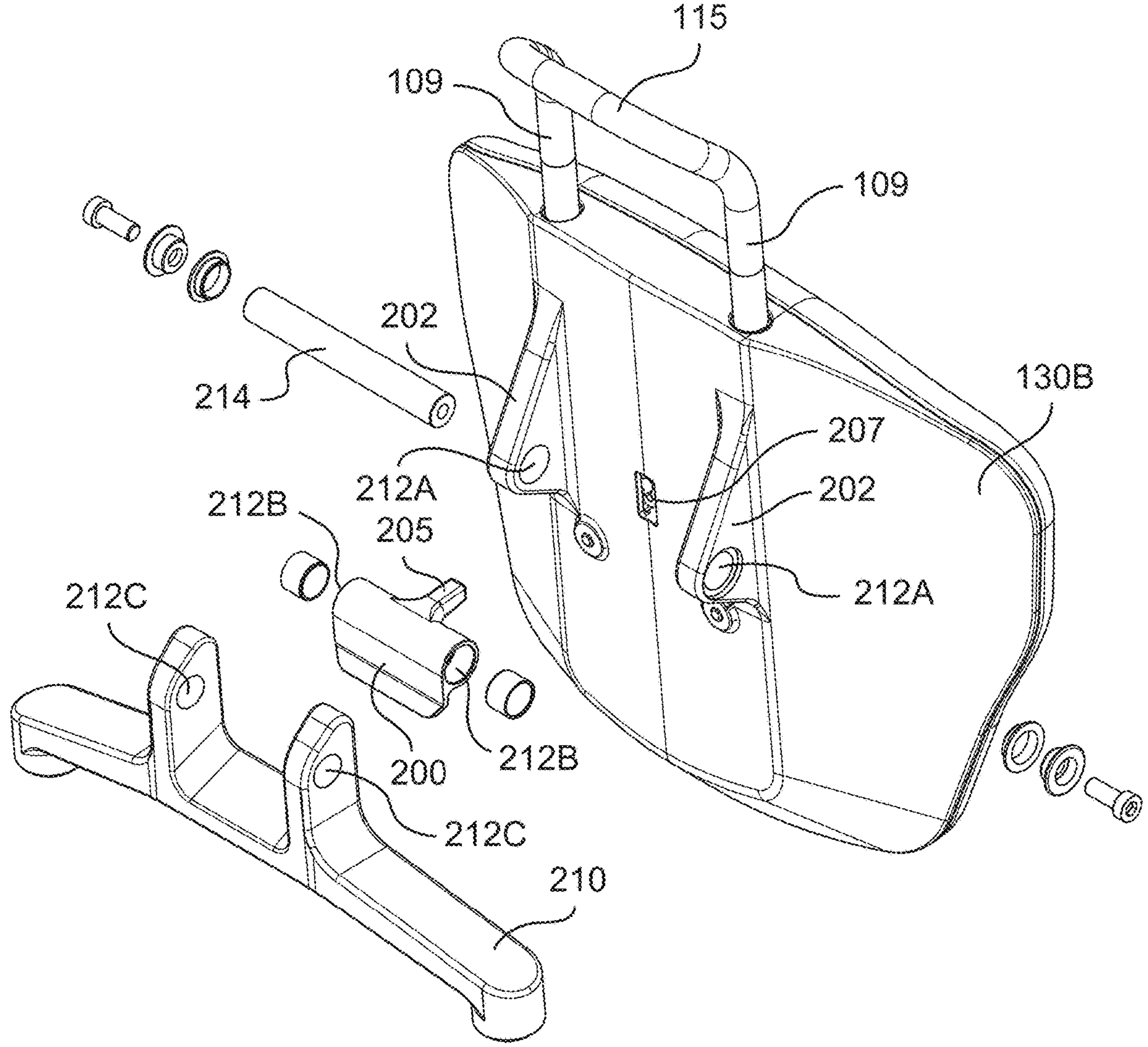

Referring now to FIG. 13C, stoppers 322, 324 can commit to each of rails 109 (FIG. 13B). Stoppers 322, 324 can couple with displaceable components of operating assembly 190 (FIG. 13B) such that operation of these components can cause stoppers 322, 324 to halt and maintain rails 109 at a desirable junction in corresponding pathways 109A and 109B (FIG. 13B). In some configurations, bumpers 323, 325 can couple with stoppers 322, 324 and can compress against rails 109 to halt and maintain rails 109 in their halted position. It should be noted that bumpers 323, 325 (FIG. 13C) can be sized in varying geometries such that chosen geometry can suffice to engage with stopper 322 on one end, and compress against rails 109 (FIG. 13B) on another. A plurality of similar or dissimilar sized bumpers 323, 325 can be employed with stoppers 322 and 324. For achieving a locked position, displacing components of operating assembly 190 (FIG. 13B) can thrust stoppers 322 towards rails 109 (FIG. 13B) and for releasing or in an unlocked position, stoppers 322, 324 can be retracted away from rails 109 (FIG.

13B). In some configurations, a compression spring (not shown) can be held between stoppers 322 and 324 such that on being retracted from rails 109 (FIG. 13B), stoppers 322 and 324 can be maintained at a known distance there between. Variable hard stop 330 (FIG. 13B) can be disposed at a junction in case 191 (FIG. 13B) such that displaceable components of assembly 190 (FIG. 13B) can be refrained from travelling beyond hard stop 330 (FIG. 13B). Geometry of hard stop 330 (FIG. 13B) can be constructed to allow variable positioning of hard stop 330 (FIG. 13B).

Continuing to refer primarily to FIG. 13C, displaceable components of operating assembly 190 (FIG. 13B) can comprise central beam 315 with at least two engagement points 315A and 315B. First side beam 317 and second side beam 319 can be operably coupled with central beam 315 at focal point 311 (FIG. 13B) by fastener 312 and accompanying nut, whose ends are protected by end caps 335A/335B. Each set of side beam/s 317 and 319 can comprise at least two sets of corresponding engagement points each, 317A, 317B and 319A and 319B. At least one of engagement points belonging to each side beam 317 and 319 can couple with first engagement point 315A of central beam 315 and can optionally unite at focal point 311. First set of side beams 317 can extend substantially perpendicular to central beam 315 and can further engage with at least one of stoppers 322 through engagement point 317B, for example. Second set of side beams 319 can engage with central beam 315 at focal point 311 and can extend generally perpendicular to central beam 315. The engagement can be achieved through engagement point 319B or engagement point 319A, for example, and can couple second set of side beam/s 319 with second stopper 324.

Continuing to refer primarily to FIG. 13C, at least one stopper 322, 324 can commit to one of rails 109A (FIG. 13B) and/or 109B (FIG. 13B). First set of side beams 317 can engage with first stopper 322 through second engagement point 317B of first set of side beams 317. Second stopper 324 can engage with second set of side beams 319 through engagement points 319A. Each stopper 322, 324 can further comprise coupling surfaces 342 and 344, respectively. Coupling surfaces 342 and 344 can receive and retain engagement points 317B and 319A, respectively. Fastening of side beams 317, 319 with respective stoppers 322, 324 can be achieved through fastening agents such as, but not limited to, screws, bolts, and pins. Stoppers 322 and 324 can engage with casing and/or enclosure 191 (FIG. 13B) through fasteners at coupling junctions 352 and 354 of stoppers 322 and 324. Fastening of stoppers 322 and 324 with casing or enclosure 191 (FIG. 13B) can enable stoppers 322 and 324 to retain a desired degree of movement for when handle operating assembly 190 (FIG. 13B) transitions from a locked position to an unlocked position and vice versa. In some configurations, stopper 322 and/or 324 can retain a freedom of pivoting around coupling junctions 352 and 354.

Referring primarily to FIG. 13D, pre-determined disposition of moving components of operating assembly 190 (FIG. 13B) can contribute in achieving locking and unlocking of rails 109 (FIG. 13B) through operating assembly 190 (FIG. 13B). Bridging orifice 207 can allow flange 205 to pass there through and receive a fastening agent such as, but not limited to, shoulder screw (not shown) which can further couple with engagement points of central beam 315 (FIG. 13C) and side beams 317, 319. Fastener 312 (FIG. 13C) can engage with flange 205 across bridging orifice 207 and can receive second set of side beam 319 (FIG. 13C), central beam 315 (FIG. 13C) and first set of side beam 317 (FIG. 13C) such that raising and lowering of focal pin 313 (FIG. 13B) can subsequently raise and lower engagement assembly of side beams 317, 319 (FIG. 13C) and central beam 315. Above discussed engagement can further trap central beam 315 (FIG. 13B) between first set of side beam/s 317 and second set of side beam/s 319 (FIG. 13B).

Continuing to refer to FIG. 13D, back surface 130B of backrest 130 (FIG. 12A) can retain latch 200. Attachment of latch 200 can be achieved by engaging bar 214 through first set of apertures 212A that can exist on raised features 202 on backrest 130 (FIG. 12A), second set of apertures or latch apertures 212B, and third set of apertures 212C. The engagement can enable latch 200 to retain a rotary motion around bar 214. User-generated rotation of latch 200 can generate a linear force allowing flange 205 to travel along the length of bridging orifice 207, and can enable linear motion of flexible pin 313 (FIG. 13B) that can enable a user to actuate assembly 190 (FIG. 13B).

Figure 14A:
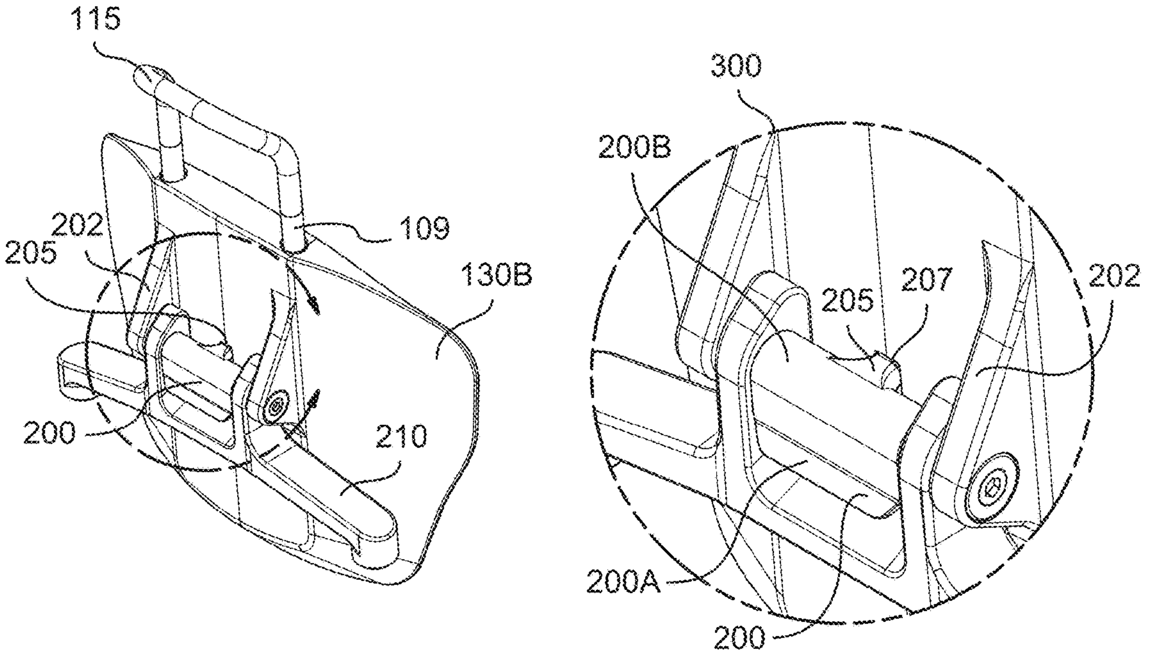
FIGS. 14A-14D are perspective diagrams of the attendant handle attachment of another configuration of the seat assembly of the present teachings.
Figure 14B:
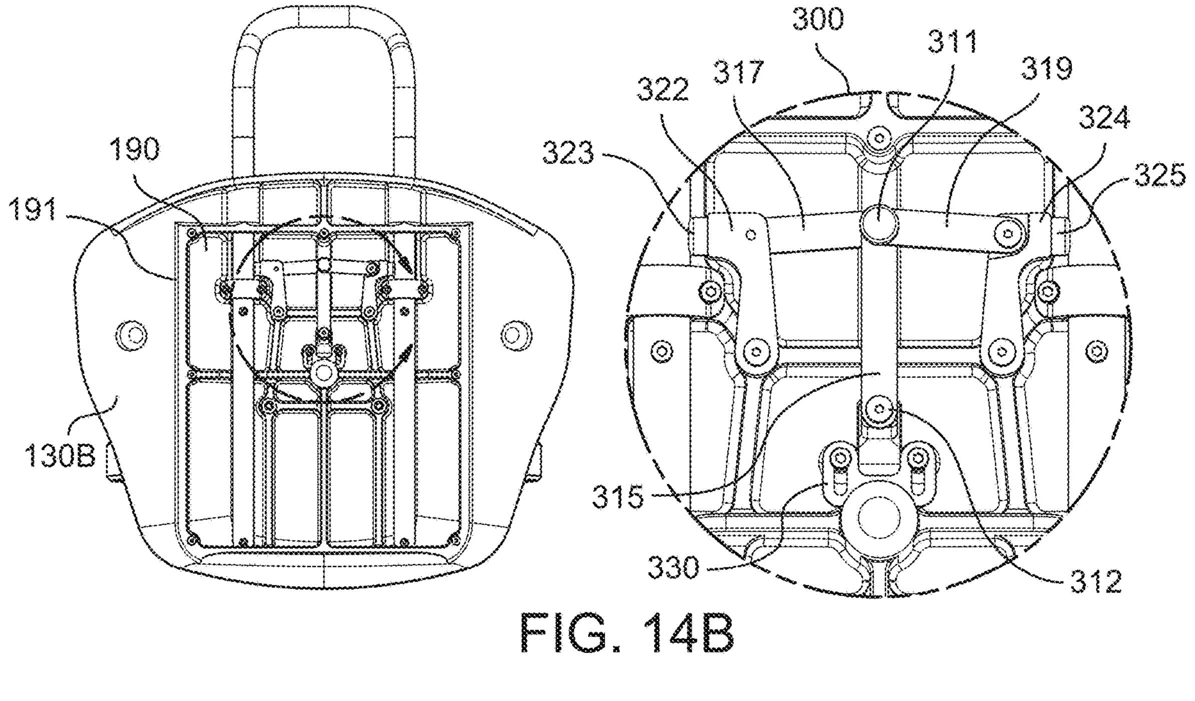
Figure 14C:
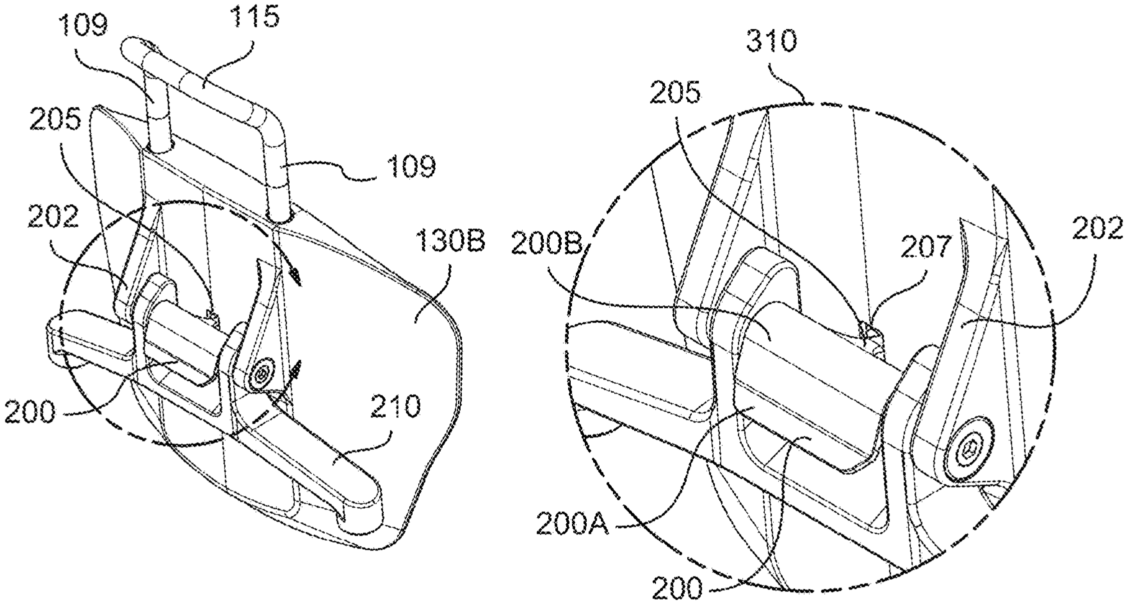
Figure 14D:
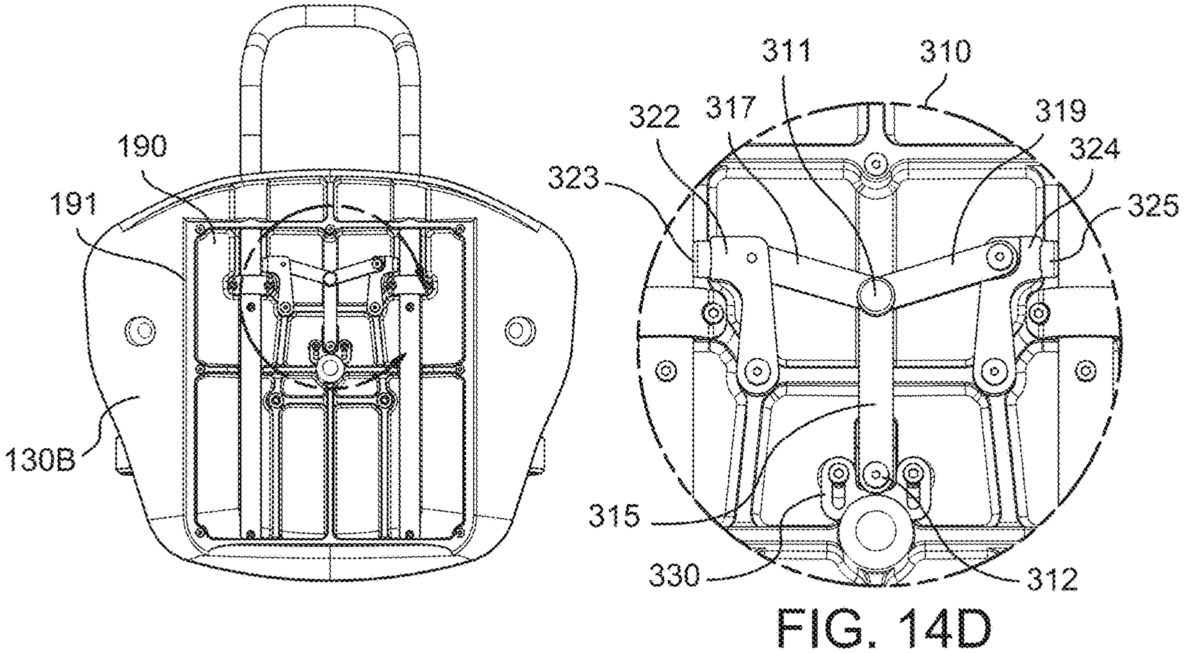

Referring now to FIG. 14A, latch 200 can be held in a locked positon 300 or unlocked position 310 (FIG. 14C). In locked position 300, latch 200 can enable attendant handle operating mechanism 190 (FIG. 14B) to trap attendant handle 115 such that an application of force for adjusting the length of handle 115 cannot displace attendant handle 115 (FIG. 14A) from the position in which it is stationed. In unlocked position 310 (FIG. 14C), attendant handle operating assembly 190 (FIG. 14B) can allow attendant handle 115 to be adjusted in terms of its protruding height by applying a desired force on handle 115. Latch 200 in a locked position (FIGS. 14A and 14B) can be compared with latch 200 in an unlocked position (FIGS. 14C and 14D). Flange 205 can serve as an interface or force transfer agent between latch 200 and handle operating assembly 190 (FIG. 14B).

Continuing to refer to FIG. 14A, a plurality of geometries and designs can be given to latch 200. In some configurations, latch 200 can include a gripping or pushing surface that the user can contact for operating latch 200. In some configurations, latch 200 can include handle portion 200A and rotatable portion 200B. In locked position, handle portion 200A can be pushed away form backrest surface 130B (FIG. 14B) causing a partial rotation of rotatable portion 200B. Flange 205 can extend from rotatable portion 200B such that rotational displacement of latch 200 can displace flange 205 through bridging orifice 207. Displacement of flange 205 towards frame portion 210, as seen on back surface 130B of backrest 130 (FIG. 13B), can enable displacement of adjustable joint 312 such that engaged central beam 315 (FIG. 14B) can also be displaced away from frame portion 210 and can further cause focal point 311 (FIG. 14B) to shift.

Referring now to FIG. 14B, shifting of focal point 311, in locking positon 300 (FIG. 14A) can cause side beams 317, 319 to extend substantially perpendicular to central beam 315. Side beams 317, 319 can exert a thrust on stoppers 322 and 324, causing them to displace towards rails 109 (FIG. 14A) of handle 115 (FIG. 14A). Bumpers 323, 325 can compress against corresponding rails 109 (FIG. 14A) and cease rails 109 (FIG. 14A) from travelling along pathways 109A, 109B (FIG. 12B).

Referring now to FIGS. 14C and 14D, to enable rails 109 (FIG. 14C) to adjustably travel along respective pathways 109A, 109B (FIG. 12B), handle operating mechanism 190 (FIG. 14D) can release rails 109 (FIG. 14C) by rotatably displacing latch 200 (FIG. 14C) into an unlocked position. In the unlocked position, handle portion 200A (FIG. 14C) of latch 200 (FIG. 14C) can appear to be lifted away from back surface 130B (FIG. 14D). As a result, flange 205 can be displaced toward frame portion 210 (FIG. 14C) along the length of bridging orifice 207 (FIG. 14C), and can result in displacement of adjustable joint 312 (FIG. 14D). Variable hard stop 330 (FIG. 14D) can be positioned in casing 191 (FIG. 14D) of inner face 185A (FIG. 13A) of backrest 130 (FIG. 12A), can serve as a hard stop for flexible point 312 (FIG. 14D), and can restrict rotation of latch 200 (FIG. 14C). Central beam 315 (FIG. 14D) can operably couple adjustable joint 312 (FIG. 14D) with focal point 311 (FIG. 14D), and can enable displacement of focal point 311 (FIG. 14D) towards frame portion 210 (FIG. 14C). Shifting of focal point 311 (FIG. 14D) can cause side beams 317, 319 (FIG. 14D) to displace from their substantially perpendicular position with respect to central beam 315 (FIG. 14D). Displaced side beams 317, 319 (FIG. 14D) can retract stoppers 324, 322 (FIG. 14D) from pathways 109A, 109B (FIG. 12B). The retraction can result in loosening contact between stopper bumpers 323, 325 (FIG. 14D) and respective rails 109 (FIG. 14C). As a result, rails 109 (FIG. 14C) can freely travel along length of travel ways 109A, 109B (FIG. 12B). A user can choose an appropriate length of handle 115 (FIG. 14C) extending of out backrest 130 (FIG. 12A) and can retain the chosen length when transitioning into locked position 300 (FIG. 14B) by operating latch 200 (FIG. 14C).

While the present teachings have been described in terms of specific configurations, it is to be understood that they are not limited to these disclosed configurations. Many modifications and other configurations will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. Coupling assembly for coupling a user controller with an armrest on a mobility device comprising:

a user controller mount configured with ambidextrous parts and to mount the user controller to a seating assembly of the mobility device; and a locking mechanism configured to engage the user controller mount with the armrest and enable the user controller mount to be positioned and fixed anywhere along the armrest to accommodate a length of the user's arm and reversibly displace from a first position to a second position.

2. Coupling of claim 1 wherein the locking mechanism comprises:

a receptacle configured to operably couple with a base surface of the armrest; and a lever, the lever jointly operating with the receptacle to engage a shaft of the user controller mount with the base surface.

3. Coupling of claim 2 wherein the lever comprises a bar segment configured as a coupling segment.

4. Coupling of claim 3 wherein the receptacle comprises:

a primary receptacle configured to receive and restrain the shaft when the shaft is in the first position; and a secondary receptacle configured to trap the bar segment when the shaft is in the first position and release the bar segment with the user controller mount is in the second position, the trapping and the releasing initiated by the lever.

5. Coupling of claim 4 wherein the lever comprises a paddle configured to be operated by a user.

6. Coupling of claim 4 wherein the first position comprises a first angle of the lever with respect to the shaft, confining the bar segment in the secondary receptacle.

7. Coupling of claim 4 wherein the second position comprises a second angle of the lever with respect to shaft, releasing the bar segment from the secondary receptacle, unlocking and displacing the user controller to a desired angle with respect to the armrest.

8. Coupling of claim 2 wherein the shaft comprises a multi-part component.

9. Coupling of claim 2 wherein the shaft comprises a single, continuous elongation.

10. Coupling of claim 2 wherein the shaft comprises a filler.

11. Coupling of claim 1 wherein the first position comprises a locked position.

12. Coupling of claim 1 wherein the second position comprises an unlocked position.

13. Coupling assembly of claim 1 wherein:

the armrest has a longitudinal axis along which the user controller mount is positionable; and said locking mechanism configured to enable the user controller mount to be rotated about the longitudinal axis.

14. Plurality of coupling assemblies for coupling a user controller with at least one armrest on a mobility device, the coupling assembly comprising:

a user controller mount configured to mount the user controller to a seating assembly of the mobility device, the user controller mount configured with ambidextrous parts; and a locking mechanism configured to engage the user controller mount with the at least one armrest and enable the user controller mount to be positioned and fixed anywhere along the at least one armrest to accommodate a length of the user's arm and reversibly displace from a first position to a second position;

wherein the plurality of coupling assemblies are configured to operate jointly or discretely from one another for achieving the coupling.

15. Plurality of coupling assemblies of claim 14 wherein:

the armrest has a longitudinal axis along which the user controller mount is positionable; and said locking mechanism configured to enable the user controller mount to be rotated about the longitudinal axis.

* * * * *